US008485331B2

(12) United States Patent
Parsons et al.

(10) Patent No.: US 8,485,331 B2
(45) Date of Patent: Jul. 16, 2013

(54) DRIVEN ACCESSORY WITH LOW-POWER CLUTCH FOR ACTIVATING OR DE-ACTIVATING SAME

(75) Inventors: Scott Parsons, Toronto (CA); Andrew Boyes, Aurora (CA); Christiaan Vander Ploeg, Aurora (CA)

(73) Assignee: Litens Automotive Partnership, Woodbridge (CA)

( * ) Notice: Subject to any disclaimer, the term of this patent is extended or adjusted under 35 U.S.C. 154(b) by 515 days.

(21) Appl. No.: 12/781,374

(22) Filed: May 17, 2010

(65) Prior Publication Data
US 2010/0230227 A1 Sep. 16, 2010

Related U.S. Application Data

(63) Continuation-in-part of application No. 12/620,023, filed on Nov. 17, 2009, now Pat. No. 8,387,767.

(60) Provisional application No. 61/115,233, filed on Nov. 17, 2008, provisional application No. 61/159,608, filed on Mar. 12, 2009, provisional application No. 61/229,385, filed on Jul. 29, 2009.

(51) Int. Cl.
*F16D 27/105* (2006.01)
*F16D 13/08* (2006.01)

(52) U.S. Cl.
USPC ....... 192/35; 192/41 S; 192/81 C; 192/84.81; 192/30 V

(58) Field of Classification Search
USPC ....................................... 192/84.81
See application file for complete search history.

(56) References Cited

U.S. PATENT DOCUMENTS

| 3,735,847 | A | 5/1973 | Brucken |
| 3,831,723 | A | 8/1974 | Briar et al. |
| 3,865,222 | A | 2/1975 | Briar |
| 4,201,281 | A | 5/1980 | MacDonald |
| 4,262,787 | A | 4/1981 | Takefuta et al. |
| 4,273,226 | A | 6/1981 | Takefuta et al. |
| 4,418,811 | A | 12/1983 | MacDonald |
| 4,466,522 | A | 8/1984 | Shibuya |
| 4,619,351 | A | 10/1986 | Takatoshi |
| 4,674,612 | A | 6/1987 | Ogura |
| 4,704,554 | A | 11/1987 | Nishimura |
| 4,825,988 | A | 5/1989 | Nishimura |
| 5,031,744 | A | 7/1991 | Nishimura |
| 5,076,216 | A | 12/1991 | Ro |
| 5,080,214 | A | 1/1992 | Fossum |
| 5,090,538 | A | 2/1992 | Osawa |
| 5,967,274 | A * | 10/1999 | Leone et al. ............ 192/35 |
| 6,209,698 | B1 | 4/2001 | Wussow |
| 6,484,861 | B1 | 11/2002 | Wussow |

(Continued)

FOREIGN PATENT DOCUMENTS

| EP | 1884678 | 2/2008 |
| EP | 1887224 | 2/2008 |

(Continued)

*Primary Examiner* — Richard M. Lorence
(74) *Attorney, Agent, or Firm* — Harness, Dickey & Pierce, P.L.C.

(57) ABSTRACT

A driven accessory having a clutch that permits selective operation of an accessory portion. The clutch employs rotational inertia to control driving engagement of a wrap spring to an interior clutch surface on a drive member and/or driving disengagement of the wrap spring from the interior clutch surface.

25 Claims, 28 Drawing Sheets

U.S. PATENT DOCUMENTS

| | | | |
|---|---|---|---|
| 6,488,133 B1 * | 12/2002 | Maurice et al. | 192/16 |
| 6,581,743 B2 | 6/2003 | Moroi et al. | |
| 6,915,887 B2 | 7/2005 | Faller et al. | |
| 2008/0017468 A1 | 1/2008 | Krafft et al. | |
| 2008/0041686 A1 * | 2/2008 | Hoshino et al. | 192/3.56 |

FOREIGN PATENT DOCUMENTS

| | | |
|---|---|---|
| GB | 2034830 | 6/1980 |
| GB | 2156016 | 10/1985 |
| JP | 60-175830 | 9/1985 |
| JP | 10-073133 | 3/1998 |
| WO | 2008061749 | 5/2008 |

* cited by examiner

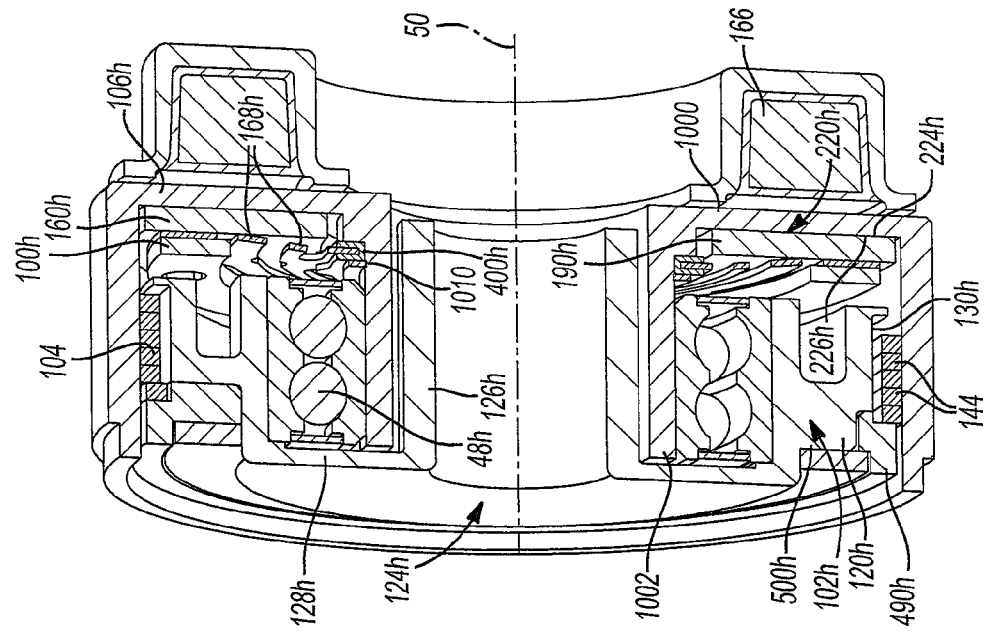
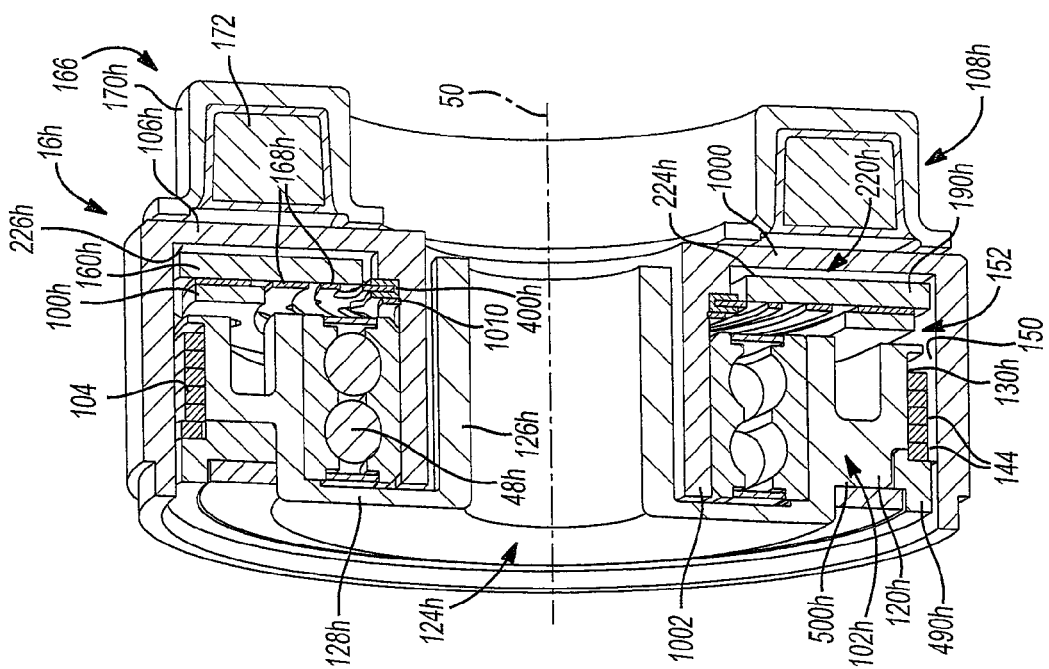

DRIVEN ACCESSORY WITH LOW-POWER CLUTCH FOR ACTIVATING OR DE-ACTIVATING SAME

CROSS-REFERENCE TO RELATED APPLICATIONS

This application is a continuation-in-part of U.S. application Ser. No. 12/620,023 filed Nov. 17, 2009, now U.S. Pat. No. 8,387,767 which claims the benefit of U.S. Provisional Patent Application No. 61/115,233 filed Nov. 17, 2008, U.S. Provisional Patent Application No. 61/159,608 filed Mar. 12, 2009 and U.S. Provisional Patent Application No. 61/229,385 filed Jul. 29, 2009. The disclosures of each of the above-referenced applications is incorporated by reference as if fully set forth in detail herein.

INTRODUCTION

The present disclosure relates to a driven accessory with a low-power clutch for activating or deactivating the driven accessory.

Most vehicle engine systems include one or more driven devices, typically referred to as "accessories", which are driven by the vehicle engine for a variety of purposes. Such accessories can be connected to the engine via an accessory drive, a timing drive, etc. which can comprise a belt drive (e.g., a drive that employs a v-belt, a multi-v belt, a toothed belt, a helically opposed tooth belt, etc.), a chain drive, a train of gears or direct connections to components of the engine (e.g., a drive employing a drive shaft, etc.). Examples of such engine accessories include water pumps, alternators, vacuum pumps, engine cooling fans, power steering pumps, air conditioning compressors, alternator-starters, etc.

While such engine accessories are widely employed, some issues with their operation in a drive system have been identified. For example, engine accessories can be configured such that they operate continuously when the engine is operated. In some cases, however, it may be advantageous to selectively inhibit the operation of the engine accessory. One such case concerns the operation of a coolant pump and cooling fan when the engine is relatively cold. It would be desirable to inhibit operation of the coolant pump and the coolant fan in such situations to permit the engine to heat more rapidly to a desired operating temperature.

It is known to employ a variety of clutch mechanisms on various engine accessories, including cooling pumps, cooling fans and air conditioning compressors, which may be employed to selectively couple the engine accessory to a source of rotary power. While such clutch mechanisms can permit selective operation of an accessory, we are unaware of a clutch mechanism that is particularly well suited for a diverse range of engine accessories. We note, for example, that one type of electromagnetic clutch mechanism that is commonly employed with air conditioning compressors requires a significant amount of electrical power to engage the clutch, which can result in a significant fuel efficiency penalty.

SUMMARY

This section provides a general summary of the disclosure, and is not a comprehensive disclosure of its full scope or all of its features.

In one form, the present teachings provide a clutched device that includes a clutch assembly that includes a first rotary clutch portion, a second rotary clutch portion, a drive member, a wrap spring, and an actuator. The first and second rotary clutch portions are rotatably disposed about a rotary axis of the clutched device. The drive member is disposed about the rotary axis and has an interior clutch surface. The wrap spring has a first end, a second end and a plurality of helical coils that extend axially between the first and second ends. The first end is fixed to the first rotary clutch portion while the second end contacts the second rotary clutch portion. The helical coils are received against the interior clutch surface. The actuator includes an actuator member that is coupled to the first rotary clutch portion for rotation therewith. The actuator member is axially movable along the rotary axis between a first position and a second position to control rotary drag forces within the clutch assembly to effect engagement and disengagement, respectively, of the clutch assembly. The actuator further includes an electromagnet that is configured to generate a magnetic field for attracting the actuator member, repulsing the actuator member or both. At least one of the actuator member and a component of the clutch device that is configured to limit axial movement of the actuator member includes a material that is configured to contact the other one of the actuator and the component of the clutch device. The material is configured to improve wear resistance, reduce noise and/or stabilize dynamics of one or more components of the clutch assembly during engagement, disengagement or both engagement and disengagement of the clutch assembly.

In another form, the present teachings provide a clutched device that includes a clutch assembly that includes a first rotary clutch portion, a second rotary clutch portion, a drive member, a wrap spring, and an actuator. The first and second rotary clutch portions are rotatably disposed about a rotary axis of the clutched device. The drive member is disposed about the rotary axis and has an interior clutch surface. The wrap spring has a first end, a second end and a plurality of helical coils that extend axially between the first and second ends. The first end is fixed to the first rotary clutch portion while the second end contacts the second rotary clutch portion. The helical coils are received against the interior clutch surface. The actuator includes an actuator member and a damper. The actuator member is coupled to the first rotary clutch portion for rotation therewith. The actuator member is axially movable along the rotary axis between a first position and a second position to control rotary drag forces within the clutch assembly to effect engagement and disengagement, respectively, of the clutch assembly. The damper member is configured to damp motion of the actuator member in at least one of a rotary direction and an axial direction.

In yet another form, the present teachings provide a clutched device that includes a clutch assembly that includes a first rotary clutch portion, a second rotary clutch portion, a drive member, a wrap spring, and an actuator. The first and second rotary clutch portions are rotatably disposed about a rotary axis of the clutched device. The drive member is disposed about the rotary axis and has an interior clutch surface. The wrap spring has a first end, a second end and a plurality of helical coils that extend axially between the first and second ends. The first end is fixed to the first rotary clutch portion while the second end contacts the second rotary clutch portion. The helical coils are received against the interior clutch surface. The actuator includes an actuator member that is coupled to the first rotary clutch portion for rotation therewith. The actuator member is axially movable along the rotary axis between a first position and a second position to control rotary drag forces within the clutch assembly to effect engagement and disengagement, respectively, of the clutch assembly. The clutch assembly further includes a driver and a spring carrier. The driver is coupled for rotation with the second rotary clutch portion and the spring carrier is drivingly engaged to driver. The second end of the wrap spring is coupled to the spring carrier such that a first portion of the rotary power received by the wrap spring is transmitted into the spring carrier and a second portion of the rotary power received by the wrap spring is transmitted to the second rotary clutch portion.

In still another form, the present teachings provide a clutched device that includes a clutch assembly with a first rotary clutch portion, a second rotary clutch portion, a drive member, a wrap spring and an actuator. The first and second rotary clutch portions are rotatably disposed about a rotary axis of the clutched device. The drive member is disposed about the rotary axis and has an interior clutch surface. The wrap spring has a first end, a second end and a plurality of helical coils that extend axially between the first and second ends. The first end is fixed to the first rotary clutch portion. The second end contacts the second rotary clutch portion. The helical coils are received against the interior clutch surface. The actuator includes an actuator member that is fixedly coupled to the first rotary clutch portion. The actuator member is axially movable along the rotary axis between a first position and a second position to control rotary drag forces within the clutch assembly to effect engagement and disengagement, respectively, of the clutch assembly.

In another form, the present teachings provide clutched device that includes an input member, an output member and a clutch assembly that is configured to selectively transmit rotary power between the input member and the output member. The clutch assembly includes a first rotary clutch portion, a second rotary clutch portion, a drive member, a wrap spring and an actuator. The first and second rotary clutch portions are rotatably disposed about a rotary axis of the clutched device. The drive member is disposed about the rotary axis and has an interior clutch surface. The wrap spring has a first end, a second end and a plurality of helical coils that extend axially between the first and second ends. The first end is fixed to the first rotary clutch portion. The second end contacts the second rotary clutch portion. The helical coils are received against the interior clutch surface. The actuator includes an actuator member that is fixedly coupled to the first rotary clutch portion. The actuator member is axially movable along the rotary axis between a first position and a second position. Placement of the actuator member in the first position permits frictional engagement between two components of the clutch assembly that causes the first rotary clutch portion to tend to rotate with the input member such that the wrap spring drivingly engages the inner clutch surface and transmits rotary power to the second rotary clutch portion. The two components of the clutch assembly are not frictionally engaged when the actuator member is in the second position such that the wrap spring is not drivingly engaged to the interior clutch surface to thereby decouple the input member from the output member.

In another form, the teachings of the present disclosure provide at least one of the following:

a clutch assembly that may be selectively engaged and/or disengaged by controlling a teasing torque that is input to a wrap spring;

a clutch assembly for an automotive accessory that may be selectively engaged and/or disengaged by application of a current that is less than or equal to 1.5 amps;

a clutch assembly for an automotive accessory that may be selectively engaged and/or disengaged by application of electrical power that is less than or equal to 24 watts;

a driven accessory having a rotatable input member and a clutch assembly with a wrap spring and a drive member that is fixedly coupled to but formed separately from the input member, the wrap spring being engagable to the drive member to transmit rotary power through the clutch assembly;

a clutch assembly that is operated to control "stiction" between one or more components of the clutch assembly;

a clutch assembly with a heater;

a clutch assembly with a drive member, a wrap spring and an axially movable member, wherein the wrap spring is engagable to the drive member and is employed to bias the axially movable member in a predetermined direction;

a clutch assembly with a wrap spring wherein the wrap spring is installed to a cartridge or carrier;

a clutch assembly with a drive member and a wrap spring, wherein the wrap spring is configured to at least partly engage the drive member on a full time basis regardless of whether or not the clutch assembly is engaged or disengaged, the wrap spring more fully engaging the drive member when the clutch assembly is engaged;

a method for operating a clutch assembly having an actuator with an electromagnet and an axially movable actuator member that is movable by the electromagnet, the method comprising alternating a magnetic field produced by the electromagnet to reduce or eliminate residual magnetism in the actuator member;

a method for operating a clutch assembly having an actuator with an electromagnet and an axially movable actuator member that is movable by the electromagnet, the method comprising initiating movement of the actuator member by operating the electromagnet at a first power level and maintaining the axially movable member in a desired position with a second, relatively lower power level;

a method for operating a clutch assembly having an actuator with an electromagnet and an axially movable actuator member that is movable by the electromagnet, the method comprising controlling a position of the actuator member by controlling the magnetic field produced by the electromagnet;

a method for operating a clutch assembly having a drive member and a wrap spring, the method comprising engaging the wrap spring to the drive member to transmit rotary therebetween in a series of engaging pulsations;

a method for operating a clutch assembly having an actuator with an electromagnet and an axially movable actuator member that is movable by the electromagnet, the method comprising employing a characteristic associated with operation of the actuator to determine a position of the actuator member relative to the electromagnet;

a method for operating a clutch assembly having an actuator with an electromagnet and an axially movable actuator member that is movable by the electromagnet, the method comprising employing data from a sensor to determine a position of the actuator member relative to the electromagnet;

a method for operating a clutch assembly having a drive member and a wrap spring, the method comprising verifying engagement or disengagement of the wrap spring to/from the drive member based on data from a sensor that does not directly sense an operational state of the clutch assembly;

a method for operating a clutch assembly having an actuator with an axially movable actuator member that is employed to engage and/or disengage the clutch assembly, the method comprising determining an error in the operation of the clutch assembly and responsively generating an error message;

a method for operating a clutch assembly having an actuator with an electromagnet and an axially movable actuator member that is movable by the electromagnet, the method comprising employing a resistance of the electromagnet to determine an actual temperature of the electromagnet;

a method for operating a clutch assembly in a driven accessory in a vehicle, the method comprising detecting a presence of a fob proximate the vehicle and operating the clutch assembly to generate heat within the clutch assembly prior to operation of the vehicle;

a clutch assembly having an actuator with an electromagnet and an axially movable actuator member that is movable by the electromagnet, the actuator further comprising a voltage multiplier or an ultra capacitor;

a method for operating a water pump or other driven accessory in which one or more of the control strategies described in paragraphs [0151] through [0158];

a clutch assembly having a drive member, a wrap spring and an actuator for causing selective engagement of the wrap spring to the drive member to transmit rotary power through the clutch assembly, wherein the wrap spring is engaged to the drive member if the actuator fails;

a clutch assembly having a drive member, a wrap spring, an actuator that is employed to selectively engage and/or disengage the wrap spring to/from the drive member, wherein the actuator is controlled and powered solely through relatively small field effect transistors that are incapable of handling more than 2 amps of current;

a system comprising a clutch assembly and a valve, the clutch assembly having a drive member, a wrap spring, an actuator that is employed to selectively control engagement of the wrap spring to the drive member, wherein operation of the valve is coordinated with the operation of the actuator; and a method for controlling operation of an electric power generator in an automotive vehicle having an engine for providing rotary power to the electric power generator for rotating a rotor, the method comprising decoupling the rotor from the engine such that electric power is not generated by the electric power generator when a battery that is electrically coupled to the electric power generator is in a predetermined state of charge.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 10A is a perspective view depicting another configuration of the friction material that is shown in FIG. 10;

FIG. 32 is a perspective sectional view of a portion of another driven accessory constructed in accordance with the teachings of the present disclosure illustrating the operation of the clutch assembly in a disengaged mode;

FIG. 33 is a view similar to that of FIG. 33 but illustrating the clutch assembly as operating in an engaged mode;

DETAILED DESCRIPTION OF THE VARIOUS EMBODIMENTS

Figure 1:
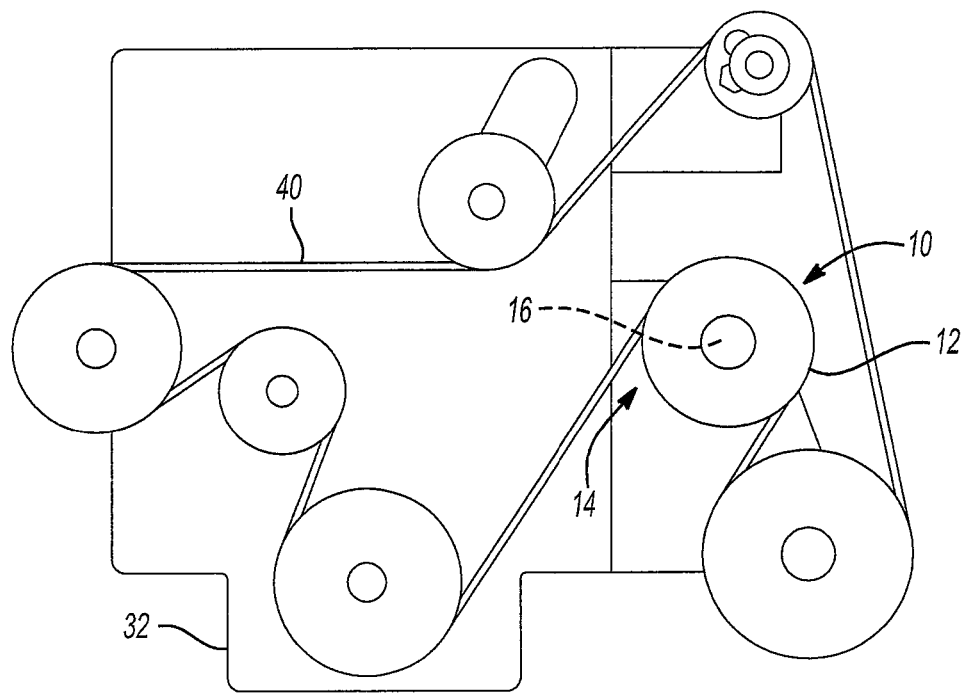
FIG. 1 is a schematic illustration of an engine having a driven accessory constructed in accordance with the teachings of the present disclosure.
Figure 2:
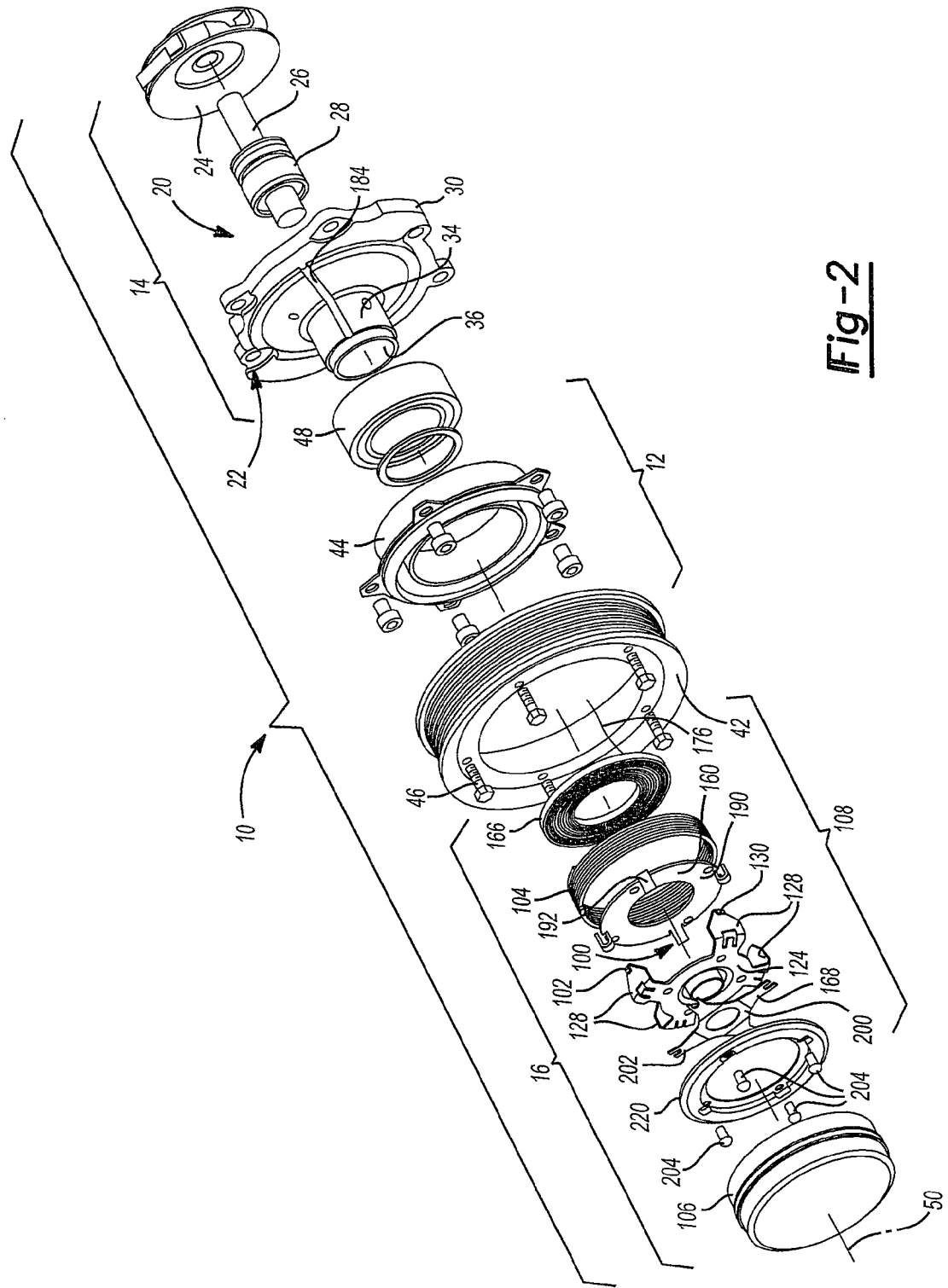
FIG. 2 is an exploded perspective view of the driven accessory of FIG. 1.
Figure 26:
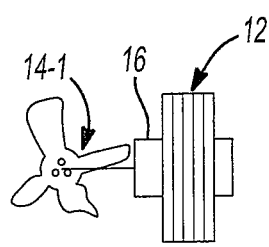
FIGS. 26 through 31 are schematic illustrations of driven accessories having an accessory portion other than a water pump but otherwise being constructed in accordance with the teachings of the present disclosure.
Figure 29:
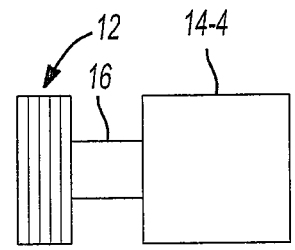
Figure 27:
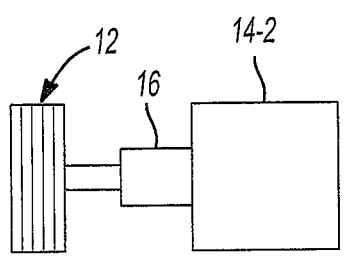
Figure 30:
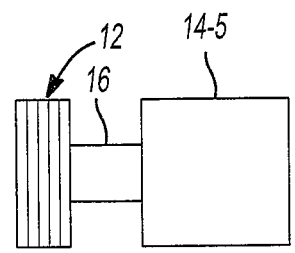
Figure 28:
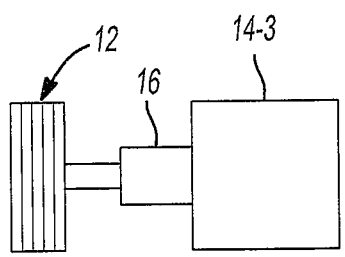
Figure 31:
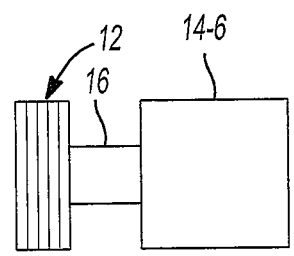

With reference to FIGS. 1 and 2 of the drawings, a driven accessory constructed in accordance with the teachings of the present disclosure is generally indicated by reference numeral 10. The driven accessory 10 can comprise an input member 12, a substantially conventional accessory portion 14 and a clutch assembly 16. In the particular example provided, the accessory portion 14 is a water pump assembly 20, but those of skill in the art will appreciate that the depiction of a water pump assembly 20 is merely illustrative of one application of the present teachings and that the present teachings have application to various other types of engine accessories, such as cooling fans 14-1 (FIG. 26); starter-generators or alternator-starters 14-2 (FIG. 27); air conditioning compressors 14-3 (FIG. 28); power steering pumps 14-4 (FIG. 29); generators or alternators 14-5 (FIG. 30); pumps including vacuum pumps 14-6 (FIG. 31), blowers, super chargers, power take-offs, etc., as well as accessories that are driven by other power sources, including motors (e.g., electrically-power or fluid-powered motors). Moreover, while the present teachings are depicted in an automotive or vehicle context, it will be appreciated that the teachings of the present disclosure have application to drive systems (i.e., systems for transferring motion, including systems that transfer rotary motion) generally.

The water pump assembly 20 can include a housing 22, an impeller 24, a drive shaft 26 and a bearing-and-seal assembly 28. The housing 22 can define a flange member 30, which can be configured to be mounted to an engine 32, a neck 34, which can extend from a front side of the flange member 30, and a bore 36 that can extend through the flange member 30 and the neck 34. The bearing-and-seal assembly 28 can be received in the bore 36 and fixedly engaged to the housing 22, for example via an interference fit. The drive shaft 26 can extend through the housing 22 and the bearing-and-seal assembly 28 can journally support the drive shaft 26 for rotation relative to the housing 22. The impeller 24 can be coupled to the drive shaft 26 in a conventional manner for rotation therewith.

The input member 12 can be configured to transmit rotary power into and/or out of the driven accessory depending on the configuration of the driven accessory 10 and can have any configuration that is adapted to transmit rotary power. Exemplary configurations include, without limitation: rollers; pulleys; sprockets; and/or gears. In the example provided, the input member 12 is configured to transmit rotary power from a source of rotary power (e.g., a drive belt 40) to the accessory portion 14 and comprises a sheave 42 and a sheave spacer 44 that are fixedly coupled to one another via a plurality of threaded fasteners 46. A bearing 48 can be mounted on the neck 34 of the housing 22 and can support the input member 12 for rotation about an axis that is coincident with a rotational axis 50 of the drive shaft 26. If necessary, an element such as a spacer can be disposed between the bearing 48 and the electromagnet 166 to provide an axial retaining force for the bearing 48.

Figure 3:
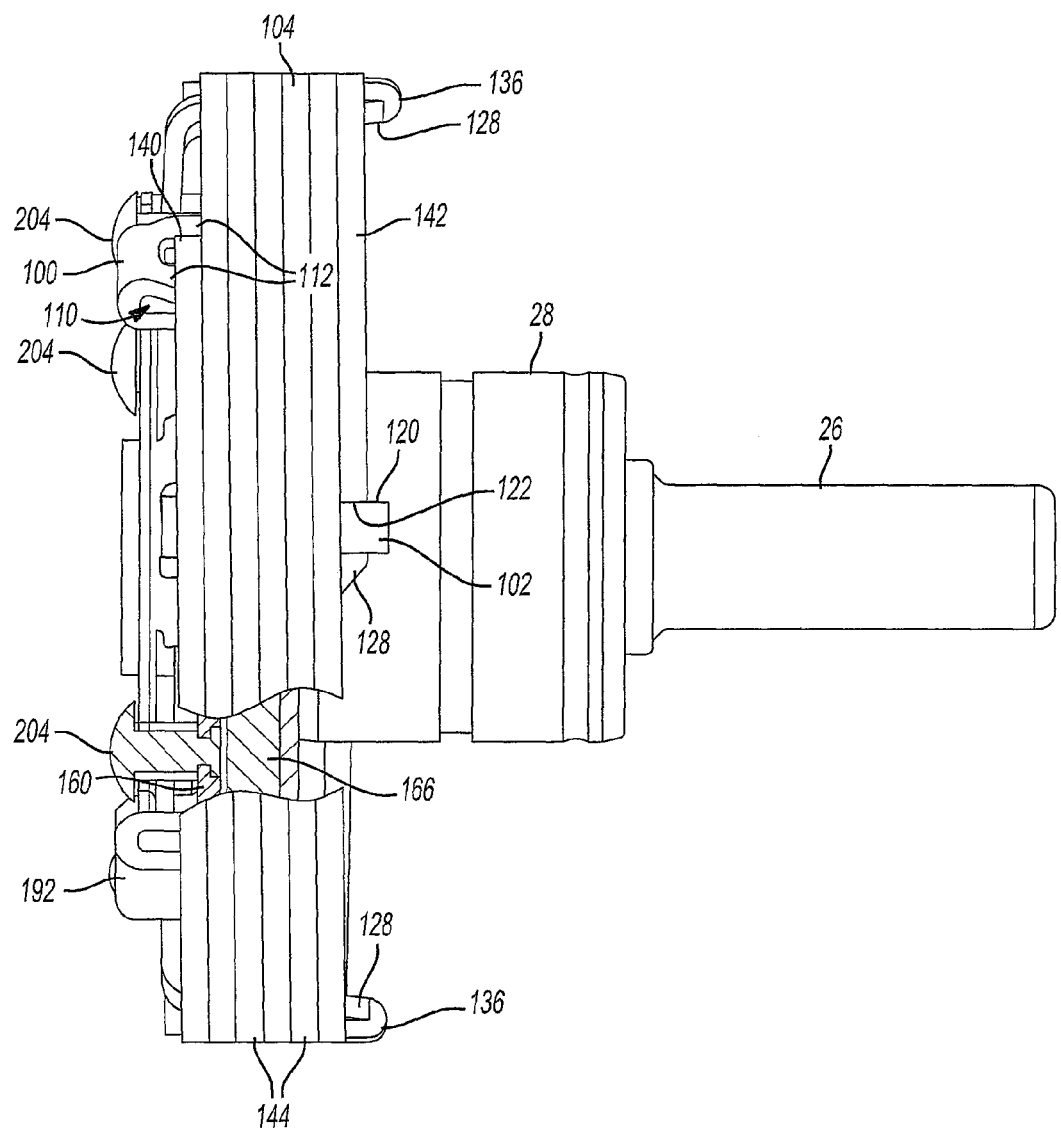
FIG. 3 is a side elevation view of a portion of the driven accessory of FIG. 1 and illustrating a portion of a clutch assembly of the driven accessory in more detail.
Figure 4:
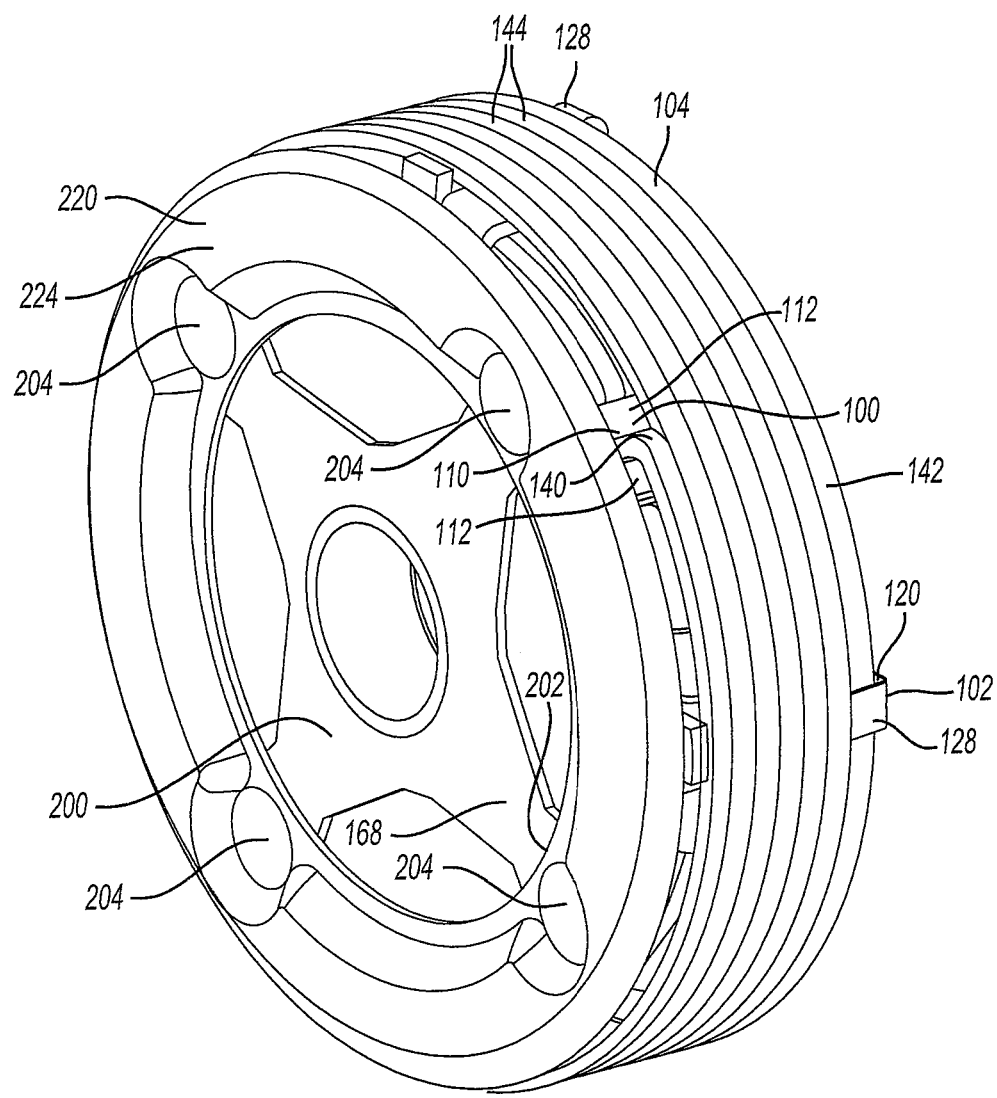
FIG. 4 is a perspective view of a portion of the driven accessory of FIG. 1 illustrating a portion of the clutch assembly in more detail.
Figure 5:
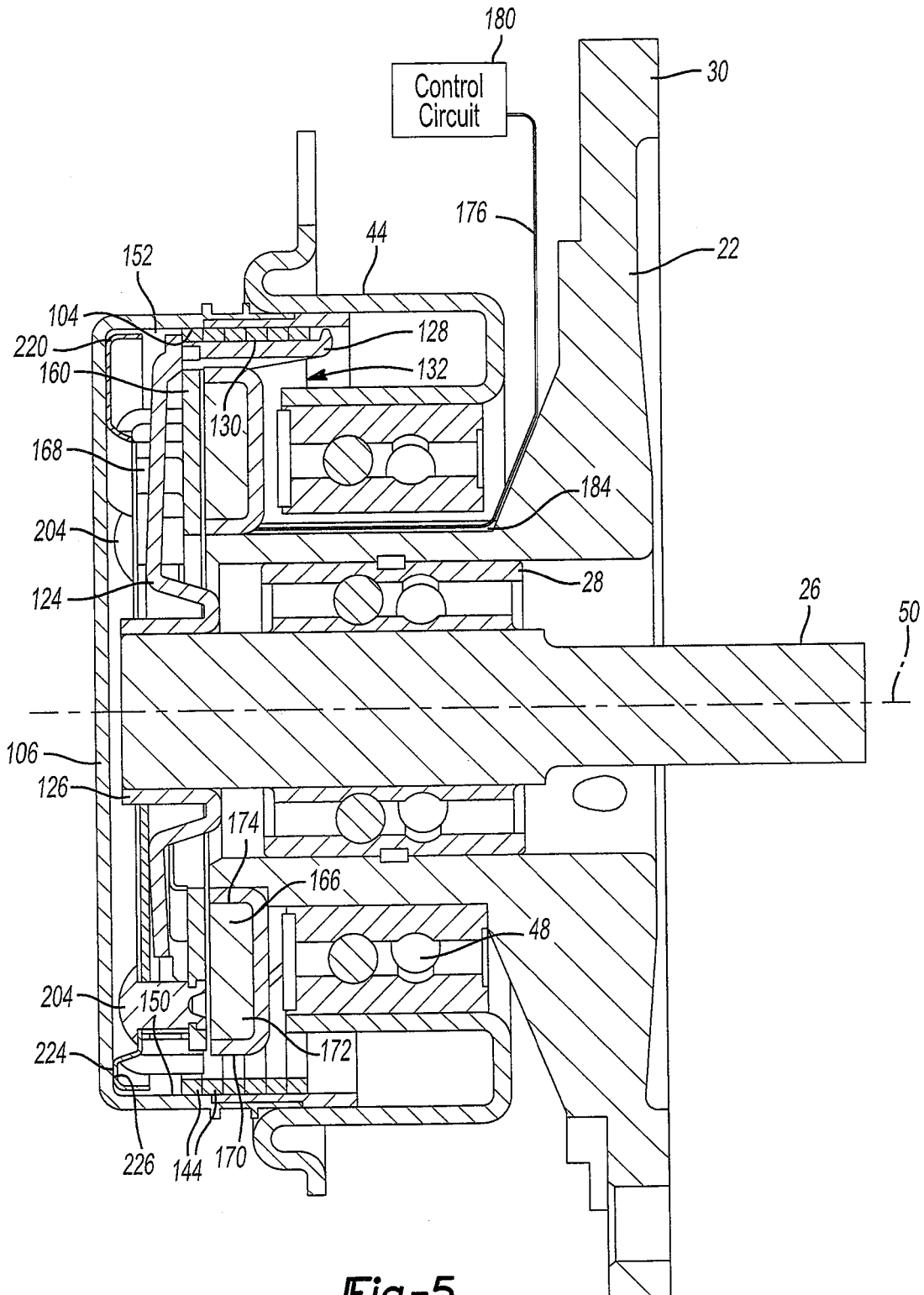
FIG. 5 is a section view of a portion of the driven accessory of FIG. 1 taken longitudinally along the rotational axis of an output member of the driven accessory.

With reference to FIGS. 2 through 4, the clutch assembly 16 can be configured to selectively couple the input member 12 and an input of the accessory portion 14 (i.e., the drive shaft 26 in the particular example provided) to transmit rotary power therebetween. The clutch assembly 16 can comprise a first rotary clutch portion 100, a second rotary clutch portion 102, a wrap spring 104, a drive member 106 and an actuator 108.

The first rotary clutch portion 100 is rotatably disposed about the rotational axis 50 of the driven accessory 10 and as will be discussed in more detail below, can serve as an element that can be employed to input a drag force to the wrap spring 104 to thereby control the operation of the clutch assembly 16. The first rotary clutch portion 100 can comprise any means for imparting a torsional control signal to the wrap spring 104 and in the particular example illustrated, includes a fork 110 having bifurcated fork members 112.

The second rotary clutch portion 102 can comprise a driver surface 120 against which an axial end face 122 of the wrap spring 104 opposite the first rotary clutch portion 100 can abut. In the particular example provided, the second rotary clutch portion 102 is integrally formed with a clutch output member or driver member 124 that can include a coupling portion 126 and one or more legs 128. The coupling portion 126 can be fixedly coupled to the drive shaft 26 such that rotation of the driver member 124 causes corresponding rotation of the drive shaft 26 in the example provided. The leg or legs 128 can be coupled to the coupling portion 126 and can extend in radially outward and axial (i.e., parallel to the rotational axis of the drive shaft 26) directions so as to form an annular support surface 130 and an annular channel 132 (FIG. 4) that faces toward the housing 22. The distal end of the leg or legs 128 can define one or more abutments 136. The driver surface 120 can be coupled to the leg or to one of the legs 128 and in the particular example provided, is defined by an edge of one of the legs 128.

The wrap spring 104 can be formed of a spring wire having a desired cross-sectional shape, such as round, square or rectangular, and can comprise a first end or control tang 140, a second end 142, and a plurality of helical coils 144 disposed between the first and second ends 140 and 142. The first end 140 of the wrap spring 104 can be engaged to the first rotary clutch portion 100 to receive a torsional input therefrom. In the particular example provided, the control tang 140 is a generally straight segment of wire that extends radially inwardly from the helical coils 144. It will be appreciated, however, that the control tang 140 could be oriented differently. The first end 140 of the wrap spring 104 can be received between the bifurcated fork members 112 in the fork 110 to fixedly couple the first end 140 of the wrap spring 104 to the first rotary clutch portion 100. The abutments 136 on the leg or legs 128 can abut an axial end of the wrap spring 104 on a side opposite the first rotary clutch portion 100.

The drive member 106 can be a discrete component or can be integrally formed with the input member 12. In the particular example provided, the drive member 106 is a cap or cup-like structure that is fixedly and sealingly engaged via an interference fit with the sheave spacer 44 of the input member 12. The drive member 106 can define an interior clutch surface 150 and can cooperate with one or more other components of the driven accessory 10 to define a cavity 152 into which various components of the clutch assembly 16, including the actuator, the wrap spring 104, the first rotary clutch portion 100 and the second rotary clutch portion 102 can be received. The helical coils 144 of the wrap spring 104 can be sized somewhat smaller in diameter than the diameter of the interior clutch surface 150 and can be configured to uncoil or expand into engagement with the interior clutch surface 150 to facilitate the transmission of rotary power between the input member 12 and the drive shaft 26 (hereinafter referred to as "driving engagement"). The amount of contact needed between the helical coils 144 and the interior clutch surface 150 will vary depending on various factors, including the magnitude of the load that will be transmitted through the clutch assembly 16, the size of the wrap spring 104 and the rotational speed of the input member 12 when the clutch assembly 16 is to be engaged and disengaged. In some instances, it may be desirable to employ a lubricant (e.g., a grease; an oil; a coating or plating on the wire that forms the wrap spring; a coating or plating on the drive member; or combinations thereof) between the interior clutch surface 150 and the helical coils 144 of the wrap spring 104.

The actuator 108 can comprise an actuator member 160, which can be coupled to the first rotary clutch member 100 for common rotation about the rotational axis 50, a means for moving the actuator member 160 axially along the rotational axis 50 between a first position and a second position and a means for generating a control torque that can be employed to bias the clutch assembly 16 into a predetermined condition (i.e., an engaged condition or a disengaged condition) as will be discussed in detail, below.

In the particular example provided, the actuator 108 further comprises an electromagnet 166 and a return spring 168, and the actuator member 160 is an armature. It will be appreciated, however, that other means for axially moving the actuator member 160 may be employed. Such means may be powered electrically, hydraulically or pneumatically, for example, and may employ any type of linear motor or actuator that is configured to produce an axially directed output. Exemplary devices include without limitation cylinders, ball ramp actuators, solenoids, shape memory alloy actuators that can expand or contract in response to the application of electrical energy or heat thereto, piezo-electric actuators, screw-type actuators, magnetostrictive actuators, electrostrictive actuators, and actuators that employ electroactive polymers.

The electromagnet 166 can be fixedly coupled to the housing 22 and can include an annular shell member 170 and a coil 172. In the illustrated example, the annular shell member 170 is fixedly coupled to the neck 34 of the housing 22 via an interference fit. The annular shell member 170 can define a shell cavity 174 that can be shaped in the form of an annular U-shaped channel. It will be appreciated, however, that the shell cavity 174 could be shaped differently. The coil 172 can be received into the shell cavity 174 and if desired, a potting compound can be employed to electrically insulate the coil 172 as well as to fixedly couple the coil 172 to the annular shell member 170. A pair of electrical leads or terminals 176 can be employed to electrically couple the coil 172 to a control circuit 180. The terminals 176 can be disposed in any convenient location and can be terminated in any appropriate manner, such as a multi-terminal connector (not shown) that may be fixedly and electrically coupled to a wire harness (not shown). In the particular example provided, the terminals 176 are received in a groove 184 that extends axially along the outer surface of the neck 34 and into the flange member 30. Configuration in this manner permits the terminals 176 to be received between the neck 34 and the bearing 48 that supports the input member 12 for rotation on the neck 34.

The actuator member 160 can comprise a body 190, which can have an annular plate-like shape, and one or more hook members 192 that can be coupled to at the outer periphery of the body 190. The body 190 can be received over the drive shaft 26 and disposed in the annular channel 132. The leg or legs 128 of the driver member 124 and/or the hook members 192 of the actuator member 160 can be received in the wrap spring 104 such that the annular support surface 130, an outer surface of the hook members 192 or both support the wrap spring 104 concentrically about the rotational axis 50. The fork 110 of the first rotary clutch member 100 can be fixedly coupled to (e.g., integrally formed with) one of the hook members 192.

The return spring 168 can include a spring body 200, which can abut the leg or legs 128 of driver member 124, and a plurality of spring arms 202 that can be fixedly (axially) and rotatably coupled to the actuator member 160 via a plurality of rivets 204. In the example provided, the spring aims 202 cooperate to bias the actuator member 160 toward the driver member 124 and away from the electromagnet 166.

The means for generating a control torque can comprise a drag member or teaser 220 that can be rotatably coupled to the actuator member 160 for rotation therewith. In the particular example provided, the teaser 220 is a discrete component that is fixedly coupled to the return spring 168 and the actuator member 160 (so as to rotate and axially translate with the actuator member 160), but it will be appreciated that the teaser 220 can be integrally formed with the actuator member 160 or another component of the clutch assembly 16 in the alternative. The teaser 220 can comprise a first teasing surface 224 that can be biased into engagement with a second teasing surface 226 via the return spring 168 to create a drag force as will be described in more detail below. In the example provided, the second teasing surface 226 is formed on a radially extending interior surface of the drive member 106 that is perpendicular to the rotational axis 50.

In operation, rotation of the input member 12 in a predetermined rotational direction will cause corresponding rotation of the interior clutch surface 150 of the drive member 106. When the actuator 108 is not activated, the actuator member 160 is positioned in the first position as a result of the biasing force applied by the return spring 168. The return spring 168 also biases the first teasing surface 224 of the teaser 220 into frictional engagement with the second teasing surface 226 on the drive member 106 and consequently, a rotary drag force is created that causes the teaser 220 (and therefore the return spring 168, the actuator member 160 and the first rotary clutch member 100) to rotate with the drive member 106 in the predetermined rotational direction. Rotation of the first rotary clutch member 100 in the predetermined rotational direction causes corresponding rotation of the control tang 140 of the wrap spring 104; the remainder of the wrap spring 104, however, does not initially rotate with the control tang 140. It will be appreciated that rotation of the impeller 24 is associated with a rotary load (due to the circulation of cooling water) and that such rotary load will (initially) resist rotation of the second end 142 of the wrap spring 104 in the predetermined direction. Accordingly, movement of the control tang 140 in the predetermined rotational direction in combination with the inhibiting or hindering of the movement of the second end 142 of the wrap spring 104 in the predetermined rotational direction produces movement of the first end 140 relative to the second end 142 that causes the helical coils 144 of the wrap spring 104 to uncoil or unwind to engage the interior clutch surface 150 and drivingly couple the wrap spring 104 to the drive member 106. Rotary power input to the wrap spring 104 can be transmitted axially (i.e., longitudinally along the wire that forms the wrap spring 104) through axial end face 122 of the second end 142 and into the leg 128 on the second rotary clutch member 102 onto which the driver surface 120 is formed to drive the drive shaft 26 (and therefore the impeller 24) in the predetermined rotational direction. It will be appreciated that the wrap spring 104 can be wound in a desired direction so that loading of the wrap spring 104 as a result of the application of the rotary drag to the first end 140 can tend to further unwind or uncoil the wrap spring 104 such that the helical coils 144 drivingly engage the interior clutch surface 150. It will also be appreciated that in the particular configuration illustrated and described, a compressive load is applied to the axial end face 122 of the wrap spring 104 when the clutch assembly 16 is activated (i.e., transmitting rotary power) and that the second end 142 is not subjected to bending and/or shear loads. It will be appreciated, however, that the second end 142 of the wrap spring 104 can be interfaced with the second rotary clutch member 102 in an alternative manner if desired.

The actuator 108 can be activated to translate the actuator member 160 axially into the second position. In the particular example provided, activation of the actuator 108 comprises providing electrical power to the electromagnet 166 such that the electromagnet 166 generates a magnetic field that attracts or pulls the actuator member 160 into the second position despite the biasing force that is applied to the actuator member 160 via the return spring 168. Since the teaser 220 is coupled for translation with the actuator member 160, translation of the actuator member 160 causes corresponding translation of the teaser 220 such that the first teasing surface 224 is not frictionally engaged to the second teasing surface 226 and the rotary drag is not produced. Moreover, when positioned in the second position, the actuator member 160 can optionally contact or abut the electromagnet 166 to apply a drag force to the actuator member 160 that resists rotation of the actuator member 160 (relative to the housing 22) in the predetermined rotational direction. Consequently, the teaser 220 does not rotate with the drive member 106 and the control tang 140 of the wrap spring 104 is not rotated in the predetermined direction. Moreover, as at least a portion of the coils 144 of the wrap spring 104 are in frictional contact with the interior clutch surface 150, at least some of the coils 144 and the second end 142 will tend to rotate in the predetermined rotational direction, causing rotation of the second end 142 of the wrap spring 104 relative to the control tang 140 in a direction that tends to wind or coil the wrap spring 104 more tightly. Accordingly, the wrap spring 104 does not uncoil or unwrap to drivingly engage the interior clutch surface 150 of the drive member 106 to transmit rotary power into the clutch assembly 16 from the input member 12.

It will be appreciated that the driven accessory 10 depicted in FIGS. 1-5 and described above has several advantageous characteristics. For example, the driven accessory 10 is well suited for operation (i.e., engagement and disengagement) at low rotational speeds, as well as at high rotational speeds, such as rotational speeds in excess of 800 rotations per minute (rpm), and preferably rotational speeds in excess of 1,500 rpm, and more preferably rotational speeds in excess of 2,000 to 3,000 rpm; the driven accessory 10 is well suited for the sustained transmission of relatively high torsional loads, such as a nominal peak torsional load that is greater than or equal to 10 Nm, preferably a nominal peak torsional load that is greater than or equal to 15 Nm, and more preferably a nominal peak torsional load that is greater than or equal to 20 Nm; and the clutch assembly 16 is configured to employ relatively little electrical power (e.g., a current of 2 or fewer amps, preferably a current of 1.5 or fewer amps and more preferably a current of 1.0 or fewer amps). It will be appreciated that the driven accessory 10 may be maintained in engagement when driven at relatively high rotational speeds, such as speeds greater than or equal to 5,000 rpm and that the amount of torque that may be transmitted through the clutch assembly 16 can increase as the rotational speed at which the clutch assembly 16 is driven increases. It will also be appreciated that the clutch assembly 16 of the driven accessory 10 can be scaled up or down as needed to handle more or less torque and that at present, we are of the opinion that the clutch assembly 16 could be scaled up to transmit a torsional load in excess of 100 to 150 Nm.

Depending upon the load at drive shaft 26 and/or the torque applied to input member 12, the engagement of clutch assembly 16 as the wrap spring 104 expands and engages the interior clutch surface 150 could result in the transmission of a relatively large transient peak torque through the clutch assembly 16. If such peak transient torque loads are a concern, it is contemplated that the teaser 220 can be configured with a predetermined amount of rotational inertia so that any sudden transfer of relatively high levels of torque as the clutch assembly 16 begins to engage will be mitigated as the inertia of teaser 220 will resist a sudden, large acceleration of the wrap spring 104. Thus the teaser 220 and the actuator member 160 to which it is attached, will trail behind the second rotary clutch member 102 such that a control signal or torque will be applied to the first end 140 of the wrap spring 104 via the first rotary clutch portion 100 to cause the helical coils 144 to coil or wrap more tightly to partially release the wrap spring 104 from interior clutch surface 150, allowing for some slippage to occur therebetween. In this manner, relatively large transient peak torque levels which might otherwise occur during engagement of clutch assembly 16 can be reduced.

It will be appreciated that the "at rest" diameter of the wrap spring 104 can be selected to be slightly smaller than the inner diameter of interior clutch surface 150 to reduce wear which may otherwise occur between the wrap spring 104 and interior clutch surface 150 when the clutch assembly 16 is disengaged (i.e., when the helical coils 144 of the wrap spring 104 are drivingly disengaged from the interior clutch surface 150 so as to transmit torque between the drive member 106 and the wrap spring 104 having a magnitude that is insufficient to maintain operation of the accessory portion 14). It is contemplated, however, that in some circumstances it may be desirable to employ a wrap spring 104 that has an "at rest" diameter that is slightly larger than the diameter of interior clutch surface 150. In such a case, the teaser 220 may be omitted and operation of this embodiment of the clutch assembly 16 can be substantially similar to that described above with the exception that, once the actuator 108 is de-energized, allowing the actuator member 160 to move independently of the electromagnet 166, the helical coils 144 of the wrap spring 104 can automatically expand or uncoil and thus re-engage the interior clutch surface 150 without the requirement of an input torque signal from the omitted teaser 220.

As should now be apparent to those of skill in the art, employment of the clutch assembly 16 is not limited to circumstances in which it is desired to control the transfer of torque, through the clutch assembly 16, from an accessory drive (e.g., drive belt 40 in FIG. 1) to the accessory (the water pump 20 in this example). It will be appreciated that the clutch assembly 16 can also, or alternatively, be employed in situations where torque is transferred from an accessory (such as an electric starter) to an accessory drive.

It will be appreciated that the clutch assembly could be configured in a normally disengaged state and that the actuator could be operated to cause engagement of the clutch assembly. For example, the return spring 168 could be configured to bias the actuator member 160 into the second position and the electromagnet 166 could be operated to repel the actuator member 160 such that the actuator member 160 is disposed in the first position.

Figure 6:
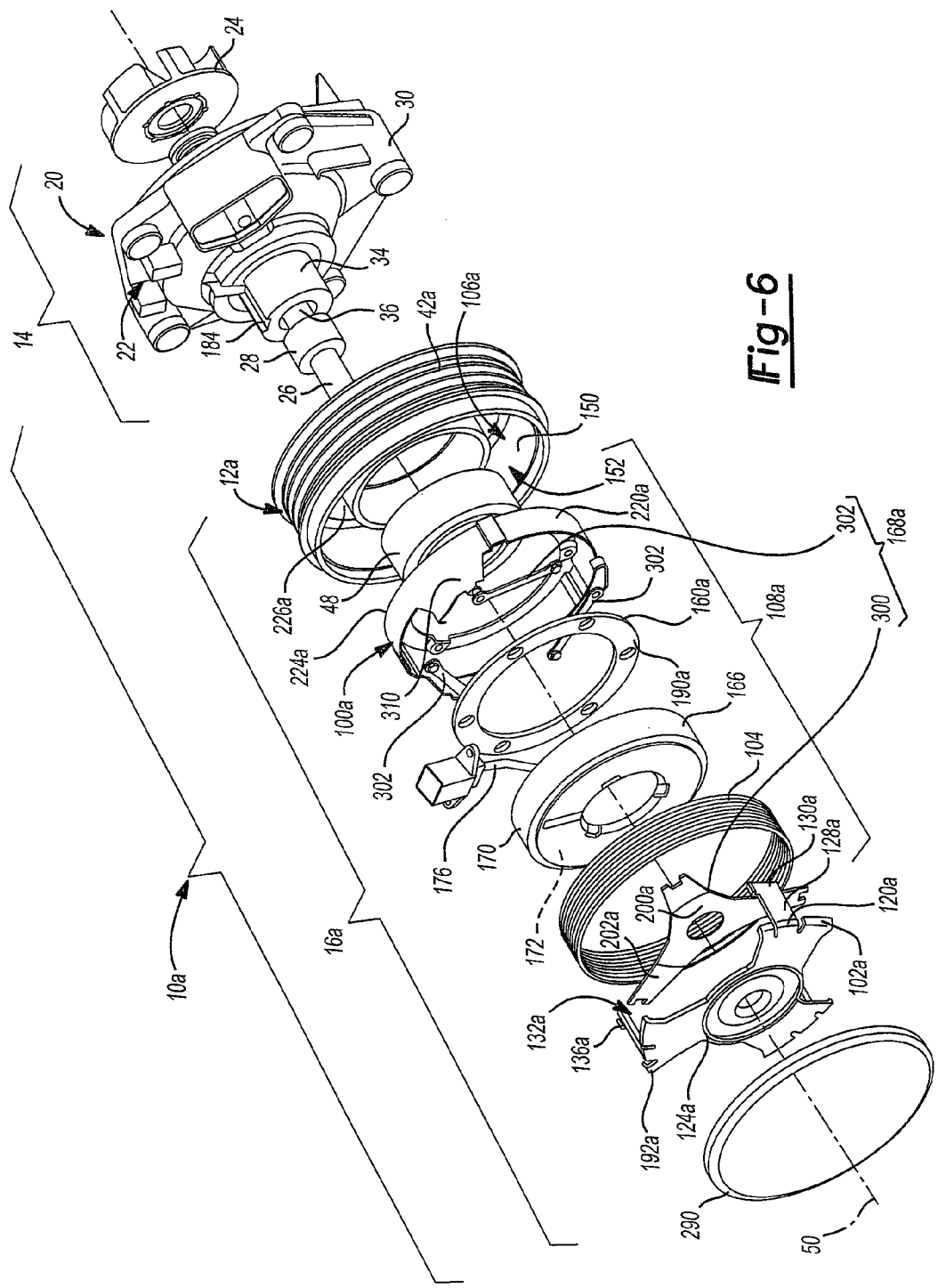
FIG. 6 is an exploded perspective view of another driven accessory constructed in accordance with the teachings of the present disclosure.
Figure 7:
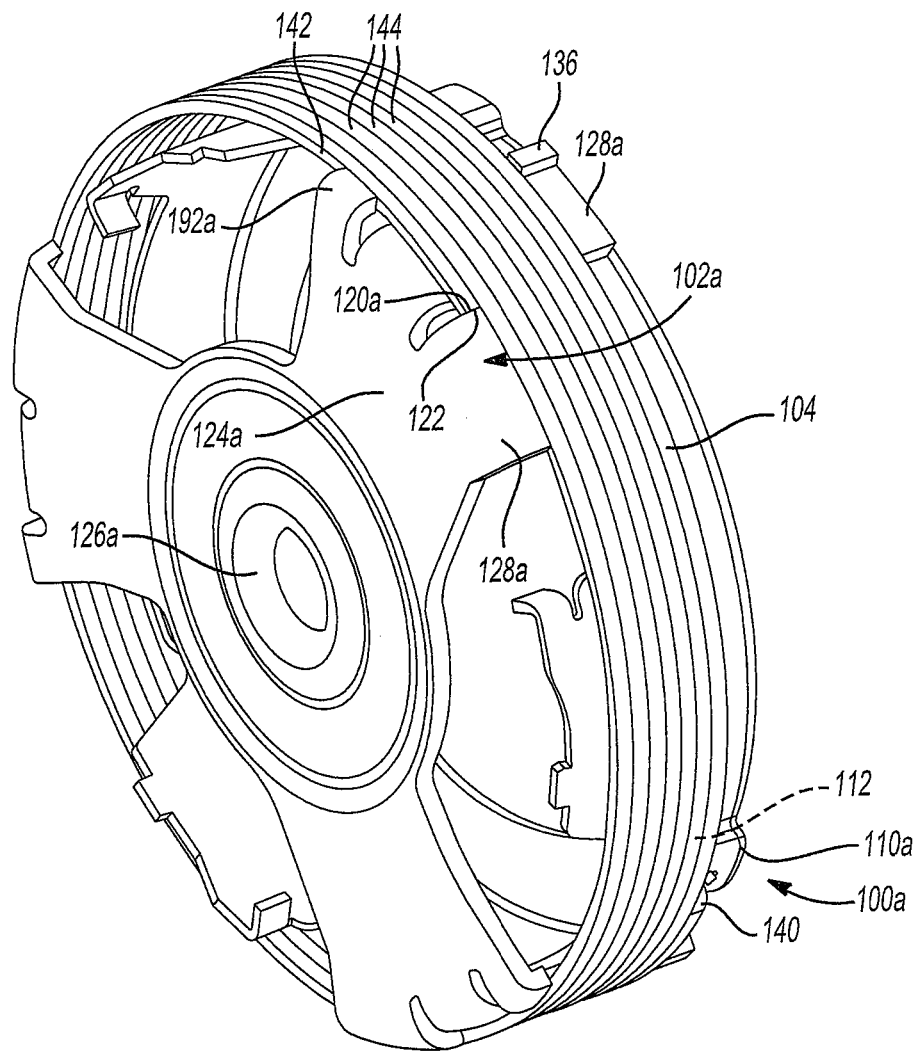
FIG. 7 is a perspective view of a portion of the driven accessory of FIG. 6, illustrating a portion of a clutch assembly in more detail.
Figure 8:
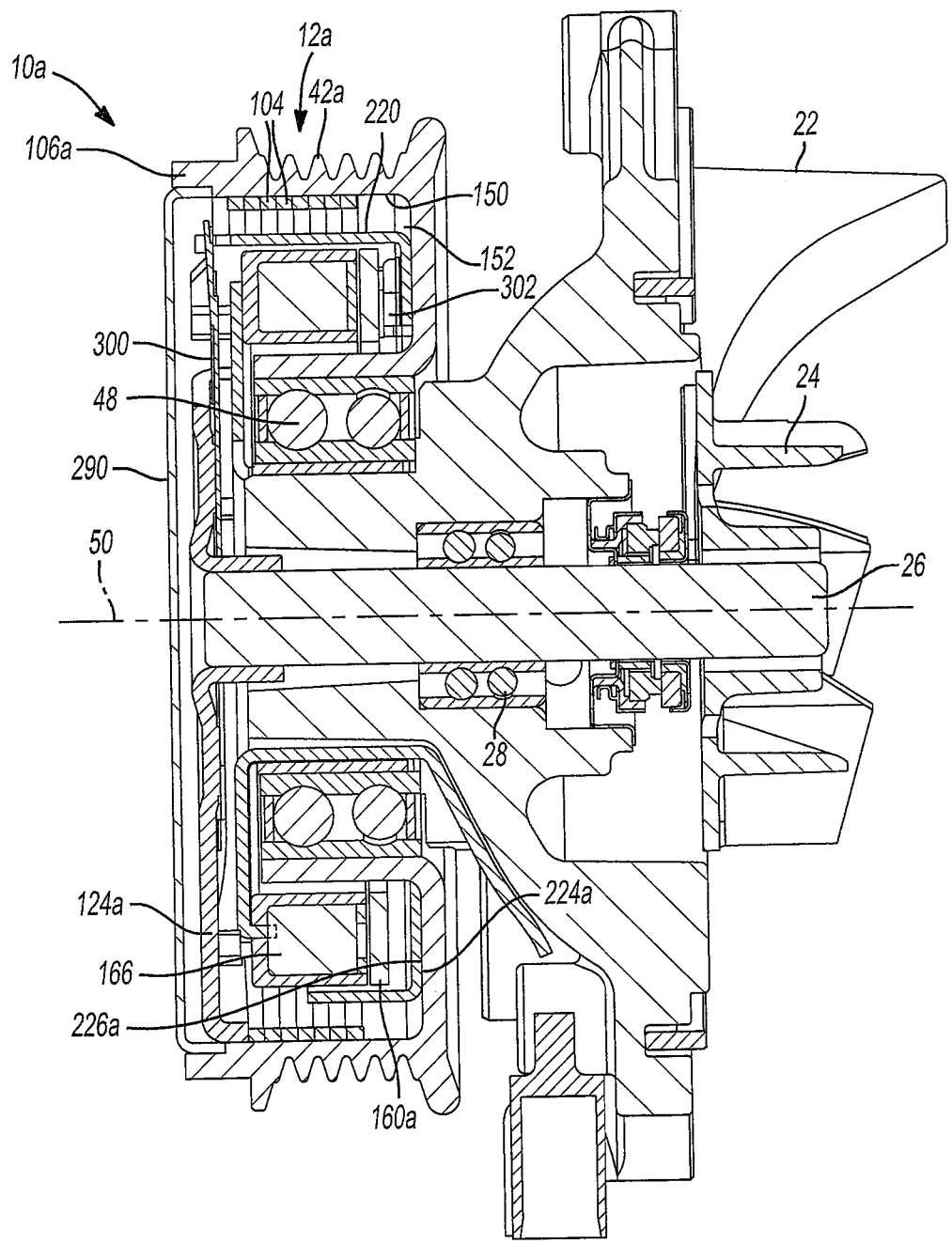
FIG. 8 is a section view of the driven accessory of FIG. 6 taken longitudinally along the rotational axis of an output member of the driven accessory.

With reference to FIGS. 6 through 8, another driven accessory constructed in accordance with the teachings of the present disclosure is generally indicated at reference numeral 10a. The driven accessory 10a can comprise an input member 12a, the substantially conventional accessory portion 14 and a clutch assembly 16a. As with the example of FIGS. 1-5, the accessory portion 14 is depicted as being a water pump assembly, but those of skill in the art will appreciate from this disclosure that various other types of driven accessories or driving accessories could be employed in the alternative. In the particular example provided, the input member 12a comprises a sheave 42a and is supported by the bearing 48 for rotation on the neck 34 of the housing 22 for rotation about the rotational axis 50 of the drive shaft 26.

The clutch assembly 16a can comprise a first rotary clutch portion 100a, a second rotary clutch portion 102a, the wrap spring 104, a drive member 106a and an actuator 108a.

The first rotary clutch portion 100a is rotatably disposed about the rotational axis 50 of the driven accessory 10a and as will be discussed in more detail below, can serve as an element that can be employed to input a rotary drag force or control torque to the wrap spring 104 to thereby control the operation of the clutch assembly 16a. The first rotary clutch portion 100a can comprise any means for imparting a torsional control signal to the wrap spring 104 and in the particular example illustrated, includes a fork 110a having bifurcated fork members 112a.

The second rotary clutch portion 102a can comprise a driver surface 120a against which an axial end face 122 of the wrap spring 104 opposite the first rotary clutch portion 100a can abut. In the particular example provided, the second rotary clutch portion 102a is integrally formed with a clutch output member or driver member 124a that can include a coupling portion 126a, one or more legs 128a and one or more hook members 192a. The coupling portion 126a can be fixedly coupled to the drive shaft 26 such that rotation of the driver member 124a causes corresponding rotation of the drive shaft 26 in the example provided. The leg or legs 128a can be coupled to the coupling portion 126a and can extend in radially outward and axial (i.e., parallel to the rotational axis 50 of the drive shaft 26) directions so as to faun an annular support surface 130a and an annular channel 132a that faces toward the housing 22. The distal end of the leg or legs 128a can define one or more abutments 136a. The driver surface 120a can be coupled to the leg or to one of the legs 128a and in the particular example provided, is defined by an edge of one of the legs 128a. The hook member or members 192a can be coupled to the leg or legs 128a and can abut the wrap spring 104 on a side opposite the abutment(s) 136a. It will be appreciated that the abutment(s) 136a and the hook member(s) 192a can cooperate to confine the wrap spring 104 in an axial direction (i.e., axially along the rotational axis 50) on the driver member 124a, which may help to make the clutch assembly 16a somewhat easier to assemble in some situations.

In the particular example provided, the drive member 106a is integrally formed with the input member 12a and defines an interior clutch surface 150 and a cavity 152 into which various components of the clutch assembly 16a, including the actuator 108a, the wrap spring 104, the first rotary clutch portion 100a and the second rotary clutch portion 102a can be received. The helical coils 144 of the wrap spring 104 can be configured to engage the interior clutch surface 150 to facilitate the transmission of rotary power between the input member 12a and the drive shaft 26. As noted above, it may be desirable to employ a lubricant (e.g., a grease; an oil; a coating or plating on the wire that forms the wrap spring; a coating or plating on the drive member; or combinations thereof) between the interior clutch surface 150 and the helical coils 144 of the wrap spring 104.

The actuator 108a can comprise an actuator member 160a, which can be coupled to the first rotary clutch member 100a for common rotation about the rotational axis 50, a means for moving the actuator member 160a axially along the rotational axis 50 between a first position and a second position and a means for generating a control torque that can be employed to bias the clutch assembly 16a into a predetermined condition (i.e., an engaged condition or a disengaged condition) as will be discussed in detail, below.

In the particular example provided, the actuator 108a further comprises an electromagnet 166 and a return spring 168a, and the actuator member 160a is an armature. As will be appreciated from the discussion above, other means for axially moving the actuator member 160a may be employed in the alternative.

The electromagnet 166 can be fixedly coupled to the housing 22 and can include an annular shell member 170, a coil 172 and a pair of electrical leads or terminals 176. The terminals 176 can be configured to electrically couple the coil 172 to a source of electrical power and can be routed in a groove 184 in the housing 22 beneath the bearing 48.

The actuator member 160a can comprise a body 190a that can have an annular plate-like shape. The body 190a can be received over the drive shaft 26 and disposed in the annular channel 132a.

The return spring 168a can bias portions of the clutch assembly 16a into desired positions and/or to provide compliance between various components within the clutch assembly 16a. In the particular example provided, the return spring 168a comprises a first spring 300 and a second spring 302. The first spring 300 can comprise a spring body 200a, which can abut the coupling portion 126a of the driver member 124a, and a plurality of spring arms 202a. The second spring 302 can comprise a plurality of springs, such as leaf springs, that can be fixedly coupled to the actuator member 160a at a first end.

The means for generating a control torque can comprise a drag member or teaser 220a that can be coupled to the actuator member 160a for rotation and axial movement therewith. In the particular example provided, the teaser 220a is a discrete component that is coupled to the actuator member 160a via the second spring 302, the purpose of which will be described in more detail below. More specifically, a first end of each of the leaf springs that comprise the second spring 302 can be axially fixed to the body 190a of the actuator member 160a, while a second, opposite end of each of the leaf springs can be axially fixed to the teaser 220a. The leg or legs 128a of the driver member 124a and an exterior surface 310 of the teaser 220a can be received in the wrap spring 104 such that the annular support surface 130, the exterior surface 310 or both support the wrap spring 104 concentrically about the rotational axis 50. The fork 110a of the first rotary clutch member 100a can be fixedly coupled to (e.g., integrally formed with) the teaser 220a. The spring arms 202a of the first spring 300 can be coupled to the teaser 220a (e.g., axially in-line with the point at which the second springs 302 are coupled to the teaser 220a) and can bias the teaser 220a in a predetermined axial direction. In the example provided, the spring aims 202a of the first spring 300 are configured to bias the teaser 220a axially away from the electromagnet 166 such that a first teasing surface 224a on the teaser 220a frictionally engages a second teasing surface 226a fowled on the drive member 106a.

A cap member 290 can be engaged to the drive member 106a and can be employed to close (and seal) the cavity 152 to prevent the ingress of dust, dirt and moisture into the cavity 152 and/or to prevent the egress of a lubricant received in the cavity 152.

In operation, rotation of the input member 12a in a predetermined rotational direction will cause corresponding rotation of the interior clutch surface 150a of the drive member 106a. When the actuator 108a is not activated, the actuator member 160a can be positioned in the first position as a result of the biasing force applied by the return spring 168a (i.e., the first spring 300 can bias the teaser 220a away from the electromagnet 166 and the second spring 302 can bias the actuator member 160a toward the teaser 220a and into the first position). The return spring 168a also biases the first teasing surface 224a of the teaser 220a into frictional engagement with the second teasing surface 226a on the drive member 106a and consequently, a rotary drag force is created that causes the teaser 220a (and therefore the first rotary clutch member 100a) to rotate with the drive member 106a in the predetermined rotational direction. Rotation of the first rotary clutch member 100a in the predetermined rotational direction causes corresponding rotation of the control tang 140 of the wrap spring 104; the remainder of the wrap spring 104, however, does not initially rotate with the control tang 140. It will be appreciated that rotation of the impeller 24 is associated with a rotary load (due to the circulation of cooling water) and that such rotary load will (initially) resist rotation of the second end 142 of the wrap spring 104 in the predetermined direction. Accordingly, movement of the control tang 140 in the predetermined rotational direction in combination with the hindering of the movement of the second end 142 of the wrap spring 104 in the predetermined rotational direction produces relative movement of the first end 140 relative to the second end 142 that causes the helical coils 144 of the wrap spring 104 to uncoil or unwind to engage the interior clutch surface 150 and drivingly couple the wrap spring 104 to the drive member 106a. Rotary power input to the wrap spring 104 can be transmitted axially (i.e., longitudinally along the wire that forms the wrap spring 104) through axial end face 122 of the second end 142 and into the leg 128a on the second rotary clutch member 102a onto which the driver surface 120a is formed to drive the drive shaft 26 (and therefore the impeller 24) in the predetermined rotational direction. It will be appreciated that the wrap spring 104 can be wound in a desired direction so that loading of the wrap spring 104 as a result of the application of the rotary drag to the first end 140 can tend to further unwind or uncoil the wrap spring 104 such that the helical coils 144 drivingly engage the interior clutch surface 150. It will also be appreciated that in the particular configuration illustrated and described, a compressive load is applied to the axial end face 122 of the wrap spring 104 when the clutch assembly 16a is activated (i.e., transmitting rotary power) and is not subjected to bending and/or shear loads. It will be appreciated, however, that the second end 142 of the wrap spring 104 can be interfaced with the second rotary clutch member 102a in an alternative manner if desired.

The actuator 108a can be activated to translate the actuator member 160a axially into the second position. In the particular example provided, activation of the actuator 108a comprises providing electrical power to the electromagnet 166 such that the electromagnet 166 generates a magnetic field that attracts or pulls the actuator member 160a into the second position despite the biasing force that is applied to the actuator member 160a via the return spring 168a. Since the teaser 220a is coupled to the actuator member 160a via the second spring 302, translation of the actuator member 160a causes corresponding translation of the teaser 220a such that the first teasing surface 224a is not frictionally engaged to the second teasing surface 226a and the rotary drag is not produced. Moreover, when positioned in the second position, the actuator member 160a can contact or abut the electromagnet 166 to apply a drag force to the actuator member 160a that resists rotation of the actuator member 160a (relative to the housing 22) in the predetermined rotational direction. Since the teaser 220a is rotationally coupled to the actuator member 160a (via the second spring 302), the teaser 220a does not rotate with the drive member 106a and the control tang 140 of the wrap spring 104 is not rotated in the predetermined direction. Moreover, as at least a portion of the coils 144 of the wrap spring 104 are in frictional contact with the interior clutch surface 150, at least some of the coils 144 and the second end 142 will tend to rotate in the predetermined rotational direction, causing rotation of the second end 142 of the wrap spring 104 relative to the control tang 140 in a direction that tends to wind or coil the wrap spring 104 more tightly to more fully disengage the helical coils 144 from the interior clutch surface 150. Accordingly, the wrap spring 104 does not uncoil or unwrap to drivingly engage the interior clutch surface 150 of the drive member 106a to transmit rotary power into the clutch assembly 16a from the input member 12a.

In some situations where a viscous fluid (e.g., oil, grease) is employed to lubricate the interface between the helical coils 144 and the interior clutch surface 150, a "stiction" condition may occur, particularly when ambient air temperatures are relatively low, in which the viscous fluid resists the movement of the first teasing surface 224a away from the second teasing surface 226a. Since the force exerted on the actuator member 160a by the electromagnet 166 varies with the square of the distance between the actuator member 160a and the electromagnet 166, and since the actuator member 160a is ordinarily at its greatest distance from the electromagnet 166 when the first and second teasing surfaces 224a and 226a are engaged to one another, the force exerted on the actuator member 160a by the electromagnet 166 to pull the actuator member 160a into the second position is at its weakest when the actuator member 160a is in the first position (i.e., when the first and second teasing surfaces 224a and 226a are engaged to one another in the example provided). If "stiction" occurs, the second spring 302 is configured to permit the actuator member 160a to move axially relative to the teaser 220a. In this regard, the force exerted by the electromagnet 166 onto the actuator member 160a in a first direction (toward the electromagnet 166) is greater than the force exerted by the second spring 302 onto the actuator member 160a in a second, opposite direction (toward the teaser 220a). It will be appreciated that as the actuator member 160a moves closer to the electromagnet 166 the force exerted on the actuator member 160a rapidly increases and in most circumstances can become sufficiently strong to pull the teaser 220a with the actuator member 160a so that the first teasing surface 224a is disengaged from the second teasing surface 226a.

Figure 9:
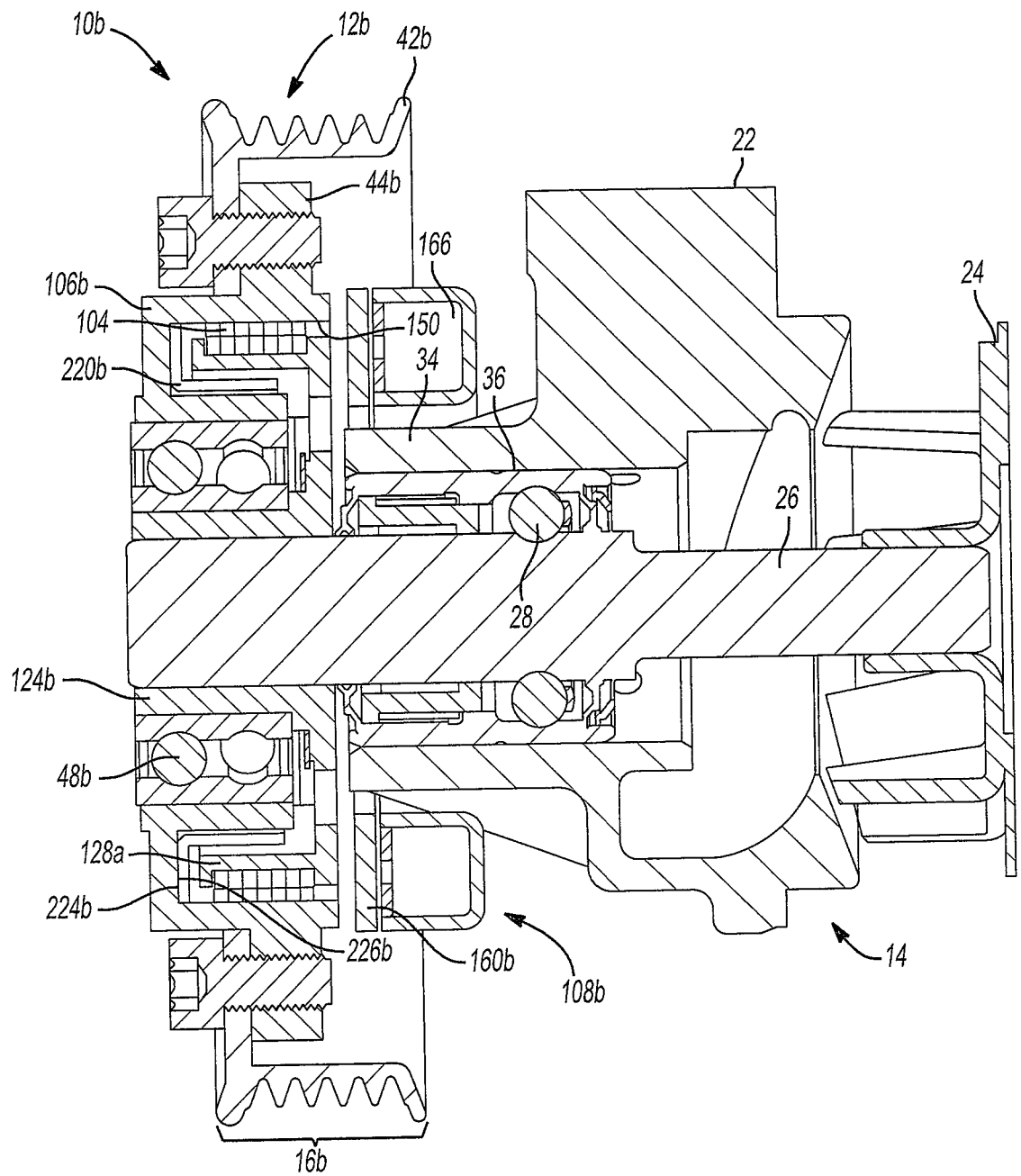
FIG. 9 is a section view of yet another driven accessory constructed in accordance with the teachings of the present disclosure, the view being taken longitudinally along the rotational axis of an output member of the driven accessory.

With reference to FIG. 9, another driven accessory constructed in accordance with the teachings of the present disclosure is generally indicated at reference numeral 10b. The driven accessory 10b can be generally similar to the driven accessory 10 illustrated in FIGS. 1-5, except that: the electromagnet 166 is fixedly coupled to the housing 22 at a location that is rearward of the sheave spacer 44b (which is coupled to the sheave 42b to form the input member 12b); the drive member 106b can be integrally formed with the sheave spacer 44b; the bearing 48b can be a sealed bearing; and the teaser 220b can be coupled to the actuator member 160b via springs that are similar to the second springs 302 (FIG. 6). Moreover, the first and second ends (not specifically shown) of the warp spring 104 can be coupled to the teaser 220b and the driver member 124b in a manner that is similar to that which is described above in conjunction with the example of FIGS. 6 through 8. Accordingly, it will be appreciated that a first rotary clutch member (not specifically shown) is coupled to the teaser 220b and that the driver member 124b is a portion of a second rotary clutch member. The springs (similar to the second springs 302 of FIG. 6) can bias a first teasing surface 224b on the teaser 220b into engagement with a second teasing surface 226b on the drive member 106b. Activation of the actuator 108b can draw the actuator member 160b toward the electromagnet 166 so that the clutch assembly 16b can operate in a manner that is similar to that which is described above.

Figure 10:
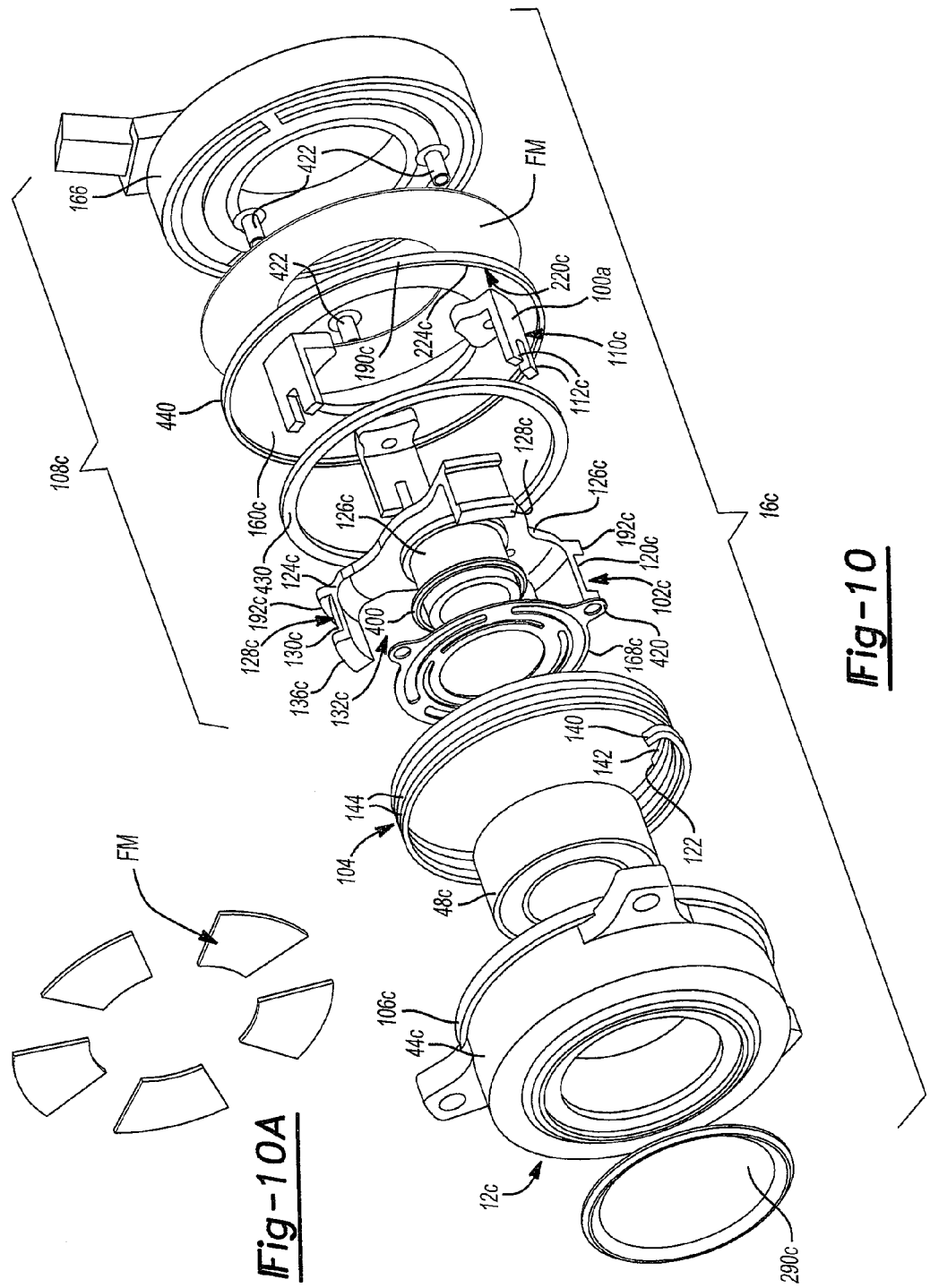
FIG. 10 is an exploded perspective view of a portion of another driven accessory constructed in accordance with the teachings of the present disclosure.
Figure 11:
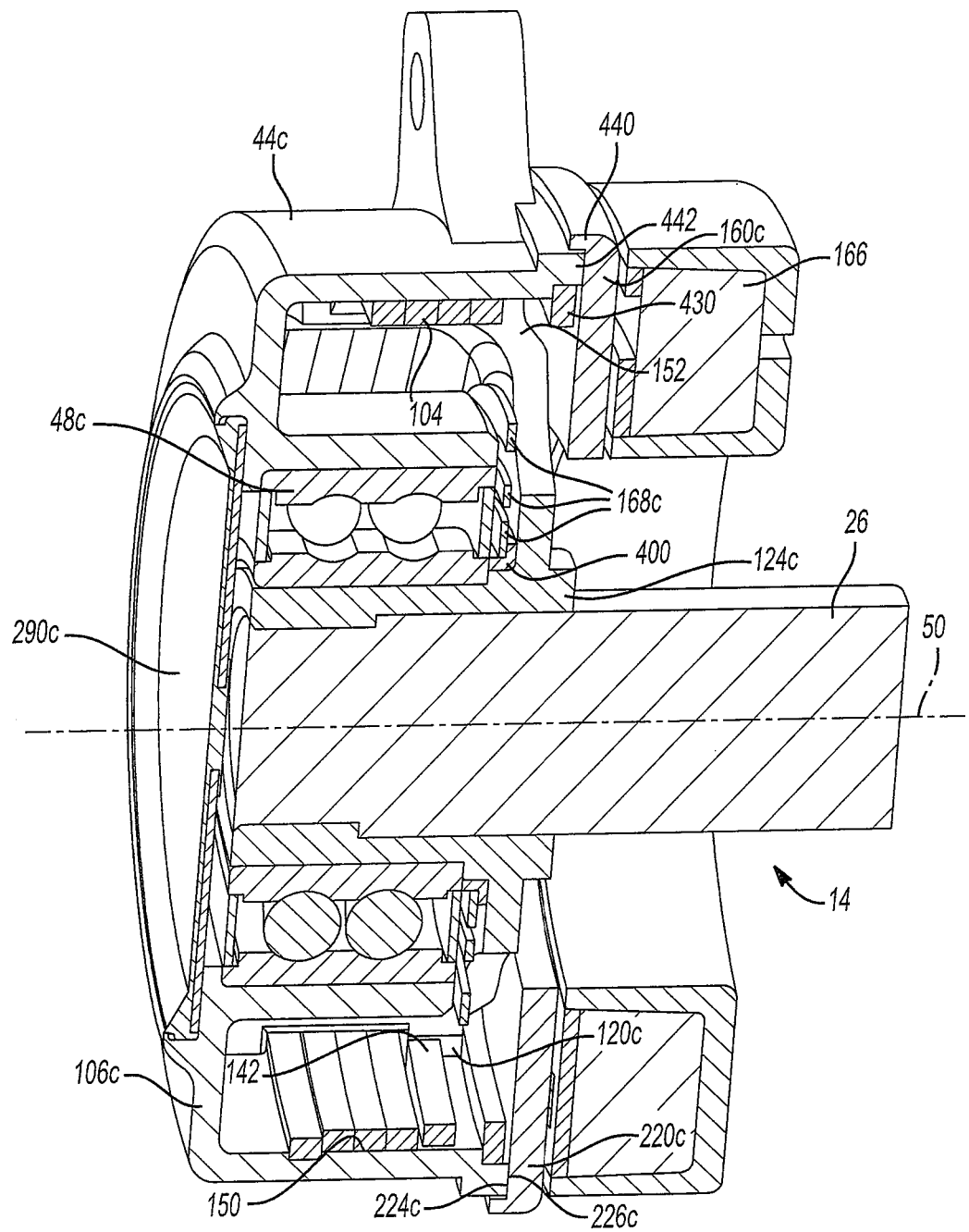
FIG. 11 is a section view of a portion of the driven accessory of FIG. 10, the view being taken longitudinally along the rotational axis of an output member of the driven accessory.

With reference to FIGS. 10 and 11, a portion of another driven accessory constructed in accordance with the teachings of the present disclosure is illustrated. The driven accessory can include an input member 12c, which can comprise a sheave spacer 44c, an accessory portion 14, and a clutch assembly 16c. The input member 12c can be supported for rotation on a housing (not shown) of the accessory portion 14 via a bearing 48c such that the input member 12c is rotatable about a rotary axis 50 of a drive shaft 26 of the accessory portion 14.

The clutch assembly 16c can comprise a first rotary clutch portion 100c, a second rotary clutch portion 102c, a wrap spring 104, a drive member 106c and an actuator 108c.

The first rotary clutch portion 100c is rotatably disposed about the rotational axis 50 of the driven accessory and can comprise a fork 110c having bifurcated fork members 112c.

The second rotary clutch portion 102c can comprise a driver surface 120c against which an axial end face 122 of the wrap spring 104. In the particular example provided, the second rotary clutch portion 102a is integrally formed with a clutch output member or driver member 124c that can include a coupling portion 126c, one or more legs 128c and one or more hook members 192c. The coupling portion 126c can be a generally tubular structure that can be fixedly coupled to the drive shaft 26 such that rotation of the driver member 124c causes corresponding rotation of the drive shaft 26 in the example provided. The bearing 48c can be mounted between the coupling portion 126c and the pulley sheave 44c. The leg or legs 128c can be coupled to the coupling portion 126c and can extend in radially outward and axial directions (i.e., parallel to the rotational axis of the drive shaft 26) so as to form an annular support surface 130c and an annular channel 132c that faces toward the sheave spacer 22c. The distal end of the leg or legs 128c can define one or more abutments 136c. The driver surface 120c can be coupled to the leg or to one of the legs 128c and in the particular example provided, is defined by an edge of one of the legs 128c. The hook member or members 192c can be coupled to the leg or legs 128c and can abut the wrap spring 104 on a side opposite the abutment(s) 136c. It will be appreciated that the abutment(s) 136c and the hook member(s) 192c can cooperate to confine the wrap spring 104 in an axial direction (i.e., axially along the rotational axis 50) on the driver member 124c.

The drive member 106c can be integrally formed with the sheave spacer 44c and defines an interior clutch surface 150 and a cavity 152. The helical coils 144 of the wrap spring 104 can be configured to engage the interior clutch surface 150 to facilitate the transmission of rotary power between the input member 12c and the drive shaft 26.

The actuator 108c can comprise an actuator member 160c, which can be coupled to the first rotary clutch member 100c for common rotation about the rotational axis 50, a means for moving the actuator member 160c axially along the rotational axis 50 between a first position and a second position and a means for generating a control torque that can be employed to bias the clutch assembly 16c into a predetermined condition (i.e., an engaged condition or a disengaged condition) as will be discussed in detail, below. In the particular example provided, the actuator 108c further comprises an electromagnet 166 and a return spring 168c, and the actuator member 160c is an armature. It will be appreciated, however, that other means for axially moving the actuator member 160c may be employed. As with the previously described examples, the electromagnet 166 is configured to be fixedly coupled to the housing of the accessory portion 14.

The actuator member 160c can comprise a body 190c that can have an annular plate-like shape. The body 190c can be received over the drive shaft 26. The fork 110c of the first rotary clutch member 100c can be fixedly coupled to the body 190c. In the example illustrated, two components identical to the first rotary clutch portion 100c are present; these two additional components are configured to rotationally balance the assemblage of the actuator member 160c and the first rotary clutch member 100c. It will be appreciated that these counterweights could be shaped differently or omitted altogether.

The return spring 168c can be mounted on a bushing 400 that can be rotatably received on the coupling portion 126c of the driver member 124c such that the return spring 168c is disposed on a side of the legs 128c opposite the actuator member 160c. The return spring 168c can include one or more fixation points 420 that can be employed to fixedly couple the return spring 168c to the actuator member 160c. In the particular example provided, a plurality of rivets 422 are received through the fixation points 420 and the actuator member 160c to fixedly couple the return spring 168c to the actuator member 160c so that the return spring 168c can bias the actuator member 160c toward the driver member 124c and away from the electromagnet 166.

The means for generating a control torque can comprise a drag member or teaser 220c that can be fixedly coupled to the actuator member 160c for rotation and axial movement therewith. In the particular example provided, the teaser 220c is integrally formed with the actuator member 160c and comprises a first teasing surface 224c that can be biased into engagement with a second teasing surface 226c via the return spring 168c to create a control torque. In the example provided, the second teasing surface 226c is formed on a circumferentially extending axial end of the drive member 106c.

Figure 25:
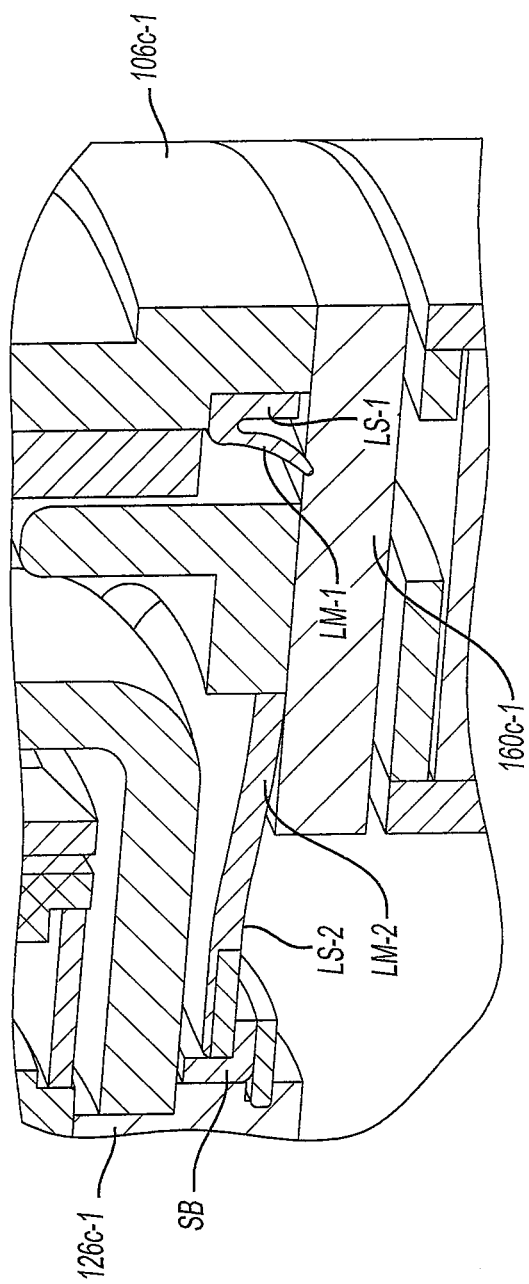
FIG. 25 is a perspective view of a portion of yet another driven accessory constructed in accordance with the teachings of the present disclosure, the driven accessory employing a pair of seals that sealingly engage the actuator member to inhibit or resist the ingress of dirt, debris and moisture into the clutch assembly.

A cap member 290c can be engaged to the sheave spacer 44c and can be employed to close a front side of the sheave spacer 44c. A ring member 430 can be coupled to or integrally formed with the drive member 106c and can form an axial barrier that inhibits a viscous lubricant, such as a grease, from migrating in an axial direction out of the cavity 152 in the drive member 106c. In the example provided, the ring member 430 is a snap ring that is received into a corresponding groove formed in the drive member 106c. If desired a seal or labyrinth can be formed between the drive member 106c and the actuator member 160c to guard against the ingress of dirt, debris and moisture into the cavity 152 in the drive member 106c. In the particular example provided, a lip member 440 is formed on the outer peripheral edge of the actuator member 160c and axially overlies an axial end portion 442 of the driver member 106c regardless of whether the actuator member 160c is positioned in the first position or the second position. Additionally or alternatively, seals of various sorts may be employed to seal the cavity 152 to prevent the ingress of dirt, debris and moisture therein. With brief reference to FIG. 25, a first lip seal LS-1 may be sealingly mounted on the drive member 106c-1 and may include a first lip member LM-1 that may be sealingly engaged to the actuator member 160c, while a second lip seal LS-2 may be sealingly mounted on a seal bushing SB that is rotatably mounted on the coupling portion 126-1 and may include a second lip member LM-2 that sealingly engages the actuator member at a point that is radially inwardly of the first lip member LM-1.

With renewed reference to FIGS. 10 and 11, it will be appreciated that engagement of the first and second teasing surfaces 224c and 226c can cause corresponding rotation of the first rotary clutch member 100c so that an input torque is applied to the wrap spring 104 (via the control tang 140) to cause the clutch assembly 16a to operate in an engaged mode. It will also be appreciated that the actuator 108c may be operated to translate the teaser 220c axially away from the drive member 106c such that the first and second teasing surfaces 224c and 226c can disengage one another and optionally to frictionally engage the body 190c of the actuator member 160c to the electromagnet 166 to create a drag force that is transmitted to the control tang 140 that causes the helical coils 144 of the wrap spring 104 to wrap or coil more tightly to more fully disengage the interior clutch surface 150 on the drive member 106c.

With reference to FIGS. 12 through 15, another driven accessory constructed in accordance with the teachings of the present disclosure is generally indicated by reference numeral 10d. The driven accessory 10d can comprise an input member 12d, the substantially conventional accessory portion 14 and a clutch assembly 16d. As with the example of FIGS. 1-5, the accessory portion 14 is depicted as being a water pump assembly, but those of skill in the art will appreciate from this disclosure that various other types of driven accessories or driving accessories could be employed in the alternative. In the particular example provided, the input member 12d comprises a sheave 42d and a sheave spacer 44d that is supported by a bearing 48d for rotation about the rotational axis 50 of the drive shaft 26.

The clutch assembly 16d can comprise a first rotary clutch portion 100d, a second rotary clutch portion 102d, a spring carrier 490, the wrap spring 104, a drive member 106d and an actuator 108d.

The first rotary clutch portion 100d is rotatably disposed about the rotational axis 50 of the driven accessory 10d and as will be discussed in more detail below, can serve as an element that can be employed to input a control torque to the wrap spring 104 to thereby control the operation of the clutch assembly 16d. The first rotary clutch portion 100d can comprise any means for imparting a torsional control signal to the wrap spring 104 and in the particular example illustrated, includes a fork 110d having bifurcated fork members 112d.

The second rotary clutch portion 102d can comprise a driver surface 120d against which an axial end face 122 of the wrap spring 104 can abut. In the particular example provided, the second rotary clutch portion 102d is integrally formed with a clutch output member or driver member 124d. More specifically, the driver member 124d comprises a plurality of lugs 500 and the second rotary clutch portion 102d is formed by one of the lugs 500 in the example provided. The driver member 124d can further comprise a coupling portion 126d, an annular leg 128d and one or more attachment points 506. The coupling portion 126d can be a hollow, generally tubular structure that can be fixedly coupled to the drive shaft 26 such that rotation of the driver member 124d causes corresponding rotation of the drive shaft 26. In the example provided, an internally threaded nut 508 is employed to fixedly couple the driver member 124d to the drive shaft 26, but it will be appreciated that internal threads could be formed on the coupling portion 126d and a distal end of the coupling portion 126d could be shaped in a non-circular manner (e.g., hex-shaped) to facilitate the installation of the driver member 124d to the drive shaft 26. The leg 128d can be coupled to the coupling portion 126d and can extend in radially outward and axial directions so as to form a cup-like structure that is disposed around the coupling portion 126d. The lugs 500 and the attachment points 506 can be coupled to the leg 128d proximate the distal end of the leg 128d.

The spring carrier 490 can be an annular structure or cartridge onto which the wrap spring 104 can be assembled. The spring carrier 490 can be formed of material that is relatively more resilient than the material from which the driver member 124d is formed. In the example provided, the spring carrier 490 is formed of an engineering nylon, but those of skill in the art will appreciate that other materials could be employed in the alternative. The spring carrier 490 can define a slot 520, an aperture 526 and a plurality of lug recesses 528. The aperture 526 is sized to permit the spring carrier 490 to be received over the leg 128d and abutted against the attachment points 506 on the driver member 124d. The lug recesses 528 are configured to receive an associated one of the lugs 500 to inhibit relative rotation between the driver member 124d and the spring carrier 490d. The slot 520 is configured to receive the second end 142 of the wrap spring 104 and orient the axial end face 122 of the second end 142 such that it is co-planar with a wall member 530 that defines a side of one of the lug recesses 528, which permits the axial end face 122 to abut the driver surface 120d when the spring carrier 490 is mounted to the driver member 124d. The spring carrier 490d can be axially fixed to the driver member 124d in any desired manner. In the particular example provided, threaded fasteners 534 are received through the attachment points 506 and threadably engaged to the spring carrier 490.

In the particular example provided, the drive member 106d is integrally formed with the sheave spacer 44d and defines an interior clutch surface 150 and a cavity 152 into which various components of the clutch assembly 16d, including the actuator 108d, the wrap spring 104, the first rotary clutch portion 100d and the second rotary clutch portion 102d, can be received. The helical coils 144 of the wrap spring 104 can be configured to engage the interior clutch surface 150 to facilitate the transmission of rotary power between the input member 12d and the drive shaft 26. As noted above, it may be desirable to employ a lubricant between the interior clutch surface 150 and the helical coils 144 of the wrap spring 104.

The actuator 108d can comprise an actuator member 160d, which can be coupled to the first rotary clutch member 100d for common rotation about the rotational axis 50, a means for moving the actuator member 160d axially along the rotational axis 50 between a first position and a second position and a means for generating a drag force that can be employed to bias the clutch assembly 16d into a predetermined condition as will be discussed in detail, below. In the particular example provided, the actuator 108d further comprises an electromagnet 166 and a return spring 168d, and the actuator member 160d is an armature. As will be appreciated from the discussion above, other means for axially moving the actuator member 160d may be employed.

The electromagnet 166 can be fixedly coupled to the housing 22 and can include an annular shell member 170, a coil 172 and a pair of electrical leads or terminals 176. The terminals 176 can be configured to electrically couple the coil 172 to a source of electrical power and can be routed in a groove 184 in the housing 22 beneath the bearing 48d as described above. The actuator member 160d can comprise a body 190d that can have an annular plate-like shape and which can be received over the drive shaft 26.

The return spring 168d can include a spring body 200d, which can be fixedly mounted to the coupling portion 126d of the driver member 124d, and a plurality of spring arms 202d that can be fixedly and rotatably coupled to the actuator member 160d via a plurality of rivets 204. In the example provided, a generally C-shaped spring guide 550 is also fixedly and rotatably coupled to the actuator member 160c via the rivets 204. The spring guide 550 can have circumferentially extending wall segments 552 that are disposed concentrically about the rotational axis 50 to trap or restrain at least a portion of the helical coils 144 of the wrap spring 104 between the interior clutch surface 150 and the wall segments 552. The opening in the C-shape of the spring guide 550 can be positioned to receive the first rotary clutch portion 100d therein. The spring arms 202d can cooperate to bias the actuator member 160d toward the driver member 124 and away from the electromagnet 166. In the particular example provided, the spring body 200d is mounted on a bushing 400d to permit the return spring 168d to rotate relative to the driver member 124d and a snap ring 560 that is received in a groove 562 formed in the coupling portion 126d is employed to axially retain the bushing 400d to the coupling portion 126d.

The means for generating a control torque can comprise a drag member or teaser 220d that can be coupled to the actuator member 160d for rotation and axial movement therewith. In the particular example provided, the teaser 220d is integrally formed with the actuator member 160d, but it will be appreciated that the teaser 220d could be a discrete component that is coupled to the actuator member 160d. The spring arms 202d of the return spring 168d are configured to bias the actuator member 160d and the teaser 220d axially away from the electromagnet 166 such that a first teasing surface 224d on the teaser 220d frictionally engages a second teasing surface 226d formed on the drive member 106d.

A cap member 290d can be engaged to the drive member 106d and can be employed to cover a front end of the driven accessory 10d to prevent the ingress of dust, dirt and moisture into the cavity 152.

It will be appreciated that engagement of the first and second teasing surfaces 224d and 226d can generate a control torque that can be transmitted via the first rotary clutch member 100d to the control tang 140 of the wrap spring 104 to cause the clutch assembly 16d to operate in an engaged mode. It will also be appreciated that the actuator 108d may be operated to translate the teaser 220d axially away from the drive member 106d such that the first and second teasing surfaces 224d and 226d can disengage one another and optionally to frictionally engage the body 190d of the actuator member 160d to the electromagnet 166 to create a drag force that is transmitted to the control tang 140 that causes the helical coils 144 of the wrap spring 104 to wrap or coil more tightly to more fully disengage the interior clutch surface 150 on the drive member 106d.

As noted above, a driven accessory constructed in accordance with the teachings of the present disclosure can be disengaged (or engaged if the clutching mechanism is reversed) with a relatively low requirement of electrical power compared to other clutch mechanisms, such as those used with automotive air conditioning compressor clutches. As will be apparent to those of skill in the art, the amount of electrical energy required to move the actuator member of any of the clutch assemblies described herein into frictional contact with the electromagnet depends, amongst other factors, upon the biasing force exerted by the return spring biasing the actuator member away from the electromagnet and the distance between the electromagnet and the actuator member. We note, however, that the frictional engagement of the teaser that is employed to re-engage the clutch assembly is also dependent upon the biasing force exerted by the return spring. Accordingly, the return spring is subject to conflicting design criteria (i.e., a low spring rate is desirable for the biasing of the actuator member, while a higher spring rate is desirable for generating the rotary drag force or torque that is input to the wrap spring via the control tang to cause the wrap spring to uncoil).

Figure 16:
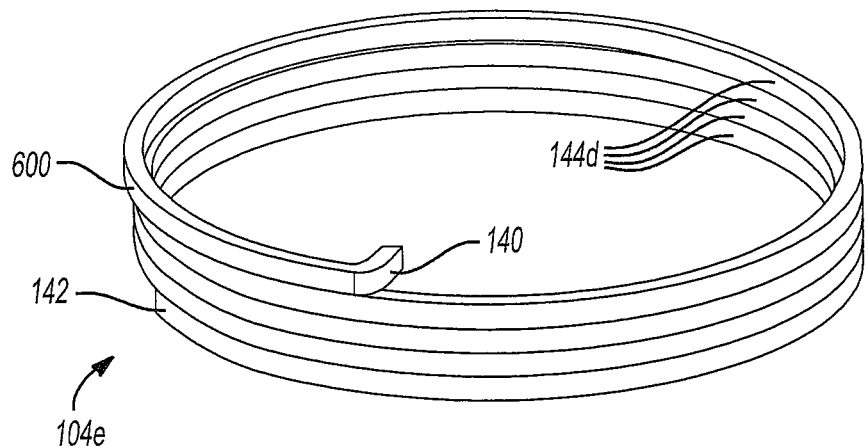
FIG. 16 is a perspective view of a wrap spring constructed in accordance with the teachings of the present disclosure.
Figure 15:
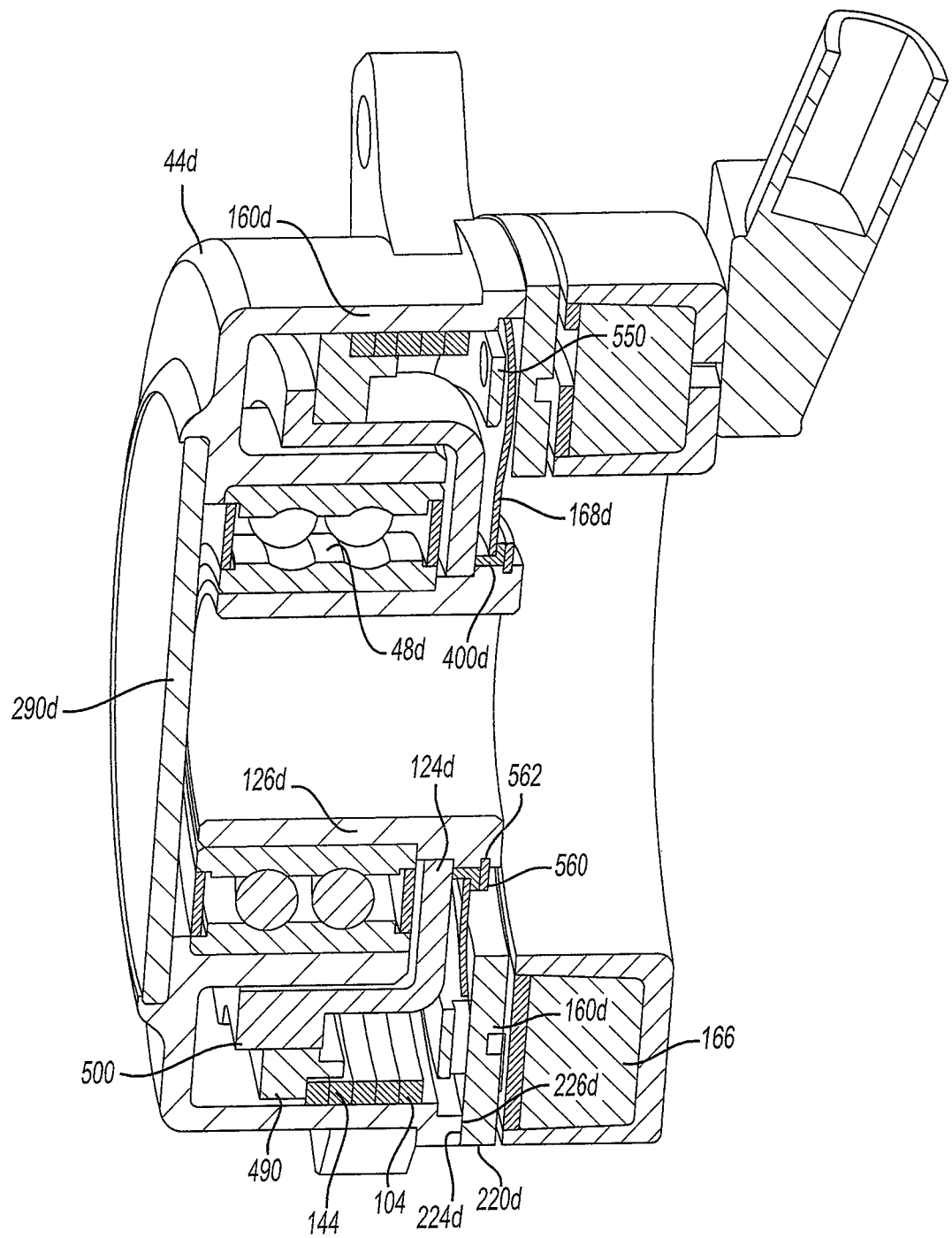
FIG. 15 is a perspective, partly sectioned view of a portion of the driven accessory of FIG. 13, illustrating the clutch assembly in more detail.

In situations where it is desirable to reduce the biasing force of the return spring (to thereby reduce the electrical power requirements to disengage the clutch assembly), we have found that certain modifications to wrap spring render the wrap spring responsive to torsional inputs having a lower magnitude (i.e., less teasing or drag force between the first and second teasing surfaces is needed to control the operation of the wrap spring). With reference to FIG. 16, a wrap spring 104e constructed in accordance with the teachings of the present disclosure is illustrated. The wrap spring 104e is similar to the wrap spring 104 (FIG. 2) in that it includes a first end or control tang 140, a second end 142 and a plurality of helical coils 144d. The plurality of coils 144d, however, comprise at least one non-uniform coil portion 600 that effectively enlarges the overall diameter or size of the wrap spring 144d at one or more points that extend diametrically across the wrap spring at one or more points along the length of the non-uniform coil portions 600. In the particular example provided, a single non-uniform coil portion 600 is employed proximate the control tang 140 and the non-uniform coil portion 600 comprises an outwardly bent portion of one of the helical coils 144d. For example, the helical coils 144d can be sized at a diameter that is generally smaller than the diameter of the interior clutch surface on the drive member and the non-uniform coil portion 600 can comprise a bend that can begin at a predetermined angular spacing, such as 180°, from the proximal end of the control tang 140 (i.e., the end of the control tang 140 that is adjacent to the helical coils 144d) and extend radially outwardly therefrom so as to create an interference fit with the interior clutch surface at a single area or zone that is centered at a location approximately 90° from the proximal end of the control tang 140. In another example, the non-uniform coil portion 600 can comprise a predetermined quantity of the helical coils 144d (e.g., two coils) that are formed larger in diameter than the diameter of the interior clutch surface.

The non-uniform coil portion(s) 600 may be in continuous frictional contact with the interior clutch surface on the drive member, or may be brought into contact with the interior clutch surface with a relatively lower input torque (generated by frictional contact, i.e., drag, between the first and second teasing surfaces). The remaining portion of the helical coils 144*d* can be sized (i.e., nominally sized) somewhat smaller in diameter that the interior clutch surface on the driver so that the helical coils 144*d* do not engage the interior clutch surface except at points along the non-uniform coil portion(s) 600 and points diametrically opposite the non-uniform coil portion(s) 600. Torque input to the wrap spring 104*e* as a result of frictional engagement between the non-uniform coil portion(s) 600 and the interior clutch surface augments the torque that is input to the wrap spring 104*e* via the control tang 140 so that relatively less torque is needed at the control tang 140 to effect engagement of the wrap spring 104*e* to the interior clutch surface (which permits the return spring to be configured with a relatively lower spring rate and the electromagnet to be configured to operate with lower power consumption). It will be appreciated that the wrap spring 104*e* can be employed with any of the examples described herein.

Another factor concerning the sizing of the magnitude of the biasing force that is exerted on the actuator member by the return spring when the actuator comprises an electromagnet concerns the presence of a residual magnetic field between the electromagnetic coil and the armature after the electrical power to the coil has been removed. Such a residual magnetic field will act against the biasing force of the return spring, and thus requires an undesired increase in the biasing force of the return spring. To reduce or eliminate residual magnetism in the actuator member, the polarity of the electrical power supplied to the electromagnet may be reversed from time to time. In one implementation, polarity of the electrical power may be reversed just prior to re-engagement of the clutch assembly. For example, a control circuit can be configured to remove electrical power (i.e., terminate the supply or flow of electrical current) having a first polarity to the electromagnet and then re-apply electrical power with a second, reverse polarity to the electromagnet for a desired amount of time. Other implementations include alternating the polarity of the electrical power supplied to the electromagnet during operation of the electromagnet. For example, the polarity of the electrical power may be alternated each (successive) time the electromagnet is operated (i.e., electrical power of a first polarity may be applied to the electromagnet the first time the electromagnet is to be operated, electrical power of a second, reverse polarity may be applied to the electromagnet the second time the electromagnet is to be operated, electrical power of the first polarity may be applied to the electromagnet the third time the electromagnet is to be operated, etc.). It will be appreciated that other intervals may be employed for alternating polarity if desired (e.g., polarity may be reversed after five (5) operational cycles of the electromagnet) and that the number of operational cycles between alternations may not be equal (e.g., polarity is switched from a first polarity to a second polarity after a first quantity of operational cycles, polarity is switched back from the second polarity to the first polarity after a second quantity of operational cycles and the first quantity is not equal to the second quantity). As another example, timers, counters (e.g., crankshaft revolutions) or other criteria (e.g., vehicle mileage) may be employed to identify points during the operation of the electromagnet at which electrical power is to be interrupted and re-applied with a reverse polarity to cause an interruption of the electromagnet of but a relatively short duration.

As another means for reducing the amount of electrical energy that is employed to operate the electromagnet, two or more schemes may be employed to provide electrical power to the electromagnet. For example, a relatively higher amount of electrical power may be provided to the electromagnet to accelerate the actuator member from its "at rest" position and a relatively lower amount of electrical power may be provided to the electromagnet to maintain the actuator member proximate or adjacent the electromagnet. In one implementation, electrical power is provided to the electromagnet via a pulse-width modulation technique such that electrical power is provided to the electromagnet in the form of pulses of electrical power having a predetermined voltage. The duty cycle (i.e., the percentage of "on" time relative to the total time of the cycle) of the pulse-width modulation technique may be relatively high when the actuator member is to be moved and can thereafter be reduced when the actuator member is to be maintained proximate the electromagnet (i.e., the percentage of "on" time to total time may be relatively high initially and thereafter may be decreased).

Current varying techniques, such as pulse-width modulation, may also be employed to cause more gradual engagement of the wrap spring to the interior clutch surface. In some situations it may be possible to control the axial position of the actuator member through control of the electrical power that is provided to the electromagnet. In other situations, it may be necessary or desirable to engage the wrap spring through a series of engaging pulsations to initiate rotation of the drive shaft. In the latter case, the engaging pulsations may be relatively brief in duration initially and increase in duration over time until the drive shaft rotates at a rotational speed that is approximately equal to a rotational speed of the input member (within a predetermined speed differential). Operation of the clutch assembly in this manner can reduce mechanical stress on the components of the drive assembly and/or reduce noise associated with the engagement of the clutch assembly.

Also, it is contemplated that by measuring the current provided to the electromagnet (or a characteristic related to the current provided to the electromagnet) when the clutch is engaged, the profile of the measured characteristic (e.g., current) as a function of time can be "compared" to predefined profiles to confirm engagement between the actuator member and the electromagnet and/or to determine or estimate the gap between the actuator member and de-energized electromagnet, which is indicative of the amount of wear within the clutch assembly. It will be appreciated that the "comparison" may include the determination of a state of decay or deformation of the magnetic field produced by the electromagnet or the state of decay of an amount of current flowing through the electromagnet, for example, and that various portions of the profile may be employed as the basis for the "comparison". Such portions may include, for example, the value of the measured characteristic at a particular time, the slope of the profile at a given time, a change in the slope of the profile at a given time and/or combinations thereof (e.g., a negative slope following an inflection point).

In the alternative, various types of sensors may be employed to verify engagement and/or disengagement of the clutch assembly. For example, one or more sensors, such as a Hall effect sensors or a proximity sensors, may be incorporated into the driven accessory to sense a position of the actuator member. As another example, a sensor may be employed to determine the operational state of the accessory portion. The sensor may comprise a torque sensor, such as an eddy current torque sensor, that is configured to sense a magnitude of the torque transmitted through the drive shaft. The sensor may comprise a sensor that is suited for monitoring the output of the accessory portion (e.g., a flow sensor or a pressure sensor if the accessory portion comprises a pump; a magnetic field sensor, a current sensor or a voltage sensor if the accessory portion comprises an alternator or a generator). The sensor may comprise a speed sensor that is configured to sense a rotational speed of a portion of the clutch assembly or accessory portion, such as the drive shaft. The sensor may comprise a sensor for sensing the temperature of the electromagnet or a parameter associated with the electromagnet. In situations where data generated by one or more of the sensors (or from the electromagnet) is indicative of a failure of the clutch assembly and/or accessory portion, or of an error in the operation of the clutch assembly and/or accessory portion, a vehicle controller can be configured to take an appropriate action. For example, the vehicle controller can illuminate a tell tale indicator on the vehicle instrument panel, generate an error code that can be stored for retrieval by a vehicle or engine scanner/code reader, and/or transmit an error message via a wireless data transmission medium to a remotely located monitoring or messaging station (e.g., OnStar®).

Figure 24:
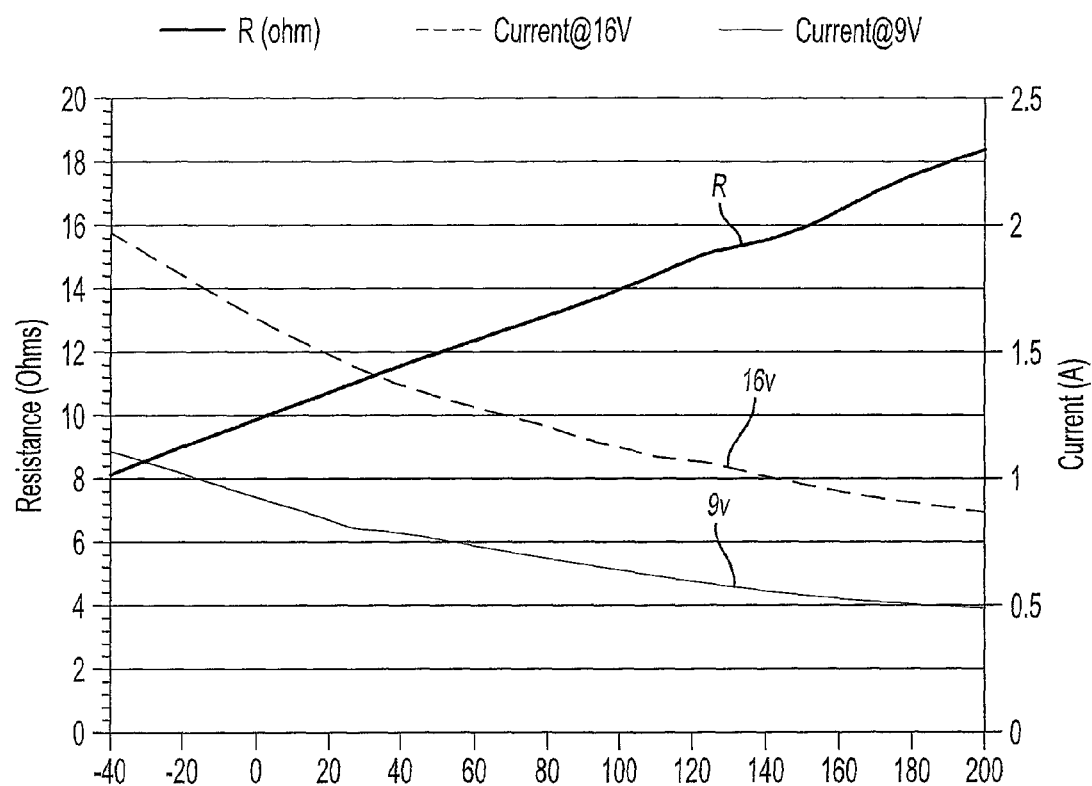
FIG. 24 is a plot that illustrates a relationship between temperature, resistance voltage and current of an electromagnet employed in some examples of a driven accessory constructed in accordance with the teachings of the present disclosure.

Further, by knowing the resistance $R_{REF}$ of the electromagnet at a given temperature, for example at 65° C. (149° F.), and determining the actual resistance R of the electromagnetic coil (e.g., from R=I/V when the input voltage and current are known) at a time of interest, a relatively accurate determination of the temperature of the electromagnet relative to the given temperature can be made. FIG. 24 is a plot of one exemplary electromagnet illustrating the interrelationship of the resistance of the coil, the current flowing through the coil as a function of the temperature (in degrees Celsius) of the coil when a voltage of 9 volts or 16 volts is applied to the coil. In the figure, the resistance of the coil (in ohms) is indicated by the plot R, the current through the coil (in amps) when the power applied to the coil has a voltage of 9 volts is indicated by the plot 9V, and the current through the coil (in amps) when the power applied to the coil has a voltage of 16 volts is indicated by the plot 16V. As will be appreciated, a current of less than 2.0 amps is required to move the actuator member between the first and second positions when a voltage of 16 volts or less is applied to the actuator and a temperature of the actuator is greater than −40° C. Data pertaining to the temperature of the electromagnet relative to a given temperature can be used as an input to a control algorithm for the clutch assembly. For example, where the clutch assembly employs an electromagnet for disengaging the clutch assembly, data indicating that the actual temperature is equal to or exceeds a first predetermined temperature (e.g., 65° C. or 149° F.) may be employed to inhibit operation of the electromagnet (so that the clutch assembly will not be disengaged). Operation in this manner can prevent the operation of the electromagnet when there is a risk that operation of the clutch assembly at an elevated temperature may damage components of the clutch assembly (e.g., the electromagnet). As another example, data indicating that the actual temperature is equal to or less than a second predetermined temperature (e.g., −20° C. or −4° F.) may be employed to identify situations in which is may be desirable to heat the clutch assembly to reduce or eliminate "stiction" as is described in more detail below. It will be appreciated that in an automotive setting, temperature information that is available over the vehicle network or data bus may also be employed to control the operation of the actuator.

In clutch assemblies that employ an actuator with an electromagnet, it may be desirable in some situations to provide additional electrical power (e.g., to overcome "stiction", to generate heat). In one implementation, the additional electrical power may be provided by an ultra capacitor, which can be employed to boost the current that is supplied under ordinary conditions from a source of electrical power (e.g., a vehicle electrical system). Alternatively, a voltage multiplier may be selectively employed to raise or boost the voltage of the electrical power that is ordinarily supplied to the electromagnet so that electrical power having a significantly higher voltage may be provided to the electromagnet for initial clutch disengagement.

An increase in the voltage of the electrical power initially supplied to the electromagnet can be employed in order to assist in overcoming the initial effects of teaser "stiction", as previously described. Such "stiction" can be encountered during long periods of inactivity in extremely cold environments (for example after long periods at sub zero temperatures). Additionally or alternatively, an increase in the voltage of the electrical power supplied to the electromagnet may be employed upon determining that the electromagnet failed to move the actuator member to a desired position. Such condition may be indicative of freezing; "stiction"; or the failure or misalignment of one or more components within the clutch assembly. Accordingly, the increase in the voltage of the electrical power supplied to the electromagnet may provide a stronger magnetic field (which may permit the actuator member to move despite the occurrence of freezing, "stiction" or misalignment) and/or to more rapidly heat the electromagnet (which may counteract freezing or "stiction" to some degree).

The provision to supply electrical power to the electromagnet with increased voltage can also be employed to reduce the size of the electromagnet for a given return spring (having a given spring rate), due to the additional magnetic force generated by a higher supply voltage, thereby allowing the designers to reduce the size and weight of the electromagnet, and to reduce the cost of the electromagnet by reducing the number of aluminum or copper conductor windings required within the electromagnet to generate the same or equivalent force. The use of a voltage multiplier circuit or ultra capacitor would also reduce the electrical load applied to a vehicle electrical system, and the ECU power supply, by reducing the time required for the electromagnet to be supplied with full power.

Figure 17:
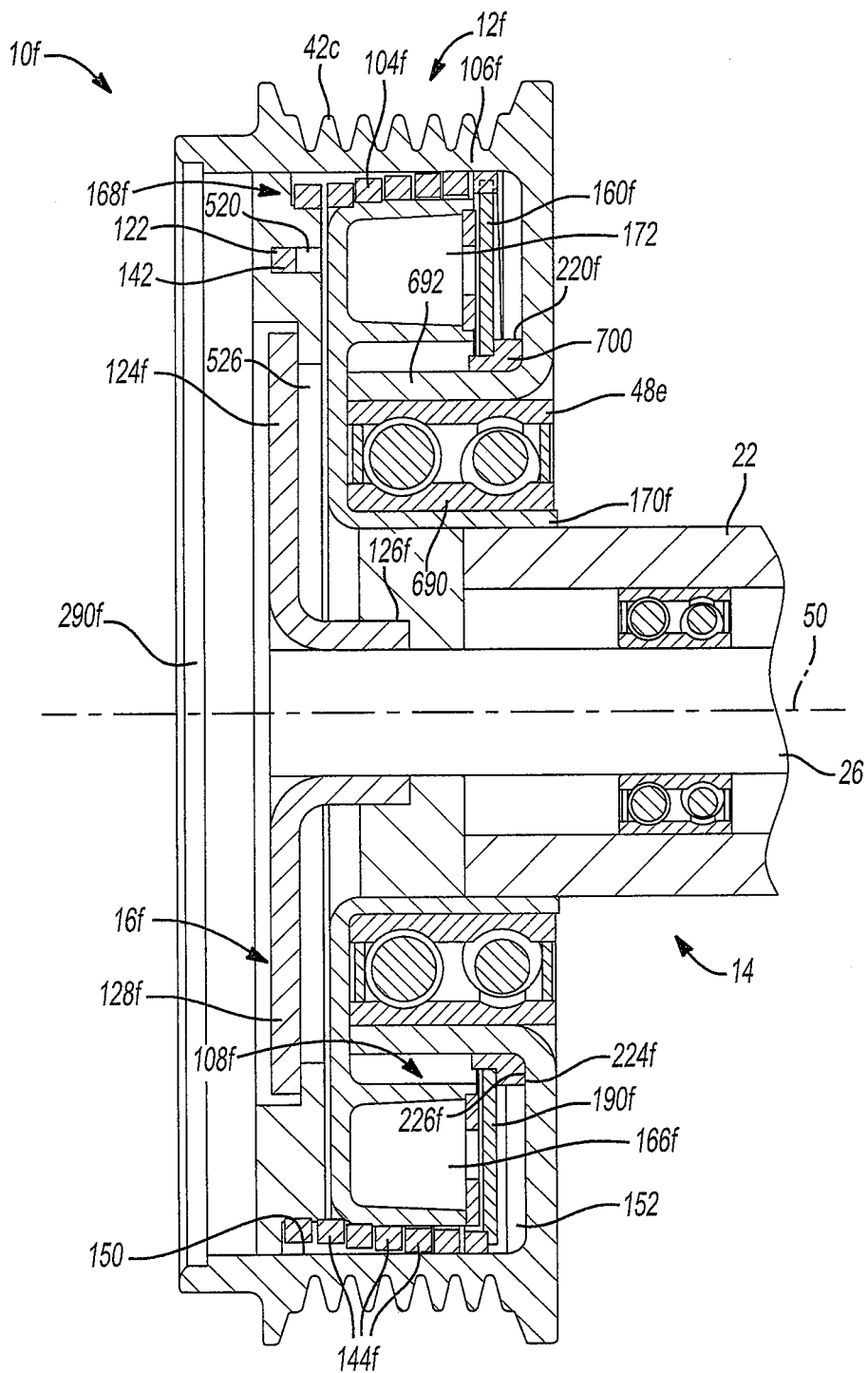
FIG. 17 is a side view of a portion of another driven accessory constructed in accordance with the teachings of the present disclosure.

With reference to FIG. 17, another driven accessory constructed in accordance with the teachings of the present disclosure is generally indicated by reference numeral 10*f*. The driven accessory 10*f* can include an input member 12*f*, which can comprise a sheave 42*f*, an accessory portion 14, and a clutch assembly 16*f*. The input member 12*f* can be supported by a bearing 48*f* for rotation about the rotational axis 50 of a drive shaft 26 of the accessory portion 14.

The clutch assembly 16*f* can comprise a first rotary clutch portion 100*d*, a second rotary clutch portion 102*f*, a spring carrier 490*f*, a wrap spring 104*f*, a drive member 106*f* and an actuator 108*f*. The first rotary clutch portion 100*d* is described in detail above.

The second rotary clutch portion 102*f* can include a driver surface (similar to driver surface 120*d*) against which an axial end face 122 of the wrap spring 104*f* can abut. The second rotary clutch portion 102*f* can be integrally formed with a clutch output member or driver member 124*f* that can comprise a plurality of lugs (not specifically shown, but similar to the lugs 500 of FIG. 12), a coupling portion 126*f* and an annular leg 128*f*. The coupling portion 126*d* can be a hollow, generally tubular structure that can be fixedly coupled to the drive shaft 26 such that rotation of the driver member 124*f* causes corresponding rotation of the drive shaft 26. In the example provided, the coupling portion 126*f* is coupled to the drive shaft 26 via an interference fit. The leg 128*f* can be coupled to the coupling portion 126*f* and can extend in radially outwardly therefrom. The lugs can be coupled to the leg 128*f* proximate the distal end of the leg 128*f*.

Figure 12:
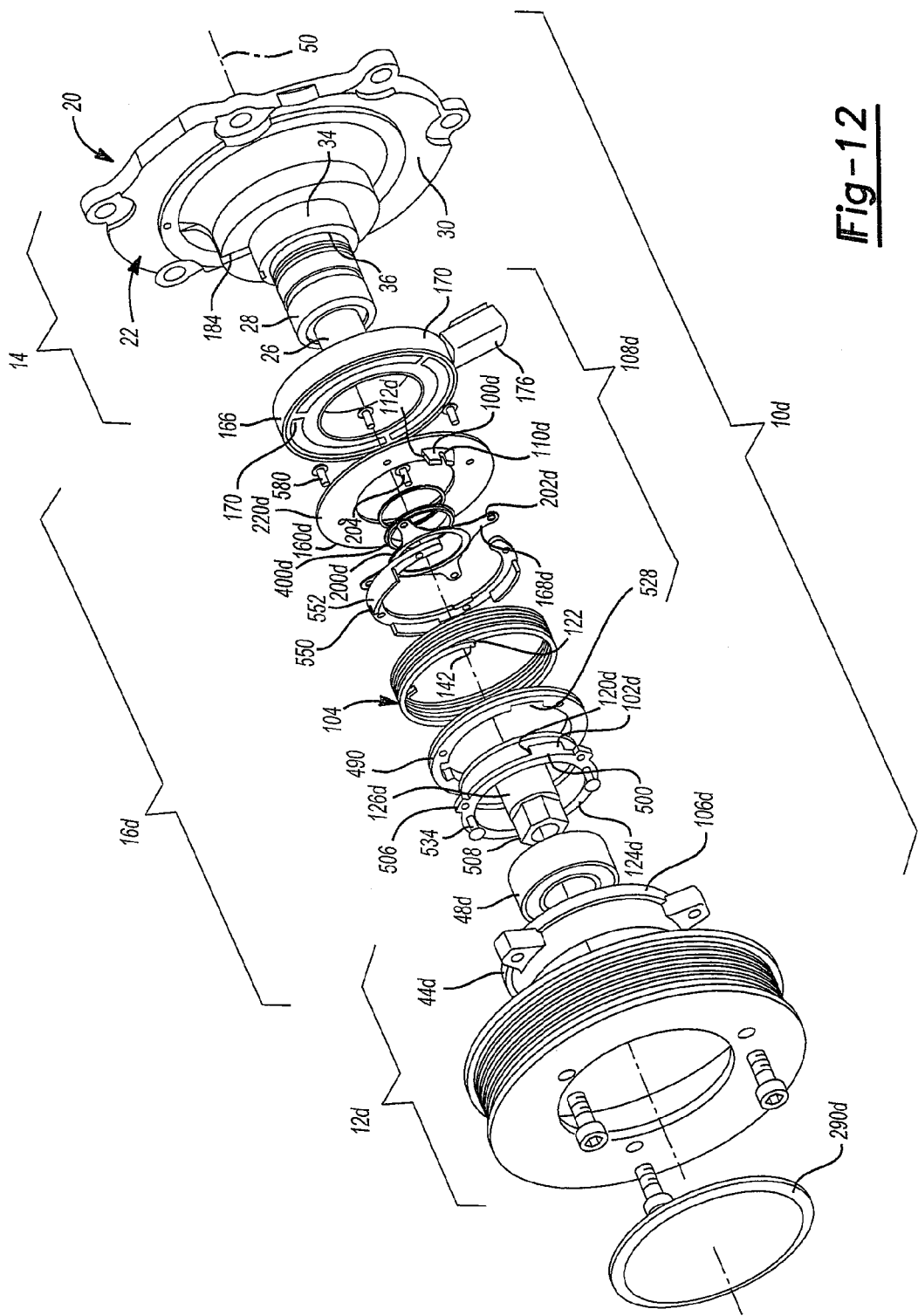
FIG. 12 is an exploded perspective view of a further driven accessory constructed in accordance with the teachings of the present disclosure.
Figure 13:
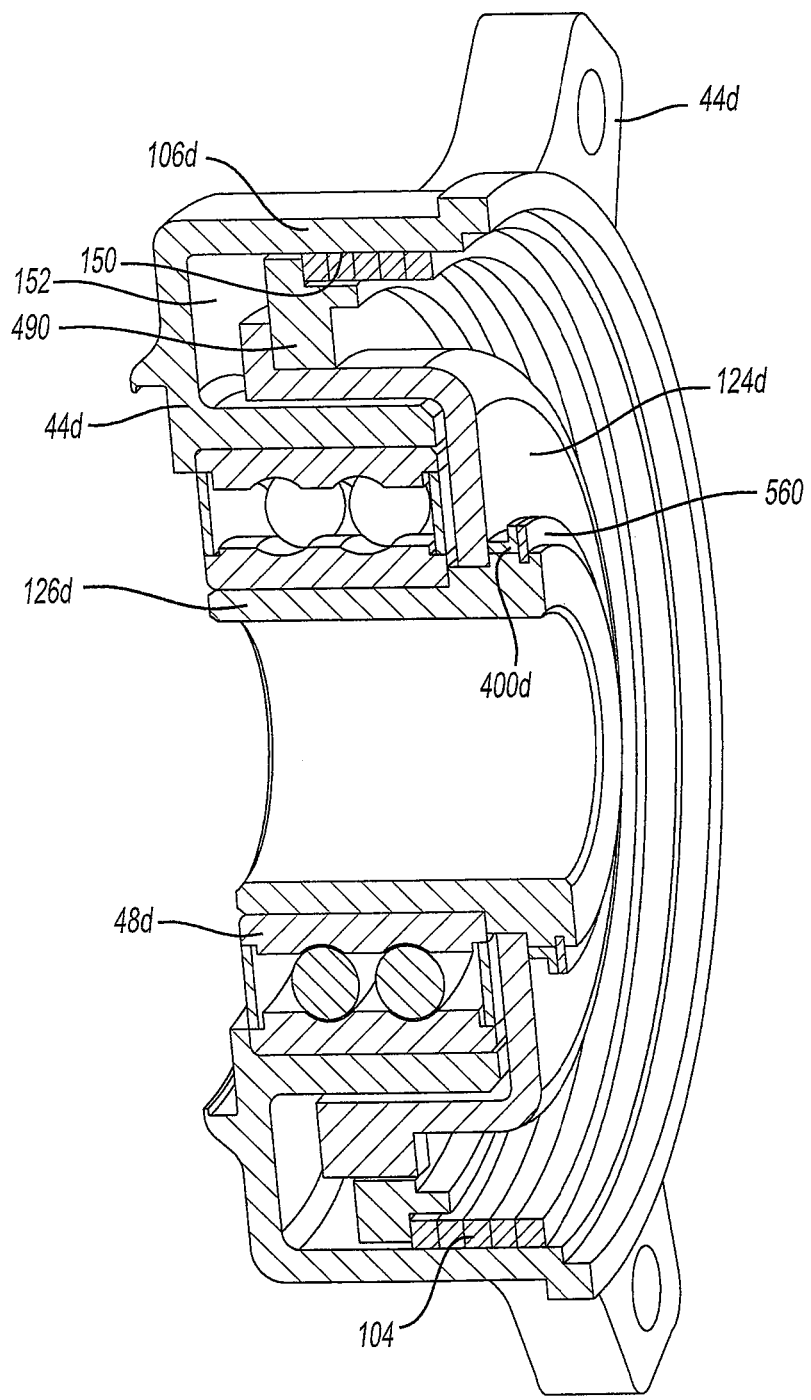
FIG. 13 is a perspective, partly sectioned view of a portion of the driven accessory of FIG. 12, illustrating a portion of a clutch assembly in more detail.
Figure 14:
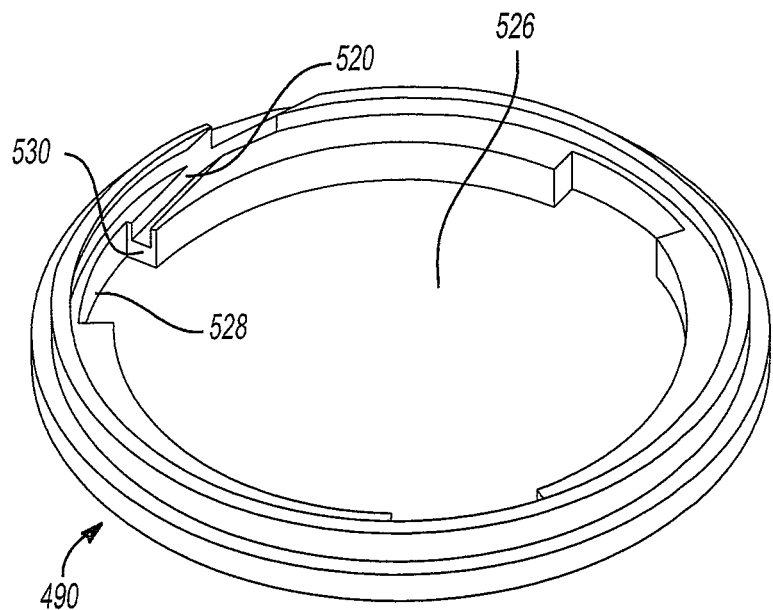
FIG. 14 is a perspective view of a portion of the clutch assembly that illustrates a portion of the second rotary clutch portion in more detail.

The spring carrier 490*f* can be generally similar to the spring carrier 490 of FIG. 12. Briefly, the spring carrier 490*f* can define a slot 520, an aperture 526, through which the coupling portion 126f may extend, and a plurality of lug recesses (not specifically shown, but similar to the lug recesses 528 of FIG. 12) that are configured to receive a corresponding one of the lugs to non-rotatably couple the spring carrier 490f to the driver member 124f. The slot 520 is configured to receive the second end 142 of the wrap spring 104f such that the axial end 122 of the wire that fowls the wrap spring 104f abuts the driver surface on the second rotary clutch portion 102f.

The wrap spring 104f can be generally similar to the wrap spring 104 of FIG. 2 or the wrap spring 104e of FIG. 16, except that the helical coils 144f are pulled axially apart from one another such that the wrap spring 104f acts also as a compression spring.

The drive member 106f can be integrally formed with the sheave 42f and can define an interior clutch surface 150 and a cavity 152 into which various components of the clutch assembly 16f, including the actuator 108f, the wrap spring 104f, the first rotary clutch portion 100d and the second rotary clutch portion 102f, can be received. The helical coils 144f of the wrap spring 104f can be configured to engage the interior clutch surface 150 to facilitate the transmission of rotary power between the input member 12f and the drive shaft 26. As noted above, it may be desirable to employ a lubricant between the interior clutch surface 150 and the helical coils 144f of the wrap spring 104f.

The actuator 108f can comprise an actuator member 160f, which can be coupled to the first rotary clutch member 100d for common rotation about the rotational axis 50, a means for moving the actuator member 160f axially along the rotational axis 50 between a first position and a second position and a means for generating a control torque that can be employed to bias the clutch assembly 16f into a predetermined condition (i.e., an engaged condition or a disengaged condition) as will be discussed in detail, below. In the particular example provided, the actuator 108f further comprises an electromagnet 166f and a return spring 168f, and the actuator member 160f is an armature. As will be appreciated from the discussion above, other means for axially moving the actuator member 160f may be employed.

The electromagnet 166f can be fixedly coupled to the housing 22 and can include an annular shell member 170f, a coil 172 and a pair of electrical leads or terminals (not specifically shown). The shell member 170f can include an annular collar 690 that can be fixedly coupled to the housing 22. The bearing 48e can be received between the annular collar 690 and an annular wall 692 on the drive member 106f that can be generally concentric with the interior clutch surface 150. The actuator member 160f can comprise a body 190f that can have an annular plate-like shape and which can be received over the drive shaft 26. The actuator member 160f can be mounted on an annular bushing 700 that permits the actuator member 160f to slide axially on annular wall 692, as well as for the drive member 106f to rotate relative to the actuator member 160f.

As noted above, the helical coils 144f of the wrap spring 104f are spaced axially apart to permit the helical coils 144f to a compression spring. Accordingly, it will be appreciated that the wrap spring 104f also serves as the return spring 168f and biases the actuator member 160f axially away from the electromagnet 166f.

The means for generating a control torque can comprise a drag member or teaser 220f that can be coupled to the actuator member 160d for rotation and axial movement therewith. In the particular example provided, the teaser 220f is integrally formed with the bushing 700, but it will be appreciated that the teaser 220f could be a discrete component that is coupled to the actuator member 160f or to the bushing 700. The return spring 168f is configured to bias the actuator member 160f and the bushing 700/teaser 220f axially away from the electromagnet 166f such that a first teasing surface 224f on the teaser 220f frictionally engages a second teasing surface 226f formed on the drive member 106f.

A cap member 290f can be engaged to the drive member 106f and can be employed to cover a front end of the driven accessory 10f to prevent the ingress of dust, dirt and moisture into the cavity 152.

It will be appreciated that engagement of the first and second teasing surfaces 224f and 226f can generate a control torque that can be transmitted via the first rotary clutch member 100d to the control tang 140 of the wrap spring 104f to cause the clutch assembly 16f to operate in an engaged mode. It will also be appreciated that the actuator 108f may be operated to translate the teaser 220f axially away from the drive member 106f such that the first and second teasing surfaces 224f and 226f can disengage one another and optionally to frictionally engage the body 190f of the actuator member 160f to the electromagnet 166f to create a drag force that is transmitted to the control tang 140 that causes the helical coils 144f of the wrap spring 104f to wrap or coil more tightly to more fully disengage the interior clutch surface 150 on the drive member 106f.

Figure 18:
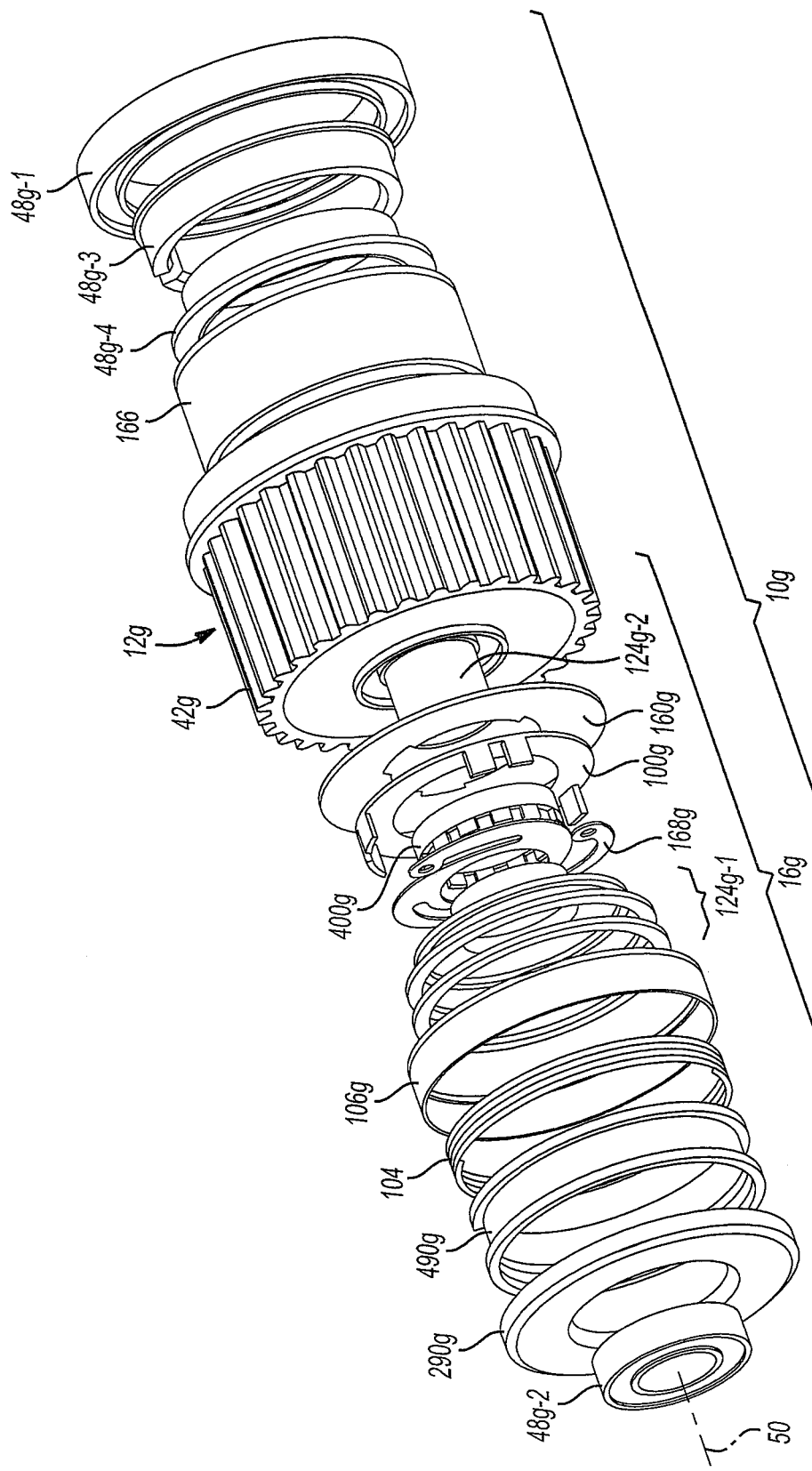
FIG. 18 is an exploded perspective view of a portion of still another driven accessory constructed in accordance with the teachings of the present disclosure.
Figure 19:
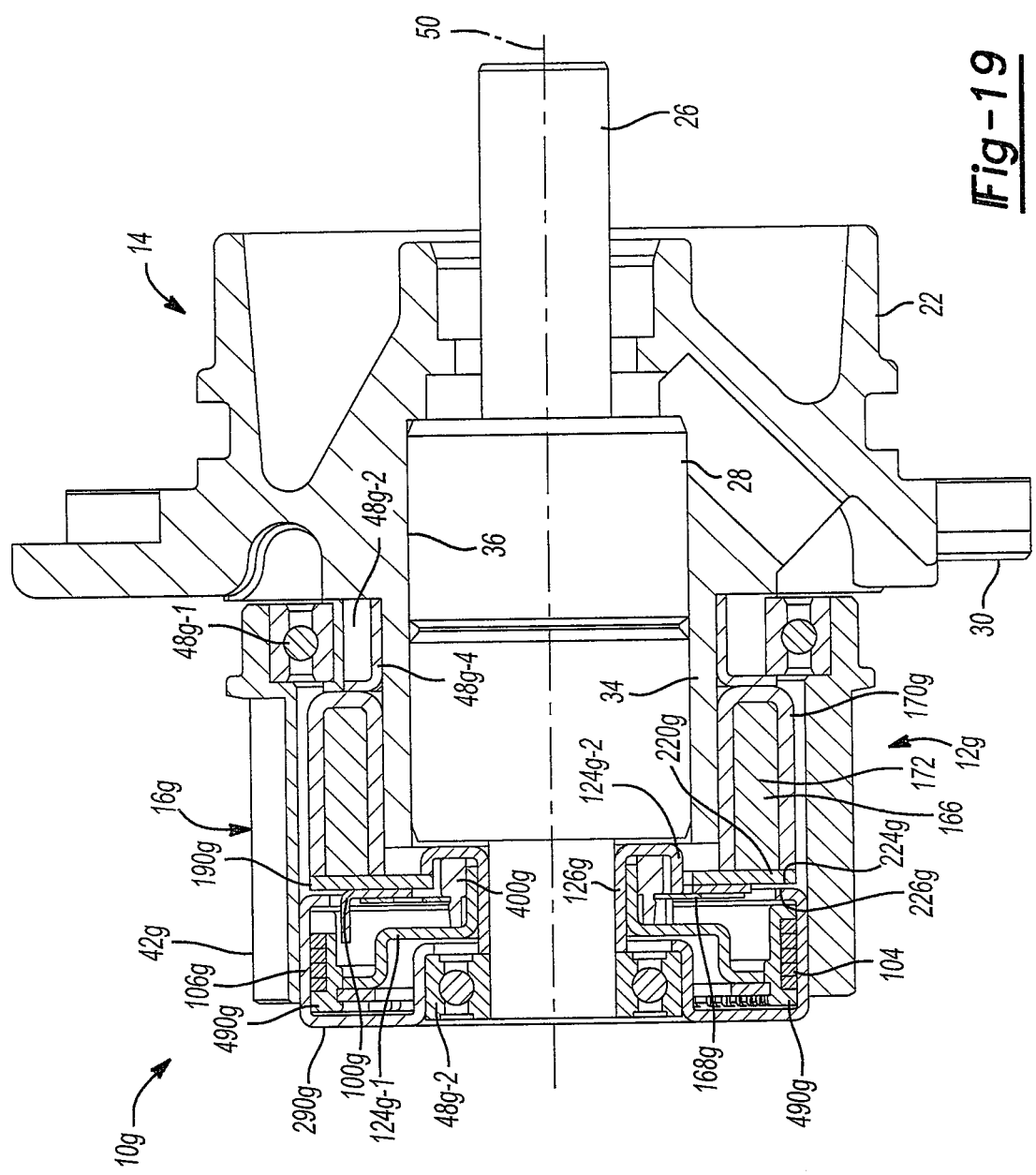
FIG. 19 is a section view of a portion of the driven accessory of FIG. 18 taken longitudinally along the rotational axis of an output member of the driven accessory.
Figure 20:
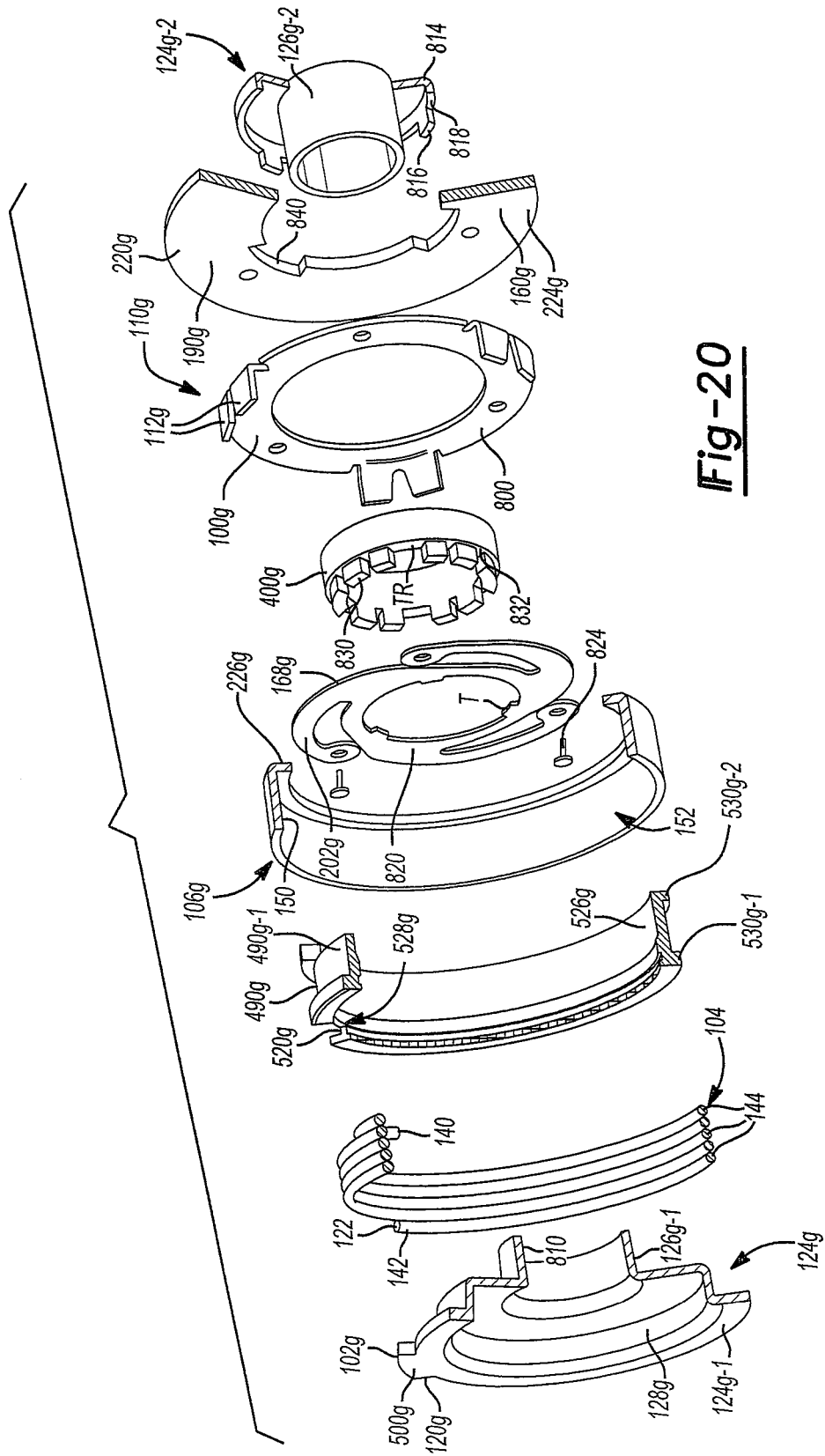
FIG. 20 is an exploded partly sectioned view of a portion of the driven accessory of FIG. 18 illustrating a portion of the clutch assembly in more detail.

With reference to FIGS. 18 through 20, another driven accessory constructed in accordance with the teachings of the present disclosure is generally indicated by reference numeral 10g. The driven accessory 10g can include an input member 12g, which can comprise a sheave 42g, an accessory portion 14, and a clutch assembly 16g. In the particular example provided, the sheave 42g is a sprocket having a plurality of teeth and is intended to be driven by a toothed belt which is part of an otherwise conventional timing drive, but it will be appreciated that the sheave 42g can be configured to engage a wide variety of drive systems, including without limitation, timing chains, multi-V belts, helically opposed tooth belts and gear trains. The input member 12g can be supported by a pair of bearings 48g-1 and 48g-2 for rotation about the rotational axis 50 of a drive shaft 26 of the accessory portion 14. While a spacer 48g-3 and a flange 48g-4 are illustrated as being employed between the bearing 48g-1 and the neck 32 of the housing 22 to permit the clutch assembly 16g (as assembled into the input member 12g) to be more easily installed to the accessory portion 14, it will be appreciated that the neck 32 of the housing 22 could be contoured somewhat differently to eliminate the spacer 48g-3 and flange 48g-4 if desired.

The clutch assembly 16g can comprise a first rotary clutch portion 100g, a second rotary clutch portion 102g, a spring carrier 490g, a wrap spring 104, a drive member 106g and an actuator 108g.

The first rotary clutch portion 100g is rotatably disposed about the rotational axis 50 of the driven accessory 10g and can comprise a body 800 and a fork 110g that can be fixedly coupled to (e.g., unitarily formed with) the body 800. The fork 110g can have bifurcated fork members 112g that can be configured to engage the control tang 140 of the wrap spring 104.

The second rotary clutch portion 102g can comprise a driver surface 120g against which an axial end face 122 of the wrap spring 104 can abut. In the particular example provided, the second rotary clutch portion 102g is integrally formed with a clutch output member or driver member 124g. More specifically, the driver member 124g comprises a first driver member portion 124g-1 and a second driver member portion 124g-2. The first driver member portion 124g-1 can comprise a lug 500g, which can form the second rotary clutch portion 102g, an annular leg 128g and an intermediate coupling portion 810. The intermediate coupling portion 810 can be a generally tubular member to which the annular leg 128g may be fixedly coupled. The annular leg 128g can extend radially outwardly from the intermediate coupling portion 810 and the lug 500g can be coupled to the outer periphery of the annular leg 128g. In the particular example provided, the lug 500g is formed as part of a discrete member that is fixedly coupled to the leg 128g, but it will be appreciated that the lug 500g could be integrally formed with the leg 128g in the alternative. The second driver member portion 124g-2 can comprise a coupling portion 126g, a flange portion 814, which can be fixedly coupled to and extend radially outwardly from the coupling portion 126g, one or more stop members 816 and a circumferentially extending lip member 818 that can extend axially away from the flange portion 814. The stop member(s) 816 can be coupled to an axial end of the lip member 818 on a side opposite the flange portion 814. The coupling portion 126g can be drivingly engaged to the drive shaft 26, e.g., via an interference fit. The intermediate coupling portion 810 can be drivingly engaged to the coupling portion 126g, e.g., via an interference fit, to rotatably couple the second driver member portion 124g-2 to the first driver member portion 124g-1.

The spring carrier 490g can be an annular structure or cartridge onto which the wrap spring 104 can be assembled. The spring carrier 490f can be formed of an engineering nylon, but those of skill in the art will appreciate that other materials could be employed in the alternative. The spring carrier 490f can define a slot 520g, an aperture 526g and a lug recess 528g. The aperture 526g is sized to permit the spring carrier 490g to be received over the leg 128g such that the lug 500g is received into and drivingly engages the lug recess 528g to inhibit relative rotation between the driver member 124g and the spring carrier 490g. The slot 520g is configured to receive the second end 142 of the wrap spring 104 and orient the axial end face 122 of the second end 142 such that it is abuts an edge of the lug 500g that defines the driver surface 120g when the spring carrier 490g is mounted to the driver member 124g. If desired, the spring carrier 490g can be axially fixed to the driver member 124g in any desired manner. Wall members 530g-1 and 530g-2 may be disposed on opposite axial sides of the spring carrier 490g and can be employed to maintain the wrap spring 104 axially on a body 490g-1 of the spring carrier 490g.

The drive member 106g can be a discrete component that can be fixedly and non-rotatably coupled to the input member 12g. In the particular example provided, the input member 12g is unitarily formed of a sintered powered metal material and the drive member 106g is a formed of a hardened steel material. It will be appreciated, however, that the drive member 106g could be integrally formed with the input member 12g in the alternative. The drive member 106g can define an interior clutch surface 150 that can be engaged by the helical coils 144 of the wrap spring 104 to facilitate the transmission of rotary power between the input member 12g and the drive shaft 26. As noted above, it may be desirable to employ a lubricant between the interior clutch surface 150 and the helical coils 144 of the wrap spring 104.

The actuator 108g can comprise an actuator member 160g, a means for moving the actuator member 160g axially along the rotational axis 50 between a first position and a second position and a means for generating a control torque that can be employed to bias the clutch assembly 16g into a predetermined condition (i.e., an engaged condition or a disengaged condition) as will be discussed in detail, below. The actuator member 160g can be coupled to the first rotary clutch member 100g for common rotation about the rotational axis 50. In the particular example provided, the actuator 108g further comprises an electromagnet 166 and a return spring 168g, and the actuator member 160g is an armature. As will be appreciated from the discussion above, other means for axially moving the actuator member 160g may be employed. The electromagnet 166g can be fixedly coupled to the housing 22 (e.g., via an interference fit) and can include an annular shell member 170g, a coil 172 and a pair of electrical leads or terminals (not specifically shown). The actuator member 160g can comprise a body 190g that can have an annular plate-like shape and which can be received over the drive shaft 26. The return spring 168g can include a spring body 820 and a plurality of cantilevered leaf springs or spring arms 202g that extend outwardly from the spring body 820. The spring body 820 can be axially and non-rotatably mounted on a bushing 400g that can be rotatably received on the intermediate coupling portion 810 of the first driver member portion 124g-1. Fasteners, such as rivets 824, can be employed to fixedly couple the distal ends of the spring arms 202g to the body 800 of the first rotary clutch member 100g and to the body 190g of the actuator member 160g to thereby bias the first rotary clutch member 100g and the actuator member 160g axially away from the electromagnet 166. In the particular example provided, the bushing 400g includes a plurality of radially inwardly deflectable fingers 830 adjacent an annular groove 832. The body 820 of the return spring 168g can be received over the fingers 830 and into the annular groove 832, and the fingers 830 can be configured to inhibit or limit movement of the body 820 of the return spring 168g in a direction away from the first driver member portion 124g-1. Tabs T can be formed onto the body 820 of the return spring 168g and can engage tab recesses TR in the bushing 400g to rotatably couple the return spring 168g to the bushing 400g.

In the particular example provided, slots 840 are formed in the actuator member 160g (e.g., in the body 190g about its inner periphery) that are configured to receive the stop members 816 that are coupled to the second driver member portion 124g-2. It will be appreciated that contact between the stop members 816 and associated edges of slots 840 can limit relative rotation between the actuator member 160g and the second driver member portion 124g-2 to thereby limit an amount by which the first rotary clutch portion 100g may deflect the control tang 140 and avoid overstressing of the control tang 140.

The means for generating a control torque can comprise a drag member or teaser 220g that can be coupled to the actuator member 160g for rotation and axial movement therewith. In the particular example provided, the teaser 220g is integrally formed with the actuator member 160g, but it will be appreciated that the teaser 220g could be a discrete component that is coupled to the actuator member 160g. The spring arms 202g of the return spring 168g are configured to bias the actuator member 160g and the teaser 220g axially away from the electromagnet 166 such that a first teasing surface 224g on the teaser 220g frictionally engages a second teasing surface 226g formed on the drive member 106g. In the particular example provided, the second teasing surface 226g is a lip member that extends radially inwardly from the portion of the drive member 106g that is engaged to the input member 12g and defines the interior clutch surface 150.

A cap member 290g can be engaged to the input member 12g and can be employed to cover a front end of the driven accessory 10g to prevent the ingress of dust, dirt and moisture into the cavity into which the clutch assembly 16g is received.

It will be appreciated that engagement of the first and second teasing surfaces 224g and 226g can generate a control torque that can be transmitted via the first rotary clutch member 100g to the control tang 140 of the wrap spring 104 to cause the clutch assembly 16g to operate in an engaged mode. It will also be appreciated that the actuator 108g may be operated to translate the teaser 220g axially away from the drive member 106g such that the first and second teasing surfaces 224g and 226g can disengage one another and optionally to frictionally engage the body 190g of the actuator member 160g to the electromagnet 166 to create a drag force that is transmitted to the control tang 140 that causes the helical coils 144 of the wrap spring 104 to wrap or coil more tightly to more fully disengage the interior clutch surface 150 on the drive member 106g.

With reference to FIG. 32, a portion of another driven accessory constructed in accordance with the teachings of the present disclosure is shown. The driven accessory can include an input member (not specifically shown), a clutch assembly 16h, and an accessory portion (not specifically shown). The clutch assembly 16h can comprise a first rotary clutch portion 100h, a second rotary clutch portion 102h, a spring carrier 490h, a wrap spring 104, a drive member 106h and an actuator 108h.

The first rotary clutch portion 100h can be disposed about the rotational axis 50 of the driven accessory and can serve as an element that can be employed to input a control torque to the wrap spring 104 to thereby control the operation of the clutch assembly 16h. The first rotary clutch portion 100h can comprise any means for imparting a torsional control signal to the wrap spring 104 and in the particular example illustrated, includes a fork (not specifically shown) having bifurcated fork members (not specifically shown) that are configured to engage the control tang (not specifically shown) of the wrap spring 104.

The second rotary clutch portion 102h can include a driver surface 120h against which an axial end face (not specifically shown) of the wrap spring 104 can abut. The second rotary clutch portion 102h can be integrally formed with a clutch output member or driver member 124h that can comprise a plurality of lugs 500h (similar to the lugs 500 of FIG. 12), a coupling portion 126h and an annular leg 128h. The coupling portion 126h can be a hollow, generally tubular structure that can be fixedly coupled to the drive shaft of the accessory portion such that rotation of the driver member 124h causes corresponding rotation of the drive shaft. In the example provided, the coupling portion 126h is coupled to the drive shaft via an interference fit, but it will be appreciated that any other suitable coupling means may be employed in addition to or in lieu of the interference fit. The leg 128h can be coupled to the coupling portion 126h and can extend in radially outwardly therefrom so as to faun an annular support surface 130h and a circumferentially extending rib or abutment 136h that is configured to limit axial movement of the wrap spring 104 in a direction toward the actuator 108h. The lugs 500h can be coupled to the leg 128h proximate the distal end of the leg 128h.

The spring carrier 490h can be generally similar to the spring carrier 490 of FIG. 12 and need not be described in significant detail herein. Briefly, the spring carrier 490h can be non-rotatably coupled to the driver member 124h and can be configured to hold a portion of the wrap spring 104 such that the axial end face (not specifically shown) of the second end (not specifically shown) of the wrap spring 104 can abut a lug 500h that is associated with the second rotary clutch portion 102h.

The wrap spring 104 can be sized such that the helical coils 144 are smaller in diameter than the interior clutch surface 150 on the drive member 106h when torque is not being input or transmitted through the wrap spring 144.

The drive member 106h can be integrally formed with a portion of the input member or a discrete component that is coupled to the input member for rotation therewith. The drive member 106h can define an interior clutch surface 150 and a cavity 152 into which various components of the clutch assembly 16h, including the wrap spring 104, the first rotary clutch portion 100h and the second rotary clutch portion 102h, can be received. The helical coils 144 of the wrap spring 104 can be configured to engage the interior clutch surface 150 to facilitate the transmission of rotary power between the input member and the drive shaft. As noted above, it may be desirable to employ a lubricant between the interior clutch surface 150 and the helical coils 144 of the wrap spring 104. In the particular example provided, the drive member 106h includes a radially extending annular wall 1000 and an axially extending annular wall 1002. The axially extending annular wall 1002 can be generally concentric with the coupling portion 126h and the bearing 48h can be mounted between the axially extending wall 1002 and the leg 128h of the driver member 124h to support the drive member 106h for rotation about the rotational axis 50 of the drive shaft.

The actuator 108h can comprise an actuator member 160h, which can be coupled to the first rotary clutch member 100h for common rotation about the rotational axis 50, a means for moving the actuator member 160h axially along the rotational axis 50 between a first position and a second position and a means for generating a control torque that can be employed to bias the clutch assembly 16h into a predetermined condition (i.e., an engaged condition or a disengaged condition) as will be discussed in detail, below. In the particular example provided, the actuator 108h further comprises an electromagnet 166 and a return spring 168h, and the actuator member 160h is an armature. As will be appreciated from the discussion above, other means for axially moving the actuator member 160h may be employed.

The electromagnet 166 can be fixedly coupled to the housing of the accessory portion and can include an annular shell member 170h, a coil 172 and a pair of electrical leads or terminals (not specifically shown). The actuator member 160h can comprise a body 190h that can have an annular plate-like shape and which can be received over the axially extending annular wall 1002.

The return spring 168h can be mounted on a bushing 400h that can be rotatably received on the axially extending annular wall 1002 such that the return spring 168h is disposed between the leg 128h and the actuator member 160h. A snap ring 1010 can be employed to limit axial movement of the bushing 400n on the axially extending annular wall 1002. The return spring 168h can include one or more fixation points (not specifically shown) that can be employed to fixedly and rotatably couple the return spring 168h to the actuator member 160h and the first rotary coupling portion 100h. The return spring 168h can be configured to bias the actuator member 160h axially in a predetermined direction. In the particular example provided, the clutch assembly 16h is normally disengaged and the return spring 168h biases the actuator member 160h in a direction away from the radially extending annular wall 1000 of the drive member 106h.

The means for generating a control torque can comprise a drag member or teaser 220h that can be coupled to the actuator member 160h for rotation and axial movement therewith. In the particular example provided, the teaser 220h is integrally formed with the actuator member 160h, but it will be appreciated that the teaser 220h could be a discrete component that is coupled to the actuator member 160h or to the bushing 400h. The return spring 168h is configured to bias the actuator member 160h and the teaser 220h axially away from the electromagnet 166 such that a first teasing surface 224h on the teaser 220h does not frictionally engage a second teasing surface 226h formed on the radially extending wall 1000 of the drive member 106h.

It will be appreciated that disengagement of the first and second teasing surfaces 224h and 226h will permit free rotation of the drive member 106h relative to the first rotary clutch portion 100h such that a control torque will not be generated or applied to the control tang of the wrap spring 104. Accordingly, the helical coils 144 of the wrap spring 104 will not tend to unwind and engage the interior clutch surface 150 so that rotary power will not be transmitted through the clutch assembly 16h.

It will also be appreciated that the actuator 108h may be actuated (e.g., the electromagnet 166 may be operated or activated) to generate a magnetic field that attracts the actuator member 160h such that the first and second teasing surfaces 224h and 226h engage one another to generate a control torque that can be transmitted via the first rotary clutch member 100h to the control tang of the wrap spring 104 to cause the helical coils 144 to unwind and engage the interior clutch surface 150 such that the clutch assembly 16h operates in an engaged mode.

The ability to disengage the clutch assembly of any of the examples described above may be hampered, due to the presence of moisture within the clutch assembly and/or the increased viscosity of a lubricant, if present, within the clutch assembly. Further, in cold conditions the viscosity of the lubricant in the bearing of the clutch assembly may inhibit free rotation of the bearing. For example, in sub-freezing temperature conditions the lubricant and/or a combination of lubricant and moisture of the wrap spring may result in "stiction" occurring between various surfaces within the clutch assembly that are configured to be rotatable relative to one another (e.g., the outer surface of the helical coils of the wrap spring and the interior clutch surface of the driver; between the wrap spring and the first rotary clutch member; between the first and second teasing surfaces) and this "stiction" may inhibit disengagement of the clutch assembly.

Accordingly, the present inventors have determined that when an electromagnet is employed in the actuator, the electromagnet can be energized to act, to some extent, as a heater to raise the temperature within the clutch assembly to reduce or eliminate "stiction" and/or to reduce the viscosity of the lubricant in the bearing. Ideally, the electromagnet can be energized prior to starting the internal combustion engine or other device on which the clutch assembly has been installed to provide time for the temperature within the clutch assembly to be raised.

Figure 21:
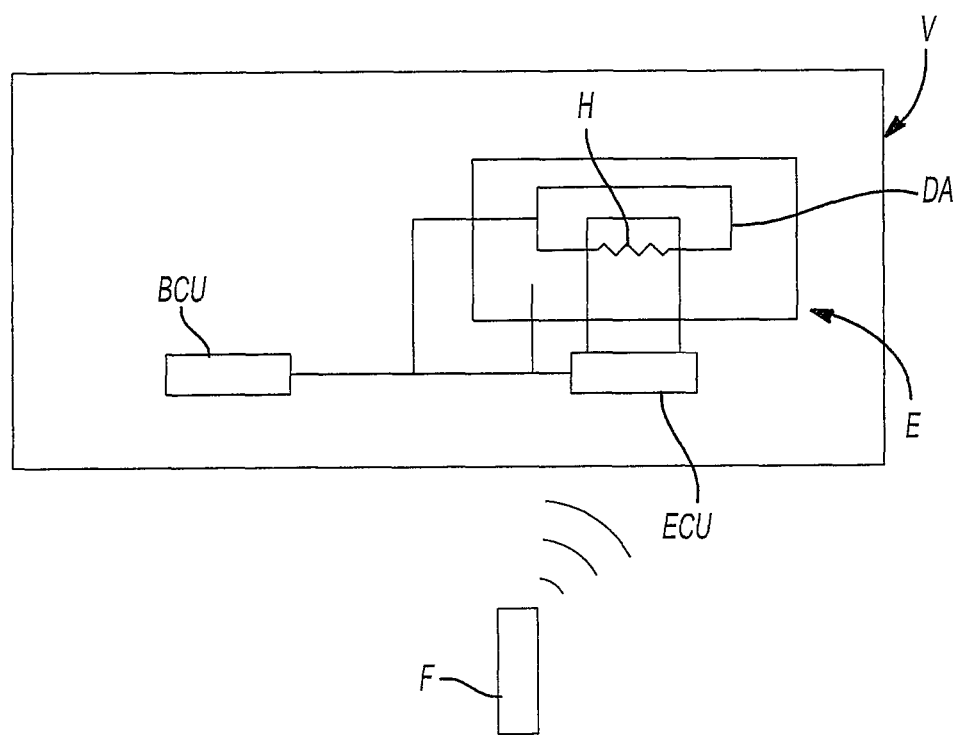
FIG. 21 is a schematic illustration of an exemplary vehicle having a driven accessory constructed in accordance with the teachings of the present disclosure, the vehicle having a controller that is configured to sense the approach of a vehicle operator and responsively initiate a heating operation in the clutch assembly of the driven accessory.

In FIG. 21, an exemplary vehicle V is schematically illustrated as including an engine E that is configured to drive a driven accessory DA constructed in accordance with the teachings of the present disclosure. The vehicle V can include various controllers, such as an engine control unit ECU and a body control unit BCU, and can be equipped with a keyless entry system. The keyless entry system could be any type of keyless entry system and can employ any type of electromagnetic radiation to perform various functions (e.g., unlocking of the vehicle doors, starting of the engine E). In the particular example depicted, the keyless entry system is a passive keyless entry system having a fob F that communicates with one or more of the vehicle controllers to permit the vehicle V to effectively "sense" the presence of the fob F within a zone of a predetermined radius and/or the approach of the fob F toward the vehicle V. Upon "sensing" the presence of the fob F within a zone of a predetermined radius and/or the approach of the fob F toward the vehicle V, the vehicle controller (e.g., the engine control unit ECU) can be configured to energize the electromagnet of the clutch assembly prior to the starting of the engine E to allow more time for the energized electromagnet to heat the clutch assembly. It is also contemplated that such functionality can be subject to a determination by the vehicle controller (e.g., the engine control unit ECU) that heating is warranted. For example the vehicle controller may determine that heating of the electromagnet is warranted based solely on whether the ambient air temperature is less than a predetermined temperature threshold. It will be appreciated that other criteria may also be employed, including without limitation altitude, barometric pressure, and relative humidity. In this way, the heating of the electromagnet may be performed only when conditions exist that renders the occurrence of "stiction" likely.

Additionally or alternatively, the driven accessory DA could include an electric heater element H, which could take the form of a resistive coating, a ceramic heater element or any other suitable device or configuration as will occur to those of skill in the art. The electric heater element may be energized instead of, or in addition to, the energizing of the electromagnet to appropriately heat the clutch assembly as needed.

It is contemplated that when the driven accessory may be controlled by under a variety of control strategies, depending on the type of accessory portion that is employed. For example, if the accessory portion is a water pump for the internal combustion engine of an automotive vehicle, one control strategy could be to disengage the clutch assembly to prevent operation of the water pump when the engine is undergoing an initial (i.e.—cold) start. In such a case, the engine and catalytic converter will more quickly achieve a desired operating temperature so that overall undesirable emissions can be reduced. Once the desired operating temperature is achieved, the clutch assembly can be engaged to permit the water pump to operate in the conventional manner.

In a more advanced control strategy, the clutch assembly can be disengaged whenever operation of the water pump is not required. In such a case, operation of the water pump can be inhibited for cold starts as described above, as well as under other circumstances, such as when it is not necessary to circulate cooling water through the engine. One such situation involves operation of the vehicle on a highway in relatively cool ambient air temperatures and with a moderate engine load. In such cases, thermo-siphoning and other passive cooling effects may provide sufficient cooling without requiring operation of the water pump.

By utilizing a more advanced control strategy, wherein the clutch on the water pump is engaged and disengaged as appropriate, numerous advantages can be obtained. For example, operating a water pump can consume between five and twelve horsepower, which is a significant parasitic loss in the engine system when operation of the water pump is, in fact, not required. By disengaging the clutch on the water pump when the operation of the water pump is not required, the fuel efficiency of the vehicle can be improved.

Similarly, during start-stop driving the water pump can be stopped during short stops to allow the engine to be maintained at the optimal operating temperature. The water pump can be turned off and on, as needed, in order to ensure that the optimal, or near optimal, engine operating temperature is maintained, thereby reducing the range of the engine operating temperature.

Other strategies can give priority to the operation of the water pump even when the engine operating temperature is not within an optimal range of temperatures. For example, it may be desirable in some situations to operate the water pump so that heat from the cooling water may be employed to heat the vehicle passenger compartment or to operate the vehicle windshield defroster. As another example, it may be desirable to operate the water pump when the ambient air temperature is extremely cold so as to ensure that the cooling fluid in parts of the cooling system will not freeze.

These alternative control strategies could be triggered in numerous ways. For example, the vehicle could be equipped with a toggle switch that permits the cooling system to be operated in a first mode, in which priority is given to a water pump control strategy that maximizes fuel economy and/or the reduction of harmful emissions, and a second mode in which priority is given to a water pump control strategy that provides enhanced passenger comfort (relative to the first mode). In the alternative, the vehicle could employ a controller that is configured to receive various inputs and to select an appropriate control strategy for the water pump. Such inputs could comprise: the ambient air temperature, the operational state of the air conditioning compressor and/or the setting or settings of the vehicle climate control system. In one implementation, a first control strategy could be employed to maximize fuel economy and/or to minimize harmful emissions regardless of the settings of the vehicle climate control system if the ambient air temperature is above a first predetermined threshold, such as 25° C. (77° F.); a second control strategy could be employed to balance fuel economy and/or the reduction of harmful emissions with performance of the vehicle windshield defroster if the vehicle climate control system is operated in a defroster mode and the ambient air temperature is below the first predetermined threshold but above a second ambient air temperature; a third control strategy could be employed to balance fuel economy and/or the reduction of harmful emissions with performance of the vehicle heating system if the vehicle climate control system is operated in a heating mode and the ambient air temperature is below the first predetermined threshold but above a third ambient air temperature; a fourth control strategy could be employed to balance fuel economy and/or the reduction of harmful emissions with performance of the vehicle windshield defroster and the vehicle heating system if the vehicle climate control system is operated in both a defroster mode and a heating mode and the ambient air temperature is below a fourth predetermined threshold but above a fifth ambient air temperature; a fifth control strategy could be employed to maximize the performance of the vehicle windshield defroster and/or the vehicle heating system if either or both are operated and the ambient air temperature is below a predetermined sixth threshold; and a sixth control strategy could be employed to "pulse" the operation of the water pump (i.e., briefly operate the water pump) upon the occurrence of a predetermined set of conditions. The predetermined set of conditions for the initiation of operation via the sixth control strategy could include, for example, an ambient air temperature that is less than a predetermined threshold, such as −40° C. and the operation of the engine when the engine is in a "cold" state (i.e., the temperature of the cooling water is below a desired water temperature). When operating in this mode, the initiation of the operation of the water pump may be based on a detected water temperature (of water within the engine block) in excess of a predetermined threshold, such as 70° C. The duration of operation may be fixed (i.e., a predetermined time interval) or could be variable, based on other criteria (e.g., the detected temperature of the water within the engine block being less than another predetermined threshold, such as 15° C.). In the situation described, it will be appreciated that the "pulsing" of the operation of the water pump can reduce thermal shock to the engine. Operation in the sixth mode may be terminated (in favor of another operational mode) if the temperature of the cooling water does not fall below a desired threshold (e.g., 15° C. or 20° C.) for a predetermined amount of time while the water pump is operating. It should also be appreciated that "pulsing" of the operation of the water pump (or another clutched accessory) could be employed for other purposes as well (e.g., to ensure air is purged from the cooling system after the cooling water is drained and replaced). It will be further appreciated that additional modes of operation may be employed for purposes of performing diagnostics and/or service (e.g., modes in which the clutch assembly is operated in a continuously engaged condition, a continuously disengaged condition, or a condition that switches between engaged and disengaged upon the occurrence of a predetermined condition, such as the expiration of a time increment, which may be fixed or set by the technician, or the manual generation of a trigger by the technician).

Further, disengaging the clutch on the water pump, or any other engine accessory during start up reduces the spinning inertia of the engine, which in turn, reduces the magnitude of the torque that is required for starting the engine. This can be used to help reduce the size of the electric motor of the starter and/or to improve the durability of the starter.

It is contemplated that an additional advantage can be obtained by disengaging the clutch on the accessory portion during brief periods of hard vehicle acceleration to reduce the accessory load on the engine while accelerating. Once the requirement for acceleration is met, or if operation of the accessory portion is required (e.g., the accessory portion is a water pump and the engine operating temperature exceeds a predefined temperature), the clutch assembly on the driven accessory can be re-engaged.

In addition, it is contemplated that the use of such advanced cooling strategies may eliminate the need for a cooling system thermostat, thus removing a potential point of cooling system failure and avoiding the cost of the thermostat. For such more advanced control strategies, the engine can be provided with multiple thermal sensors to determine the operating temperature of relevant parts of the engine (i.e.—the cylinder head, etc.) and those sensors can have their signals applied to the ECU which will process them to determine whether it is necessary to engage or disengage the clutch on the water pump. However, as will be apparent to those of skill in the art, the requirement for multiple thermal sensors (rather than the single coolant temperature sensor which is typically employed) and multiple ECU inputs will raise the cost of implementing the more advanced control strategies.

The present inventors, however, have determined that advanced control strategies, which control operation of the water pump in circumstances in addition to cold start conditions, can be achieved without requiring multiple thermal sensors and ECU inputs. Specifically, the present inventors have determined that an engine can be thermally profiled and the results of that thermal profile stored and employed in the ECU to correctly control the operation of the water pump. As part of the development of an engine and/or vehicle, an instance of the engine can be robustly instrumented to measure the temperature of critical engine components during different operating conditions, such as different ambient temperatures, different engine loading conditions, different accessory operating configurations (air conditioning operating, air conditioning inoperative, etc.), the temperature of the engine coolant, etc. This set of temperature measurements and their corresponding operating conditions and parameters are then used to develop a thermal profile for the engine and vehicle and is used in all subsequent instances of the vehicle and engine.

The instrumentation for developing the thermal profile can comprise thermisters, thermocouples, other contact-type sensors and/or thermal imaging. However, the number of sensors which can be required to develop a comprehensive thermal profile of an engine can be high and the deployment of such sensors on the test engine can require multiple holes to be formed in the engine to place the sensors. Further, some areas of the engine, such as plastic components or moving components, may not be able to accommodate a sensor. To mitigate such issues, the present inventors contemplate that the thermal profile of the engine can be developed, in whole or in conjunction with non-contact sensors, via infrared thermography wherein the exterior of the engine is thermally imaged to determine the temperatures at the engine's exterior surfaces. It is contemplated that the use of infrared thermography will make the development of suitable thermal profiles more feasible, faster, and more economically than having to employ multiple contact sensors.

Irrespective of how the thermal profile is developed, ideally the operating conditions and parameters of the profile correspond to information (engine load, fuel flow, ambient air temperature, coolant temperature, engine RPM, throttle position, transmission gear position, etc.) which the ECU already receives inputs for. The ECU which is part of each assembly of the vehicle and engine combination can then employ the thermal profile as a form of look up table, with the relevant inputs, to determine if and when the water pump can be disengaged without requiring that each vehicle be provided with additional sensors.

It is further contemplated that, as an additional fail safe measure, the driving circuitry for the electromagnet can also be fail safed by employing a double driver configuration. Specifically, it is known that, in some circumstances, driver outputs from an ECU can fail in an "ON" state (i.e.—wherein their output is maintained at all times). If the electromagnet of a clutch assembly constructed in accordance with the present teachings is connected between a ground point and a hot (positive voltage) driver of the ECU and such an "ON state" failure was to occur, then the clutch assembly could remain in a disengaged condition, resulting in over heating of, and possibly damage to, the engine due to the non-operation of the accessory portion.

Figure 22:
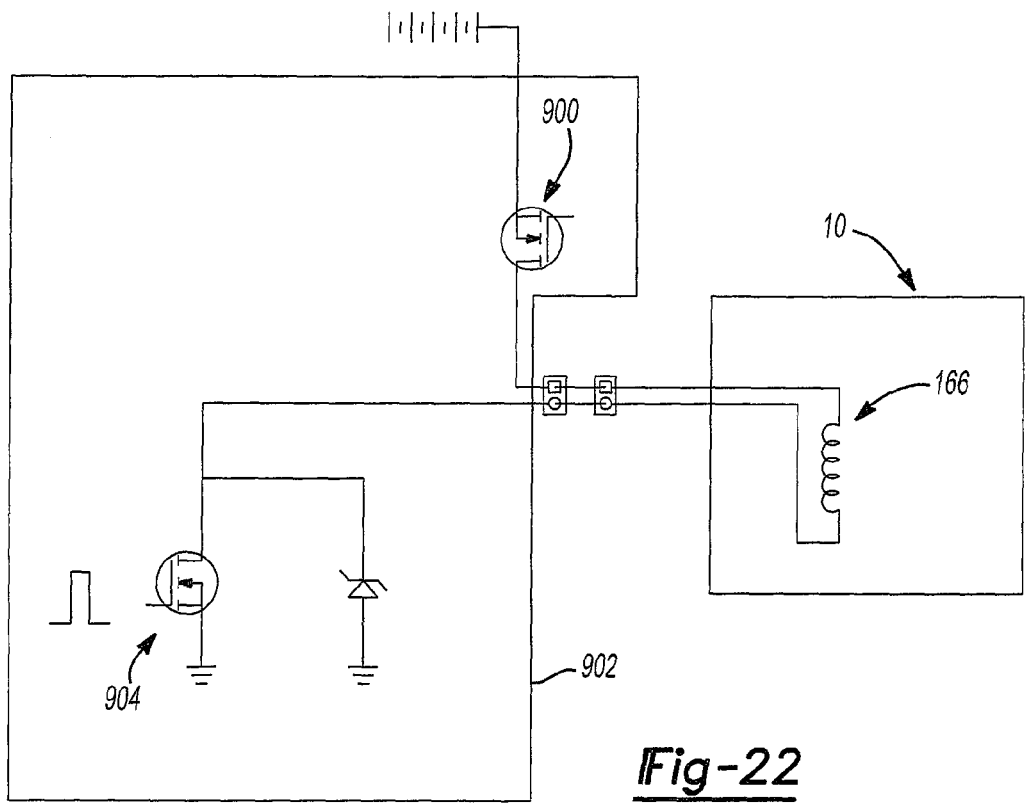
FIG. 22 is a schematic illustration of a portion of a vehicle having a driven accessory constructed in accordance with the teachings of the present disclosure, the driven accessory having an electromagnet that is electrically coupled to a source of electrical power and an electrical ground through two drivers.
Figure 23:
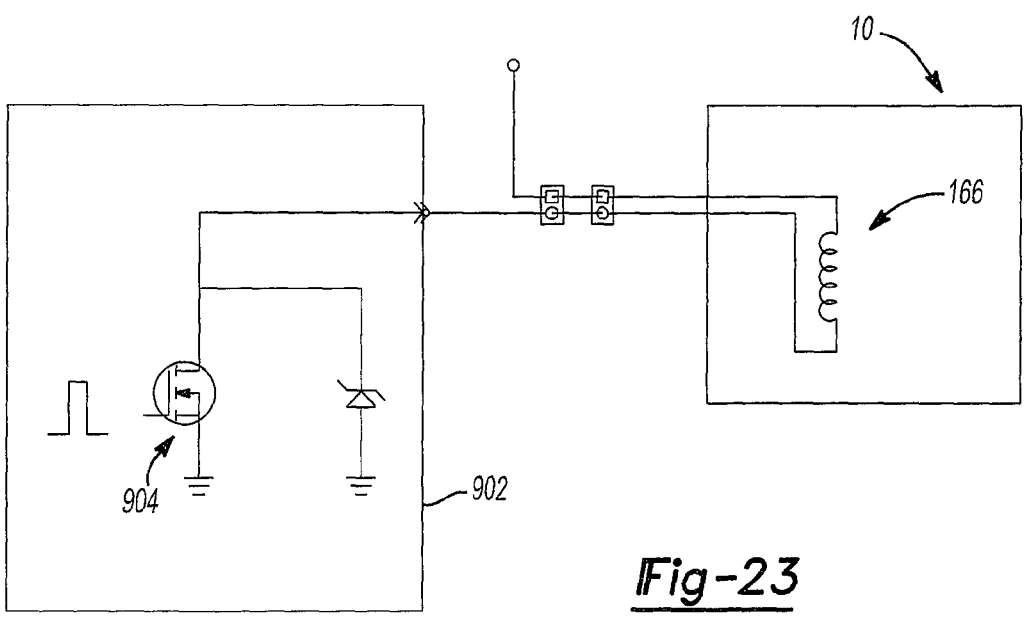
FIG. 23 is a schematic illustration similar to that of FIG. 22, but employing but a single driver for controlling the flow of electrical power through the electromagnet.

To reduce the chances of such a failure occurring, the electromagnet 166 of the clutch assembly CA can be connected between a hot (positive voltage) driver 900 of the ECU 902 and a ground level driver 904 of the ECU 902 as shown in FIG. 22. As relatively low current may be employed to operate the electromagnet, the drivers 900 and 904 can be field effect transistors, rather than relays. Thus, the electromagnet 166 can be activated only if both drivers 900 and 904 are operative and can be switched, respectively, to a positive and ground voltage output. As will be apparent to those of skill in the art, if either driver 900 and 904 fails in an ON state, the other driver will still be able to de-energize the electromagnet 166 to prevent the undesired continuous disengagement of the clutch assembly. It will be appreciated, however, that a single driver could be employed to control the flow of electrical power through the electromagnet 166, as is shown in the example of FIG. 23.

As will be apparent from the above, the present invention provides a robust, relatively low cost, clutch assembly which provides for an energy-efficient means of engaging and disengaging a sheave, sprocket or gear from the drive shaft of a driven accessory. The clutch assembly can be engaged in response to the input of a teasing torque to the control tang of the wrap spring to cause the wrap spring to uncoil or unwind to engage the interior clutch surface of a driver. The relative rotation of the first rotary clutch portion that is needed for engagement and disengagement of the wrap spring to the driver can be achieved by energizing, or de-energizing, an electromagnet or with an electric solenoid, a hydraulic or pneumatic actuator, etc. While an axially movable actuator member is expressly contemplated herein that may be selectively attracted and/or repulsed during operation of an actuator to control engagement, disengagement or both of the wrap spring, it will be appreciated that the teasing function could be initiated in different ways, including the use of a clutch (e.g., a viscous clutch) that may configured to transmit only a relatively low torque therethrough such that the clutch is configured to perform only the teasing function and is not configured to transmit substantially all of the rotary power that is transmitted between the input member and the accessory portion. It is expressly contemplated herein that in the alternative, the actuator member could be moved to cause the teaser to radially expand or contract to engage or disengage another structure to generate the control torque or to cease generating the control torque as desired.

It will be appreciated that operation of the clutch assembly can be coordinated with other system controls to take optimize efficiency. For example, where the clutch assembly is employed to selectively operate a pump (e.g., an air pump or compressor), control of the clutch assembly can be coordinated with the operation of a valve that is employed to selectively permit fluid communication between an outlet of the pump and a fluid system that receives pressurized fluid; the valve can be closed so as to inhibit fluid communication with the fluid system to inhibit pressurized fluid from leaking through the pump. Other efficiencies can be obtained through inoperation of various devices when they are not needed (e.g., where the clutch assembly is employed to selectively transmit rotary power to an alternator or a generator, the clutch assembly may be operated in a disengaged state when a battery that is coupled to the alternator or the generator is in a fully charged state).

When an electromagnet is employed to control the clutch, the clutch assembly can be configured to fail safe, such that the clutch assembly engages despite a failure of the coil and/or the circuit that is employed to energize the coil. Further, the transfer of torque from the end of the wrap spring to driver surface results in the transfer of the torque via a compressive load on the wrap spring which removes the need for a tang or other feature to be formed on the second end of the wrap spring (i.e., the end opposite the control tang) and which avoids bending or shearing forces being applied to the second end of the spring, which can increase the expected operating lifetime of the clutch assembly. It will be appreciated that the second end of wrap spring can be equipped with a tang or other feature in the alternative if desired.

The clutch can employ a wrap spring whose nominal or "at rest" outer diameter is slightly smaller than the diameter of the corresponding interior clutch surface of the driver, thus reducing wear between the wrap spring and the interior clutch surface when the clutch assembly is disengaged. In situations where a teaser is employed, the teaser may be in direct, or indirect, frictional contact with the driver, such that a torque generated by the frictional contact is transmitted through the teaser to the first rotary clutch portion to the control tang of the wrap spring.

It is also contemplated that the clutch can employ a wrap spring with a nominal or "at rest" outer diameter which is slightly larger than the diameter of the corresponding interior contact surface of the driver. In this case a teaser is not required to open the diameter of the wrap spring because, as the first rotary clutch member rotates back to its initial position relative to the second rotary clutch member, the at rest diameter of the wrap spring will engage the interior clutch surface of the driver to allowing the control tang to move to unwind the wrap spring.

While each of the above-described examples employs the engagement of first and second teasing surfaces to at least partly generate a torsional signal that may be input to the wrap spring to cause engagement of the wrap spring to the drive member, we note that it may be desirable in some situations to omit the "teasing" produced by the first and second teasing surfaces altogether and rely exclusively upon permanent frictional contact between one or more of the helical coils of the wrap spring and the drive member to provide the torsional input to the wrap spring that is needed to drivingly engage the wrap spring to the drive member.

We have found that in some situations it may be desirable to include a material on one or more components of the driven accessory (e.g., the actuator member and/or that contacts the actuator member when the clutch assembly is to be disengaged and/or to include a material on one or both of the components that generate the teasing force to cause engagement of the clutch assembly) to provide one or more desired characteristics, such as improved wear resistance, reduced noise, stabilization of dynamics (e.g., oscillations of the actuator member and/or the wrap spring) at a desired time, and/or resisting magnetization of the actuator member. The material employed could be any type of coating and/or material that is affixed, bonded to or deposited on a component of the driven accessory. Non-limiting examples include metals (e.g., nickel), annodization, ceramics and/or friction materials.

In the example of FIGS. 10 and 11, a friction material FM can be fixedly coupled to a face of the body 190c of the actuator member 160c that faces the electromagnet 166. The friction material FM can be formed of any suitable friction material and can be bonded or otherwise secured to the face of the body 190c in a desired manner. In the example provided, the friction material is formed of a HM200 friction paper that is marketed by Miba Hydramechanica of Sterling Heights, Mich. While the particular friction material selected is normally used for wet (i.e., oil lubricated) applications, it will be appreciated that various other types of friction materials, including those intended for dry (i.e., non-lubricated) applications, or other types of materials may be employed in the alternative. The friction material FM can have any desired thickness, such as a thickness that is less than or equal to 1 mm. For example, the friction material FM can have a thickness that is greater than or equal to about 0.1 mm and less than or equal to about 0.65 mm, such as a thickness that is less than or equal to about 0.38 mm or less than or equal to about 0.25 mm. The friction material FM can have a minimum coefficient of static friction of that is greater than or equal to 0.12. The friction material FM can be formed as an annular disc such that the friction material FM would make continuous contact with a mating surface (e.g., a surface on the electromagnet 166), or could be formed in an interrupted manner as shown in FIG. 10A to leave a portion of the face of the body 190c exposed to the magnetic field created by the electromagnet 166, which can permit the use of a lower power electromagnet.

Returning to FIGS. 10 and 11, the friction material FM can reduce wear between the actuator member 160c and the electromagnet 166 so that not only will the actuator member 160c and the electromagnet 166 last longer, but the air gap between the magnetically susceptible portion of the actuator member 160c and the electromagnet 166c will tend to change less over time so that the clutch assembly will perform in a more reliable and predictable manner. As noted above, the friction material FM can reduce noise that would otherwise be generated as a result of slipping contact between the body 190c and the electromagnet 166 as the clutch is being disengaged or re-engaged, can help to control rotational acceleration of the actuator member 160c, and can stabilize the dynamics and/or oscillations of the actuator member 160c as the clutch is being disengaged or re-engaged. Regarding this latter point, we note that the stabilization of the dynamics and/or oscillations of the actuator member 160c has a corresponding stabilizing effect on the wrap spring 104 (due to the connection therebetween) and as such, reduces dynamic loads on the wrap spring 104, the driver member 124c and the accessory portion of the driven accessory. Stabilization of the dynamics and/or oscillations of the actuator member 160c may be realized, for example, through increased frictional damping between the actuator member 160c and the electromagnet 166 in a rotational direction; increased damping between the actuator member 160c and the electromagnet 166 in an axial direction; and/or the creation of very uniform mating surfaces between the actuator member 160c and the electromagnet 166 as a result of the wear and break-in of the friction material FM on the electromagnet 166 (which creates very uniform mating surfaces that creates smoother torque transmission between the actuator member 160c and the electromagnet 166). It will be appreciated that increased friction between the actuator member 160c and the electromagnet 166 reduces the magnitude of the preload applied by the return spring 168c to achieve a given amount of slip in the clutch assembly, thereby providing two distinct opportunities: a) lowering the preload force that is applied by the return spring 168c; or b) using the same return spring 168c so that the same preload force is generated, which in turn creates a higher energizing torque on the wrap spring 104 so that the clutch assembly is capable of transmitting higher levels of torque.

Figure 34:
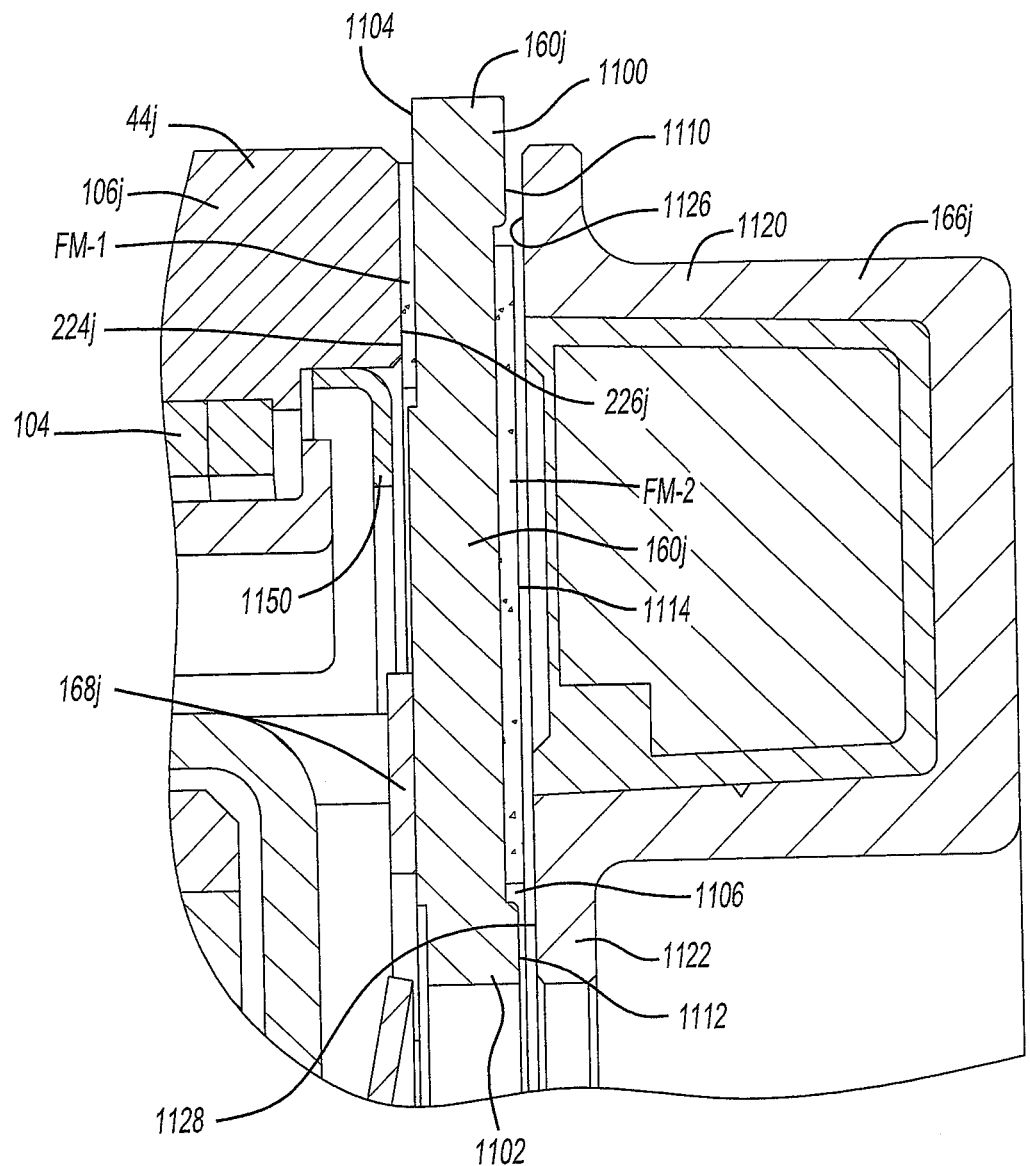
FIG. 34 is a section view of a driven accessory that is similar to the one depicted in FIGS. 10 and 11 but depicting the actuator member with friction material on both axial sides.

In the example of FIG. 34, the actuator member 160j comprises an annular body 190j that defines first and second rim members 1100 and 1102, respectively, a first recess 1104 and a second recess 1106. The first recess 1104 can have an annular shape and can be formed on an axial side of the annular body 190j that faces the sheave spacer 44j. A first friction material FM-1 can be received in the first recess 1104 and can be fixedly coupled to the annular body 190j. The second recess 1106 can have an annular shape and can be received between the first and second rim members 1100 and 1102. A second friction material FM-2 can be received in the second recess 1106 and can be fixedly coupled to the annular body 190j. The first and second rim members 1100 and 1102 can define a respective face 1110 and 1112, respectively, that is parallel to but axially offset from a rearward face 1114 of the second friction material FM-2.

The electromagnet 166j can include a housing that is formed of a magnetically susceptible material, such as steel or iron, and can include radially outer and inner rims 1120 and 1122, respectively, that can terminate at respective forward faces 1126 and 1128. The electromagnet 166j can be configured to produce a magnetic field that can be applied to the annular body 190j to selectively draw the actuator member 160j toward the electromagnet 166j. Contact between the second friction material FM-2 and the electromagnet 166j (e.g., the face 1114 of the second friction material FM-2 with the faces 1126 and 1128 of the radially outer and inner rims 1120 and 1122) can limit movement of the actuator member 160j toward the electromagnet 166j such that an axial gap is formed between the face 1110 of the first rim member 1100 and the face 1126 of the outer rim 1120 and an axial gap is formed between the face 1112 of the second rim member 1102 and the face 1128 of the inner rim 1122. In the particular example provided, the faces 1110 and 1112 lie in the same plane and the faces 1126 and 1128 lie in the same plane so that the axial gaps are identical. It will be appreciated, however, that the faces 1110 and 1112 could be axially offset from one another so that the gaps would also be at least partially offset from one another.

Configuration in this "stepped" manner can have several benefits. For example, the "stepped" configuration of the actuator member 160j can provide a reduction in the clamping force applied to the actuator member 160j (relative to an actuator member that is flat) without reducing the initial force that is applied to the actuator member 160j to initiate its movement toward the electromagnet 166j. In this regard, the clamping force applied to the actuator member 160j increases significantly as the gap between the actuator member 160j and the electromagnet 166j is reduced. The illustrated configuration permits the magnetically attract-able portion of the actuator member 160j (e.g., the first and second rims 1100 and 1102) at a desired distance from the electromagnet 166j (so that a desired force can be applied to the actuator member 160j when the electromagnet 166j is energized to initiate movement of the actuator member 160j in an axial direction), while contact between the second friction material FM-2 and the housing of the electromagnet 166j can be employed to limit movement of the actuator member 160j toward the electromagnet 166j (to thereby reduce the clamping force that is applied to the actuator member 160j).

The first friction material FM-1 can define the first teasing surface 224j and can engage the second teasing surface 226j formed on the driver member 106j. Because the friction material FM-1 can reduce wear of actuator member 160j and the driver member 106j, the load exerted by the return spring 168j (which biases the actuator member 160j into contact with the driver member 106j) tends to change very little over time, which can help the clutch assembly to operate in a reliable manner over an extended period of time. The actuator member 160j can be biased axially away from the electromagnet 166j via the return spring 168j so that the control torque is ordinarily generated. If desired, a suitable seal member or the like can be fitted to the driver member 106j that can shield the first friction material FM-1 from any lubricant that is employed on the wrap spring 104. In the particular example provided, a grease dam 1150 is assembled to the sheave 44j, which inhibits movement of grease in a direction that is axially rearward and radially outward of the wrap spring 104.

Figure 35:
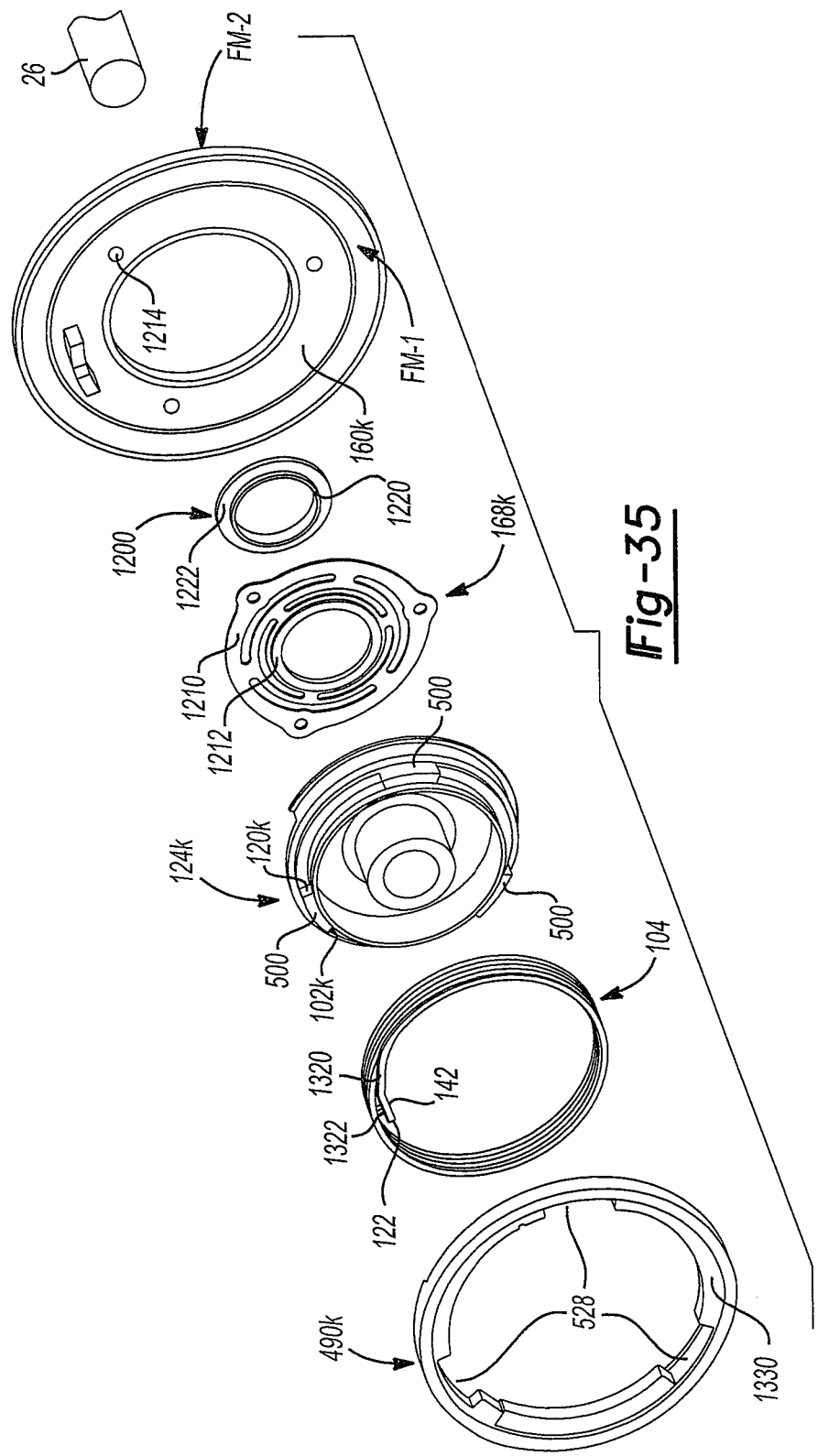
FIG. 35 is an exploded perspective view of a portion of another driven accessory constructed in accordance with the teachings of the present disclosure.

With reference to FIG. 35, a portion of another driven accessory constructed in accordance with the teachings of the present disclosure is illustrated. The driven accessory can include an actuator member 160k, a return spring 168k, a press plug 1200, a driver 124k, a wrap spring 104 and a spring carrier 490k. The return spring 168k can comprise a spring member 1210 and a damping member 1212. The spring member 1210 can be fixedly coupled to the actuator member 160k via a plurality of pins 1214. The damping member 1212 can be an annular structure and can be coupled to the spring member 1210 and can form a bushing into which the press plug 1200 is received. In the particular example provided, the damping member 1212 is formed of an elastomer that is overmolded onto the spring member 1210 (i.e., net formed onto and cohesively bonded to the spring member 1210), but it will be appreciated that other assembly techniques may be employed or that the return spring 168k may be integrally and unitarily formed. The press plug 1200 can include a bushing or barrel 1220, which can be received into the damping member 1212, and a flange 1222 that can abut a rear side of the return spring 168k. The press plug 1200 is configured to be fixedly mounted to the drive shaft 26 of the accessory portion. In the particular example provided, the press plug 1200 is engaged in a press-fit manner to the drive shaft 26 and is positioned along the drive shaft 26 such that the return spring 168k is loaded to a predetermined extent. In this regard, the press plug 1200 can be positioned along the drive shaft 26 to preload the return spring 168k to a desired load. The barrel 1220 can frictionally engage the damping member 1212 to damp movement of the return spring 168k relative to the drive shaft 26 in both axial and rotational directions, may help to avoid sudden deceleration or acceleration when the clutch assembly is disengaged or engaged. It will be appreciated that the avoidance of sudden changes in acceleration (positive or negative) can provide better switching of the clutch assembly, as well as improve the durability of the clutch assembly.

Figure 36:
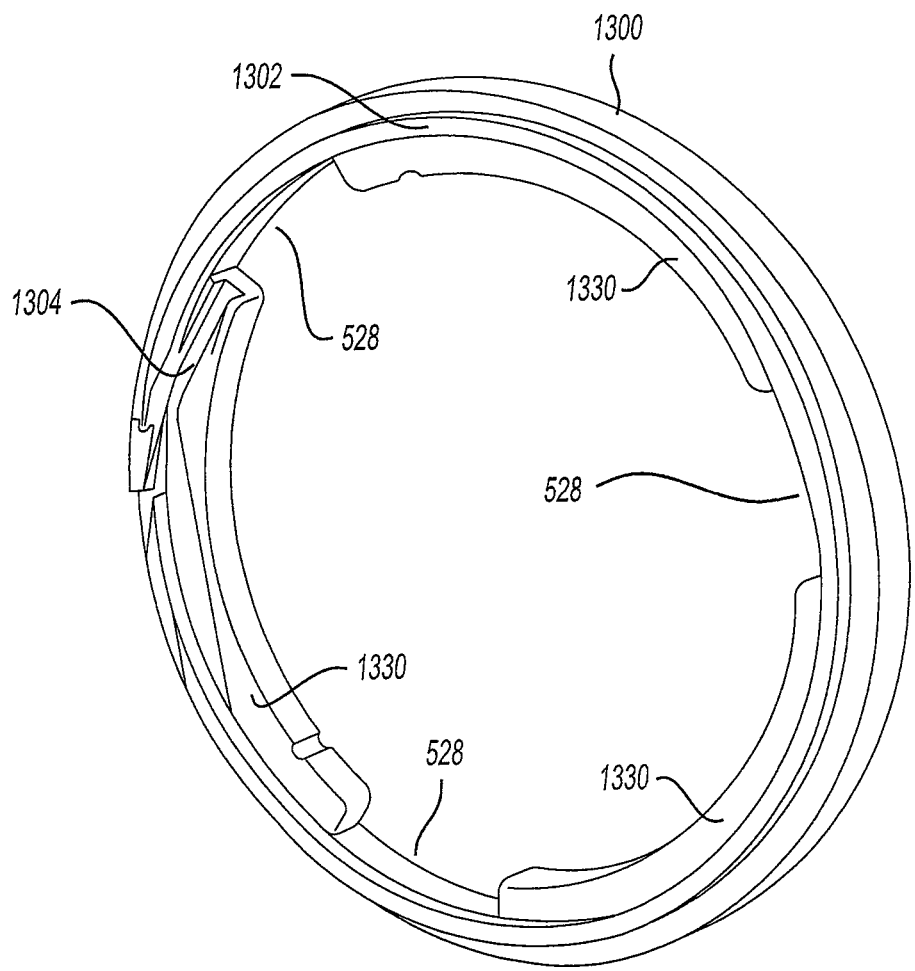
FIG. 36 is a perspective view of a portion of the driven accessory of FIG. 35, illustrating the spring carrier in more detail.

The driver 124k can include a plurality of lugs 500 and one of the lugs 500 can define the second rotary clutch portion 102k and the driver surface 120k. The spring carrier 490k can be engaged to both the wrap spring 104 and the driver 124k and can be configured to distribute rotary power from the wrap spring 104 to the plurality or lugs 500 (rather than to the single lug 500 that defines the second rotary clutch portion 102k). With additional reference to FIG. 36, the spring carrier 490k can include a helical ledge 1300, an inner circumferential rib 1302 and a guide slot 1304. The helical ledge 1300 can be configured to abut an axial end of the wrap spring 104, which the inner circumferential rib 1302 can be configured to abut an inside surface of one or two of the coils of wire that form the wrap spring 104. The guide slot 1304 is configured to cooperate with the second end 142 of the wrap spring 104 to limit movement of the second end 142 relative to the spring carrier 490k. In the particular example provided, the second end 142 includes a first contoured section 1320 and a second contoured section 1322. The first contoured section 1320 can be coupled to the coils of wire at a first end and to the second contoured section 1322 at a second end. The first contoured section 1320 can be angled at approximately 2° to about 15° inwardly from a line tangent to the coils of the wrap spring 104 at a point where the first contoured section 1320 intersects the coils, whereas the second contoured section 1322 can be angled at approximately 60° to 90° inwardly from the tangent line. Contouring of the second end 142 of the wrap spring 104 and the mating configuration of the spring carrier 490k can inhibit rotation of the second end 142 of the wrap spring 104 relative to the spring carrier 490k and/or can aid in transmitting at least a portion of the rotary power from the wrap spring 104 into the spring carrier 490k over a predetermined sector of the spring carrier 490k. Configuration in this manner can be advantageous in some situations because it reduces the load that is transmitted to from the axial end 122 of the second end 142 of the wrap spring 104 to the driver surface 120k of the second rotary clutch portion 102k. It will be appreciated that the rotary power transmitted into the spring carrier 490k can be transmitted to the driver 124k through contact between ribs 1330 of the spring carrier 490k and the several lugs 500 on the driver 124k.

While each of the examples depicted employs a sheave that is adapted to engage a drive belt, one of skill in the art will appreciate from this disclosure that it will be appreciated that the sheave could take different forms so as to receive or transmit rotary power from another device. Such different forms include, without limitation, sprockets, gear profiles (e.g., gear teeth) and rollers.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A clutched device comprising:
a clutch assembly comprising a first rotary clutch portion, a second rotary clutch portion, a drive member, a wrap spring and an actuator, the first and second rotary clutch portions being rotatably disposed about a rotary axis of the clutched device, the drive member being disposed about the rotary axis and having an interior clutch surface, the wrap spring having a first end, a second end and a plurality of helical coils that extend axially between the first and second ends, the first end being fixed to the first rotary clutch portion, the second end contacting the second rotary clutch portion, the helical coils being received against the interior clutch surface, the actuator comprising an actuator member that is coupled to the first rotary clutch portion for rotation therewith, the actuator member being axially movable along the rotary axis between a first position and a second position to control rotary drag forces within the clutch assembly to effect engagement and disengagement, respectively, of the clutch assembly;
wherein the actuator further comprises an electromagnet that is configured to generate a magnetic field for attracting the actuator member, repulsing the actuator member or both, and wherein at least one of the actuator member and a component of the clutch device that is configured to limit axial movement of the actuator member includes a material that is configured to contact the other one of the actuator and the component of the clutch device, the material being configured to improve wear resistance, reduce noise and/or stabilize dynamics of one or more components of the clutch assembly during engagement, disengagement or both engagement and disengagement of the clutch assembly;
wherein the wrap spring is formed of wire and wherein at least a portion of the rotary power input to the wrap spring is transmitted longitudinally through the wire and is output from the wire through an axial end face of the second end of the wrap spring, and wherein the axial end face of the second end of the wrap spring abuts a surface of the second rotary clutch portion so that rotary power is transmitted from the axial end face to the surface of the second rotary clutch portion.

2. The clutched device of claim 1, wherein the material comprises a friction material.

3. The clutched device of claim 2, wherein the friction material is a friction paper.

4. The clutched device of claim 2, wherein the friction material has a thickness that is less than or equal to 0.65 mm.

5. The clutched device of claim 4, wherein the friction material has a thickness that is less than or equal to 0.38 mm.

6. The clutched device of claim 5, wherein the friction material has a thickness that is less than or equal to 0.25 mm.

7. The clutched device of claim 2, wherein the friction material has a minimum coefficient of static friction that is greater than or equal to 0.12.

8. The clutched device of claim 1, wherein the material inhibits contact between actuator member and the component of the clutch assembly to thereby limit a clamping force applied to the actuator member.

9. A clutched device comprising:
a clutch assembly comprising a first rotary clutch portion, a second rotary clutch portion, a drive member, a wrap spring and an actuator, the first and second rotary clutch portions being rotatably disposed about a rotary axis of the clutched device, the drive member being disposed about the rotary axis and having an interior clutch surface, the wrap spring having a first end, a second end and a plurality of helical coils that extend axially between the first and second ends, the first end being fixed to the first rotary clutch portion, the second end contacting the second rotary clutch portion, the helical coils being received against the interior clutch surface, the actuator comprising an actuator member and a damper, the actuator member being coupled to the first rotary clutch portion for rotation therewith, the actuator member being axially movable along the rotary axis between a first position and a second position to control rotary drag forces within the clutch assembly to effect engagement and disengagement, respectively, of the clutch assembly, the damper being configured to damp motion of the actuator member in at least one of a rotary direction and an axial direction.

10. The clutched device of claim 9, wherein the damper comprises a damping member and a bushing, one of the damping member and the bushing being coupled to the actuator member, the damping member engaging the bushing.

11. The clutched device of claim 10, further comprising a shaft driven by the second rotary clutch portion, wherein the bushing is fixedly coupled to the shaft.

12. The clutched device of claim 10, wherein the actuator further comprises a return spring that biases the actuator member into one of the first and second positions and wherein the damping member is coupled to the return spring.

13. The clutched device of claim 12, wherein the damping member is overmolded onto the return spring.

14. The clutched device of claim 9, wherein the actuator member comprises a first friction material that is configured to contact a first component of the clutched device when the actuator member is in one of the first and second positions.

15. The clutched device of claim 14, wherein the actuator further comprises an electromagnet that is configured to generate a magnetic field for attracting the actuator member, repulsing the actuator member or both.

16. The clutched device of claim 15, wherein the first component of the clutched device is the drive member or the electromagnet.

17. The clutched device of claim 14, wherein the actuator member comprises a second friction material that is configured to contact a second component of the clutched device when the actuator member is in the other one of the first and second positions.

18. The clutched device of claim 17, wherein the second component is the drive member.

19. A clutched device comprising:
a clutch assembly comprising a first rotary clutch portion, a second rotary clutch portion, a drive member, a wrap spring and an actuator, the first and second rotary clutch portions being rotatably disposed about a rotary axis of the clutched device, the drive member being disposed about the rotary axis and having an interior clutch surface, the wrap spring having a first end, a second end and a plurality of helical coils that extend axially between the first and second ends, the first end being fixed to the first rotary clutch portion, the second end contacting the second rotary clutch portion, the helical coils being received against the interior clutch surface, the actuator comprising an actuator member and a damper, the actuator member being coupled to the first rotary clutch portion for rotation therewith, the actuator member being axially movable along the rotary axis between a first position and a second position to control rotary drag forces within the clutch assembly to effect engagement and disengagement, respectively, of the clutch assembly, the damper being configured to damp motion of the actuator member in at least one of a rotary direction and an axial direction;
wherein the damper comprises a damping member and a bushing, one of the damping member and the bushing being coupled to the actuator member, the damping member engaging the bushing; and
wherein the actuator further comprises a return spring that biases the actuator member into one of the first and second positions and wherein the damping member is coupled to the return spring.

20. The clutched device of claim 19, wherein the damping member is overmolded onto the return spring.

21. A clutched device comprising:
a clutch assembly comprising a first rotary clutch portion, a second rotary clutch portion, a drive member, a wrap spring and an actuator, the first and second rotary clutch portions being rotatably disposed about a rotary axis of the clutched device, the drive member being disposed about the rotary axis and having an interior clutch surface, the wrap spring having a first end, a second end and a plurality of helical coils that extend axially between the first and second ends, the first end being fixed to the first rotary clutch portion, the second end contacting the second rotary clutch portion, the helical coils being received against the interior clutch surface, the actuator comprising an actuator member and a damper, the actuator member being coupled to the first rotary clutch portion for rotation therewith, the actuator member being axially movable along the rotary axis between a first position and a second position to control rotary drag forces within the clutch assembly to effect engagement and disengagement, respectively, of the clutch assembly, the damper being configured to damp motion of the actuator member in at least one of a rotary direction and an axial direction;
wherein the actuator member comprises a first friction material that is configured to contact a first component of the clutched device when the actuator member is in one of the first and second positions; and
wherein the actuator member comprises a second friction material that is configured to contact a second component of the clutched device when the actuator member is in the other one of the first and second positions.

22. The clutched device of claim 21, wherein the second component is the drive member.

23. A clutched device comprising:
a clutch assembly comprising a first rotary clutch portion, a second rotary clutch portion, a drive member, a wrap spring and an actuator, the first and second rotary clutch portions being rotatably disposed about a rotary axis of the clutched device, the drive member being disposed about the rotary axis and having an interior clutch surface, the wrap spring having a first end, a second end and a plurality of helical coils that extend axially between the first and second ends, the first end being fixed to the first rotary clutch portion, the second end contacting the second rotary clutch portion, the helical coils being received against the interior clutch surface, the actuator comprising an actuator member that is coupled to the first rotary clutch portion for rotation therewith, the actuator member being axially movable along the rotary axis between a first position and a second position to control rotary drag forces within the clutch assembly to effect engagement and disengagement, respectively, of the clutch assembly;
wherein the clutch assembly further comprises a driver and a spring carrier, the driver being coupled for rotation with the second rotary clutch portion, the spring carrier being drivingly engaged to driver, the second end of the wrap spring being coupled to the spring carrier such that a first portion of the rotary power received by the wrap spring is transmitted into the spring carrier and a second portion of the rotary power received by the wrap spring is transmitted to the second rotary clutch portion.

24. The clutched device of claim 23, wherein the second end of the wrap spring is contoured in a manner that does not permit rotation of the second end of the wrap spring relative to the spring carrier.

25. The clutched device of claim 24, wherein the second end of the wrap spring comprises a first portion and a second portion, the first portion being bent at a first angle relative to the helical coils and the second portion being bent at a second, different angle relative to the helical coils.

* * * * *